United States Patent [19]
Kawashima et al.

[11] Patent Number: 5,793,623
[45] Date of Patent: Aug. 11, 1998

[54] AIR CONDITIONING DEVICE

[75] Inventors: Nobuhiro Kawashima, Nara; Hisayoshi Takii, Yamatotakada; Yasuhiro Ikebou, Yao, all of Japan

[73] Assignee: Sharp Kabushiki Kaisha, Osaka, Japan

[21] Appl. No.: 496,285

[22] Filed: Jun. 29, 1995

[30] Foreign Application Priority Data

| Jul. 1, 1994 | [JP] | Japan | 6-150833 |
| Jul. 19, 1994 | [JP] | Japan | 6-166566 |
| Dec. 21, 1994 | [JP] | Japan | 6-318519 |
| Dec. 22, 1994 | [JP] | Japan | 6-319675 |
| Jun. 28, 1995 | [JP] | Japan | 7-162695 |

[51] Int. Cl.$^6$ ............................................. H02H 7/122
[52] U.S. Cl. ............................. 363/56; 363/36; 363/37; 363/40; 363/45
[58] Field of Search ........................ 363/36, 37, 56, 363/45, 46, 98, 34, 40

[56] References Cited

U.S. PATENT DOCUMENTS

| 4,268,884 | 5/1981 | Ford, Jr. et al. | 361/22 |
| 4,462,069 | 7/1984 | Becky | 363/56 |
| 4,677,366 | 6/1987 | Wilkinson et al. | |
| 4,709,292 | 11/1987 | Kuriyama et al. | 361/22 |
| 4,855,652 | 8/1989 | Yamashita et al. | 318/268 |
| 4,879,502 | 11/1989 | Endo et al. | 318/723 |
| 4,939,909 | 7/1990 | Tsuchiyama et al. | 363/56 |
| 5,179,842 | 1/1993 | Kanazawa | 363/56 |
| 5,180,964 | 1/1993 | Ewing | 323/223 |
| 5,181,159 | 1/1993 | Peterson et al. | 363/89 |
| 5,209,075 | 5/1993 | Kim | 363/56 |
| 5,214,367 | 5/1993 | Uesugi | 318/803 |
| 5,280,228 | 1/1994 | Kanouda et al. | 318/803 |
| 5,371,667 | 12/1994 | Nakao et al. | 363/124 |
| 5,488,834 | 2/1996 | Schwarz | 361/22 |
| 5,515,261 | 5/1996 | Bogdan | 636/89 |

FOREIGN PATENT DOCUMENTS

| 62-085690 | 4/1987 | Japan. |
| 4-26374 (A) | 1/1992 | Japan. |
| 426374A | 1/1992 | Japan. |
| 05064451 | 3/1993 | Japan. |
| 5-68376 (A) | 3/1993 | Japan. |
| 568376A | 3/1993 | Japan. |
| 2208980 | 4/1989 | United Kingdom. |
| 2244875 | 12/1991 | United Kingdom. |

*Primary Examiner*—Matthew V. Nguyen
*Assistant Examiner*—Derek J. Jardieu

[57] ABSTRACT

An air conditioning device is arranged such that an output voltage from a commercial power source is converted into a direct current by a rectifying circuit and a smoothing condenser. Thereafter, it is further converted into an AC voltage having a variable frequency by an inverter under the control of a microcomputer, thereby supplying it to a power compressor. Between the rectifying circuit and the smoothing condenser, an active filter is provided for shaping an input current to be an approximate sine wave almost in phase with an input voltage by switching a power transistor. The switching control section and the microcomputer for controlling the switching are activated independently by separately provided power sources. The switching control section supplies a high level signal when the active filter is a normal condition, and supplies a low level signal when the active filter is abnormal. A circuit which generates a low level signal when the power supply to the switching control section is shut off, is provided. This enables the microcomputer to determine the occurrence of an abnormality in the active filter or the switching control section even when the power supply is shut off.

23 Claims, 56 Drawing Sheets

AIR CONDITIONING DEVICE

FIELD OF THE INVENTION

The present invention relates to an air conditioning device including an inverter circuit that changes the frequency of a power compressor in an outdoor device to yield an optimal power for a load. More particularly, it relates to an air conditioning device furnished with an active filter that improves a power factor and suppresses a higher harmonic current from a power source.

BACKGROUND OF THE INVENTION

An air conditioner realizing a refrigerating cycle by sequentially operating a compressor, a condenser, a decompressor, and an evaporator has been known. A recent air conditioner additionally includes an inverter circuit for supplying an alternating current driving power to the compressor to control the output frequency thereof according to a load. This structure enables the air conditioner to operate at an optimal power for a load, thereby increasing the comfortableness of air conditioning while saving energy.

As shown in FIG. 49, a conventional air conditioner rectifies an output from a commercial alternating current power source 501 using a bridge rectifier circuit 502 composed of four diodes, smoothens the rectified voltage using a smoothing condenser 503 to convert the same into a direct current, and thus operates as a condenser input type power supply circuit. The direct current from the smoothing condenser 503 is converted into an alternating current of an arbitrary frequency by an inverter circuit 504 and is supplied to a power compressor 505 serving as a load.

The inverter circuit 504 includes a three-phase transistor bridge circuit composed of six transistors 511–516 connected to each other through three-phase bridge connection, and six diodes 521–526 provided in parallel with the transistors 511–516, respectively. Each of the transistors 511–516 supplies a three-phase alternating current power to the power compressor 505 when it is turned on at the timing at which a control signal from an inverter control section 506 is supplied to the control terminal thereof. The inverter circuit 504 operates most efficiently for a load by controlling the output frequency according to the load.

In case of the above condenser input type power supply circuit, an input current flows when an input voltage is higher than a DC smoothed voltage $V_0$ and stops flowing when the input voltage is lower than $V_0$ as shown in FIG. 50. As a result, the above condenser input type power supply circuit presents problems in that more power is lost due to a decrease in the power factor of the power supply circuit and an increase in a higher harmonic current, and in that the higher harmonic current adversely affects an AC power line. Also, with the above-mentioned air conditioner, the power compressor 505 outputs a large power of 1–2 kW, and the smoothing condenser 503 correspondingly has a large capacity, thereby making the above problems more pronounced.

To eliminate these problems, the IEC (International Electrotechnical Commission) will impose a regulation on the higher harmonics current of the power source in 1996, and some actions must be taken to comply with the regulation.

Although a structure that employs a passive filter using a reactor (choke coil) is known as a higher harmonic current suppressing technique, this structure is not a perfect countermeasure because it can not maintain the higher harmonic current under the regulated value.

Alternately, an air conditioner including an active filter 507 as shown in FIG. 49 is disclosed in Japanese Laid-open Patent Application Nos. 4-26374/1992 and 5-68376/1993. To be more precise, the active filter 507 includes a choke coil 531, a fast recovery diode 532, and a power transistor 533 between the bridge rectifier circuit 502 and the smoothing condenser 503. The switching action of the power transistor 533 is controlled by a switching control section 508.

The switching control section 508 controls the switching action of the power transistor 533 in the following way.

As shown in FIG. 51, a direct current voltage being generated by the smoothing condenser 503 is detected in resistors 561 and 562 (see FIG. 53) in an output voltage detecting section 541 in a decompressed (divided) state. The voltage difference between the voltage thus detected and a reference voltage generated by a reference voltage source 542 is outputted from an error amplifier 543. The reference voltage is set to a value corresponding to the rated value of the direct current voltage.

On the other hand, a signal voltage corresponding to an input voltage to the active filter 507 is generated by an input voltage detecting section 544 based on an output voltage from the bridge rectifier circuit 502. Accordingly, a multiplier 545 multiplies the voltage difference from the error amplifier 543 by the signal voltage from the input voltage detecting section 544. As a result, in the multiplier 545, the waveform of the input voltage is corrected by the output from the error amplifier 543. Thus, the output from the multiplier 545 includes the components corresponding to both the direct current voltage and input voltage, and matches with an increase of the voltage boosted by the active filter 507.

An input current is detected by an input current detecting section 546. The input current thus detected is amplified in sync with the output of the multiplier 545 by an amplifier 547, thereby making a synchronous waveform with the input voltage.

The output from the amplifier 547 is compared with a periodic chopping wave, generated by an oscillator 548, by a comparator 549. As shown in FIG. 52, the comparator 549 outputs a pulsewise PWM (Pulse Width Modulation) signal only when the output from the amplifier 547 is higher than the chopping wave. The PWM signal is amplified by a driving circuit 550 and is supplied to a control electrode of the power transistor 533. The driving circuit 550 switches the output of a switching control signal to on or off by an ON/OFF control signal outputted from an output ON/OFF circuit 551 based on a seizing signal.

The active filter 507 is generally known as a voltage rise chopper type active filter, and it boosts the output voltage higher than a smoothed voltage yielded only by the bridge rectifier circuit 502 and smoothing condenser 503 by exploiting the energy stored in the choke coil 531. An increase in the boosted voltage is controlled to be a predetermined rated value by the switching control section 508.

The active filter 507 supplies the energy stored in the choke coil 531 to the smoothing condenser 503 gradually by turning on or off the power transistor 533 at regular frequencies (tens of kilohertz) using the switching control signal outputted from the switching control section 508. As a result, the waveform of the input current is locked with that of the input voltage, and becomes an approximate sine wave. Thus, the input power factor is improved while the harmonic distortion is suppressed, and the utilization efficiency of the input power is upgraded as a consequence.

In case of the air conditioner such as the one shown in FIG. 49, generally the inverter control section 506 is insulated from the switching control section 508 and each is driven by their respective power sources. Thus, signals are sent between the inverter control section 506 and switching control section 508 through a photo-coupler. Also, the switching control section 508 has an additional function to detect an unusual event occurring in the active filter 507, upon detecting such an unusual event, it turns on the photo-coupler by outputting a detection signal to notify the inverter control section 506 of the unusual event.

However, with the above structure, once the switching control section 508 stops because of an unusual event, or namely, the power supply to the same is stopped for some reason, the switching control section 508 cannot output the detection signal, thereby making it impossible to notify the inverter control section 506 of the unusual event. Thus, the inverter control section 506 can not stop the power compressor 505, and the power compressor 505 keeps on operating although the active filter 507 has already stopped. Moreover, the overcurrent may damage the devices composing the inverter circuit 504.

Generally the above voltage rise chopper type active filter 507 is used for an air conditioner because of its advantages in terms of cost saving and noise reduction. However, the active filter 507 always outputs a voltage higher than the input voltage because of the boosting by the choke coil 531 and power transistor 533, and the output voltage easily increases or decreases according to the balance with respect to a load.

To eliminate these drawbacks, the feedback is provided by the switching control section 508, so that the output voltage from the active filter 507 maintains a constant value. To be more specific, should the output voltage from the active filter 507 change, the switching control section 508 controls the switching action of the power transistor 533 by changing the pulse width of the PWM signal based on the detected output voltage from the active filter 507, so that the output voltage from the active filter 507 will have a set value demanded by the inverter control section 506.

The output voltage thus detected is also supplied to the inverter control section 506 as information. Accordingly, when the output voltage exceeds a certain range from the set value, the inverter control section 506 judges that either the power compressor 505 has stopped or something is wrong with the inverter circuit 504, and forcibly stops the active filter 507 to boost the voltage. Also, an overvoltage protection circuit which will be described in the next paragraph forcibly stops the active filter 507 to boost the voltage when the output voltage exceeds a predetermined protection voltage.

The overvoltage protection circuit shown in FIG. 53 detects the output voltage from the active filter 507 using a voltage divided by resistors 561,562 provided as voltage dividing circuits of the output voltage detecting section 541, and the detected voltage is used to judge the overvoltage by a comparator 563. The comparator 563 compares the detected voltage with a protection voltage generated by resistors 564,565, and stops the output action of the driving circuit 550 when the detected voltage is higher than the protection voltage.

On the other hand, another overvoltage protection circuit shown in FIG. 54 uses the output voltage from the active filter 507 divided by resistors 566,567, which are different from the resistors 561,562, as the detected voltage.

However, when the active filter 507 boosts the output voltage to the set value in activating the driving action, the output voltage becomes unstable or exceeds the set value momentarily during a certain period, such as when the inverter circuit 504 starts or stops the operation, or the power compressor 505 is activated or deactivated. The inverter control section 506 judges such a condition as an unusual event even though the inverter circuit 504, active filter 507, etc. operate normally, and stops the active filter 507 to boost the voltage, thereby making the operation of the air conditioner unstable.

In particular, when the active filter 507 activates the voltage boosting action, there is a considerable difference between an initial voltage and a target voltage of the output voltage, and thus the gain of the feedback control by the switching control section 508 becomes greater. Thus, the output voltage is boosted so rapidly from the start that it overshoots the target voltage.

Once the active filter 507 has activated the voltage boosting action, the output voltage from the active filter 507 drops instantaneously because of the current flowing through the power compressor 505 at the time its activation. Correspondingly, the active filter 507 boosts the output voltage using the feedback control by the switching control section 508 to compensate such a drop in voltage.

However, once the power compressor 505 has started, the current flows constantly and hence the voltage is stabilized. Thus, the boosted output voltage overshoots the target voltage by an increase therein. Then, the output voltage drops more than necessary by the feedback to reduce the overshooted voltage, and undershoots the target value this time. The following output voltages remain in a stable condition because the ringing continues with the time constant of a feedback control system.

Thus, the conventional air conditioner is disadvantageous in that it stops if the active filter 507 stops when the overvoltage protection circuit operates on an overshooted output voltage as has been explained.

The increase value in the overshot output voltage is large in an absolute value level, however, it is generated only in tens of milliseconds. Thus, the increase of this degree does not exceed the maximum rated values of the active filter 507, the switching element of the inverter circuit 504, and the smoothing condenser 503, and there occurs no problem such as damaging the elements, limiting the duration of life, and degrading the performance.

Thus, the operating level of the overcurrent protection circuit may be raised to prevent the air conditioner from being stopped by the change in the input current as a result of the overshoot.

However, by so doing, the overcurrent which should be detected is not detected, and it becomes impossible to protect the element from being damaged by the overcurrent.

Since the protection voltage, which is compared with the detected voltage by the overvoltage protection circuit, is yielded by dividing the direct current voltage by the resistors 564,565, the affect of the output voltage to the same is negligible. Therefore, the output voltage and a reference voltage used in the overvoltage protection circuit are determined separately. However, variations in the resistor values of the resistors 561,562 or the resistors 564,565 provided to detect the voltage may reduce the detection margin (protection voltage minus output voltage) of the overvoltage protection circuit.

To be more specific, when the resistor values of the resistor 561 vary in large numbers while those of the resistors 562 in small numbers, the voltage dividing circuit detects an output voltage lower than the normal voltage. Thus, if the output voltage is controlled based on the value thus detected, the output voltage is boosted higher than the normal voltage. On the other hand, when the resistor value of the resistor 564 varies in large numbers while that of the resistor 565 varies in small numbers, the protection voltage becomes lower than the normal voltage. Accordingly, the detection margin lessens, thereby making it easier for the overvoltage protection circuit to start the operation when the output voltage from the active filter 507 overshoots the normal voltage.

As a result, the overvoltage protection circuit operates frequently, which presents a problem that the air conditioner can not operate continuously. Presently, the detection margin of each air conditioner is evaluated before the delivery to eliminate this problem. However, evaluating the detection margin individually causes problems during the manufacturing process, such as decreasing yield and making the inspection troublesome, and makes the resulting air conditioner expensive.

The conventional air conditioner controls the air conditioning power by changing the operating frequency of the power compressor 505 from 15 Hz to 120 Hz.

According to a typical specification, a compressor for the inverter operates at 60 Hz for the first one minute from the activation to stabilize the activation and refrigerating cycle. When the power compressor 505 is operated under such a specification, the load current of the same increases because the activation frequency of 15 Hz increases linearly to the operating frequency of 60 Hz as shown in FIG. 55.

Accordingly the output voltage from the active filter 507 decreases as the load current increases. Then, to compensate for such a decrease in the output voltage, the switching control section 508 boosts the voltage value under the feedback control, so that the output voltage is maintained at the constant level.

The above change in the output voltage does not occur instantaneously as has been explained. However, it occurs significantly and continuously over a long time period. Thus, the feedback control is delayed and causes a low frequency wave in the output voltage, and as shown in FIG. 56, the waveform of the input current to the active filter 507, which is regular in general, correspondingly shifts to the one having an irregular fluctuation. As a result, the input current to the active filter 507 increases over the rated current, and the overcurrent protection circuit operates to stop the air conditioner.

To prevent the air conditioner from being stopped by the change in the input current, the operating level of the overcurrent protection circuit may be raised. However, by so doing, the overcurrent caused by an unusual event which should be detected are not detected, thereby making it impossible to protect the element from being damaged by the overcurrent.

The conventional air conditioner changes the operating frequency of the power compressor 505 from 10 Hz to 120 Hz (180 Hz in some case) depending on a load of air-conditioning. However, the ON/OFF action of the power transistor 533 of the active filter 507 is controlled independently of the load condition of the power compressor 505. Thus, the fluctuation of the output current becomes too large.

As a result, the output voltage from the active filter 507 decreases under heavy-duty operation, and the terminal voltage of the smoothing condenser 503, or namely, the applied voltage to the inverter circuit 504, also decreases. In contrast, the output voltage from the active filter 507 increases under light-duty operation, and the applied voltage to the inverter circuit 504 also increases. Note that, under the light-duty operation, the voltage applied to the smoothing condenser 503 and inverter circuit 504 is above the maximum rated value, thereby possibly causing damages to the same.

Under the no-load operation, the output voltage from the active filter 507 increases more than it does under the light-duty operation. Thus, the smoothing condenser 503 and inverter circuit 504 are more susceptible to the damages compared with the light-duty operation.

In addition, the conventional air conditioner has the following disadvantage in terms of air conditioning power.

An induction motor is generally used as the compressor for the inverter, and as shown in FIG. 57, the induction motor has the operating characteristics that the number of rotations is set to a value at which a load and a torque are balanced, because the torque is nil at the synchronous speed (number of rotations) $N_0$. The difference between the synchronous number of rotations and the actual number of rotations is known as slip, which affects the rotation of the motor significantly.

To be more specific, when the load increases, a load curve shifts from $T_1$ to $T_2$, and the current in the motor increases to $I_1$ to $I_2$. Accordingly, the slip also increases, and the air conditioning power degrades as the operating frequency, i.e., the number of rotations, of the power compressor 505 decreases from $N_1$ to $N_2$. The air conditioning power degrades also when the current in the motor increases more than the rated value, because a command value of the operating frequency of the power compressor 505 is lowered to reduce the current in the motor.

In the active filter 507, the switching frequency and switching loss of the power transistor 533, inductance and ripple current of the choke coil 531, input current, etc. have close correlation. More specifically, the ripple current $\Delta I$ in the coil current is expressed by Equation (1) below.

$$\Delta I = \alpha/(f_{sw} \cdot L) \qquad (1)$$

where $\alpha$ is a constant, $f_{sw}$ is the switching frequency of the power transistor 533, L is the inductance of the choke coil 531.

Hence, given a certain value to the inductance of the choke coil 531, then multiplying $f_{sw}$ by $\Delta I$ yields a constant value ($f_{sw} \times \Delta I$=a constant value). Thus, as shown in FIG. 58, increasing the switching frequency $f_{sw}$ reduces the ripple current; on the other hand, it increases the switching loss of the power transistor 533. Therefore, the switching frequency $f_{sw}$ is generally determined based on the current capacity and inductance of the choke coil 531.

When the switching frequency $f_{sw}$ is fixed, the number of switching times per period of the power source output becomes inversely proportional to the power source frequency. Thus, there occurs a problem that the ripple current in the choke coil 531 increases as the power source frequency becomes lower. For example, when comparing the case of the power source frequency of 50 Hz and the power source frequency of 60 Hz, the number of switching per one cycle of the power source output is greater in the former case than the latter case. Thus, the former case of the power source frequency of 50 Hz has a greater ripple current and has a greater switching loss compared with the latter case of the power source frequency of 60 Hz. Further, there occurs a problem that the peak value of the current, which affects the maximum capacity of the power transistor 533, increases as the ripple current does so.

When the direct current level in the coil using a core is changed, magnetic saturation occurs at a certain level and the inductance drops abruptly, which is known as coil's direct current super-imposing characteristics. In particular, in case of an air conditioner of a 230-V model, the choke coil 531 used to boost the voltage has a large maximum coil current up to 7 to 8 A rms, and it is almost impossible to make the direct current super-imposing characteristics flat. In actuality, the inductance of the direct current super-imposing characteristics decreases as the coil current increases as shown in FIG. 59.

It is understood from Equation (1) that the ripple current increases as the inductance decreases. Thus, as shown in FIG. 60, the larger the coil current, the larger the ripple current.

To be more specific, a ripple current $\Delta I_1$ is small when the coil current is small as shown in FIG. 61, and a ripple current $\Delta I_2$ is fairly large when the coil current is large as shown in FIG. 62.

The ripple current thus increased can not be removed by a noise filter and flows through the AC power supply line, thereby presenting a problem that the noise level of noise terminal voltage, noise power, unnecessary radiation, etc. is increased.

The switching control section 508 demands a power source, such as a power source which outputs a voltage of +15 V or more, for the amplifier 547 or the like. Thus, the switching control section 508 is large in size and fairly expensive.

Further, the switching control section 508 controls the switching action in such a manner that the phase of the input current becomes in sync with that of the input voltage to approximate to the sine wave. However, the actual waveform of the input voltage is distorted because the a strain is likely to occur in input current as it increases, which presents a problem that it is difficult to approximate the input current to the sine wave.

The switching control section 508 mainly comprises a single integrated circuit. Thus, if the integrated circuit breaks, the output voltage detecting section 541 can not detect an excess increase in the output voltage when the output value increases more than necessary, thereby making it impossible to suppress an increase in the output voltage.

The switching control section 508 finds the increase in the output voltage by calculating the voltage balance between the rated value and detected output voltage, and outputs the PWM signal such that makes the voltage balance nil. However, there is a considerable voltage balance at the time of activation of the active filter 507, and the output voltage changes after some time has passed since the switching control signal was outputted to the power transistor 533. Thus, if the switching control signal generated based on such a considerable voltage balance is supplied to the power transistor 533 after some time since the activation of the active filter 507, the output voltage is boosted higher than the rated value.

Further, when less power is consumed due to the light-duty operation, the output voltage exceeds the rated value only by slightly widening the pulse width of the switching control signal from the switching control section 508 from a certain pulse width. Thus, it is required to output the switching control signal with a narrower range than the certain pulse width. To meet this requirement, the pulse width of the switching control signal can vary only in a limited range, thereby making it difficult to approximate the current waveform to the voltage waveform. Accordingly, neither the higher harmonic components in the power supply current can be suppressed, nor can the power factor can be improved.

Since the voltage balance reaches its maximum at the activation of the active filter 507, the switching control signal is outputted with a widened pulse width, and if the active filter 507 starts up at the crest value of the input voltage, the current value to be determined by the switching control signal reaches its maximum pulse width. Since the maximum rated value of the power transistor 533 is determined by the maximum current value under such conditions, it is necessary to secure the maximum rated value for the power transistor 533 even when the maximum current value is far larger than the current value under the normally controlled conditions except for the activation. For this reason, the air conditioner demands a power transistor 533 with a fairly large maximum rated value, and makes the resulting air conditioner expensive.

The air conditioner includes a 100 V mode driven by a power source voltage of 100 V, and a 200 V model driven by a power source voltage of 200 V. As shown in FIG. 63, the former yields a direct current voltage of 280 V by boosting a 100 V voltage from the commercial power source 501 through a smoothing coil 561 using a voltage doubler rectifier circuit 571 comprising diodes 571a,571b and condensers 571c,571d. On the other hand, as shown in FIG. 64, the latter yields a direct current voltage by rectifying a 200 V voltage from the commercial power source 501 using the bridge rectifier circuit 502.

Thus, although it is not shown in the drawing, the air conditioner of the 200 V model includes one active filter 507 like the air conditioner shown in FIG. 49. However, the air conditioner of the 100 V model needs two active filters 507 for two capacitors 571c,571d. Thus, the latter is disadvantageous compared with the former because it is more expensive.

SUMMARY OF THE INVENTION

Figure 1:
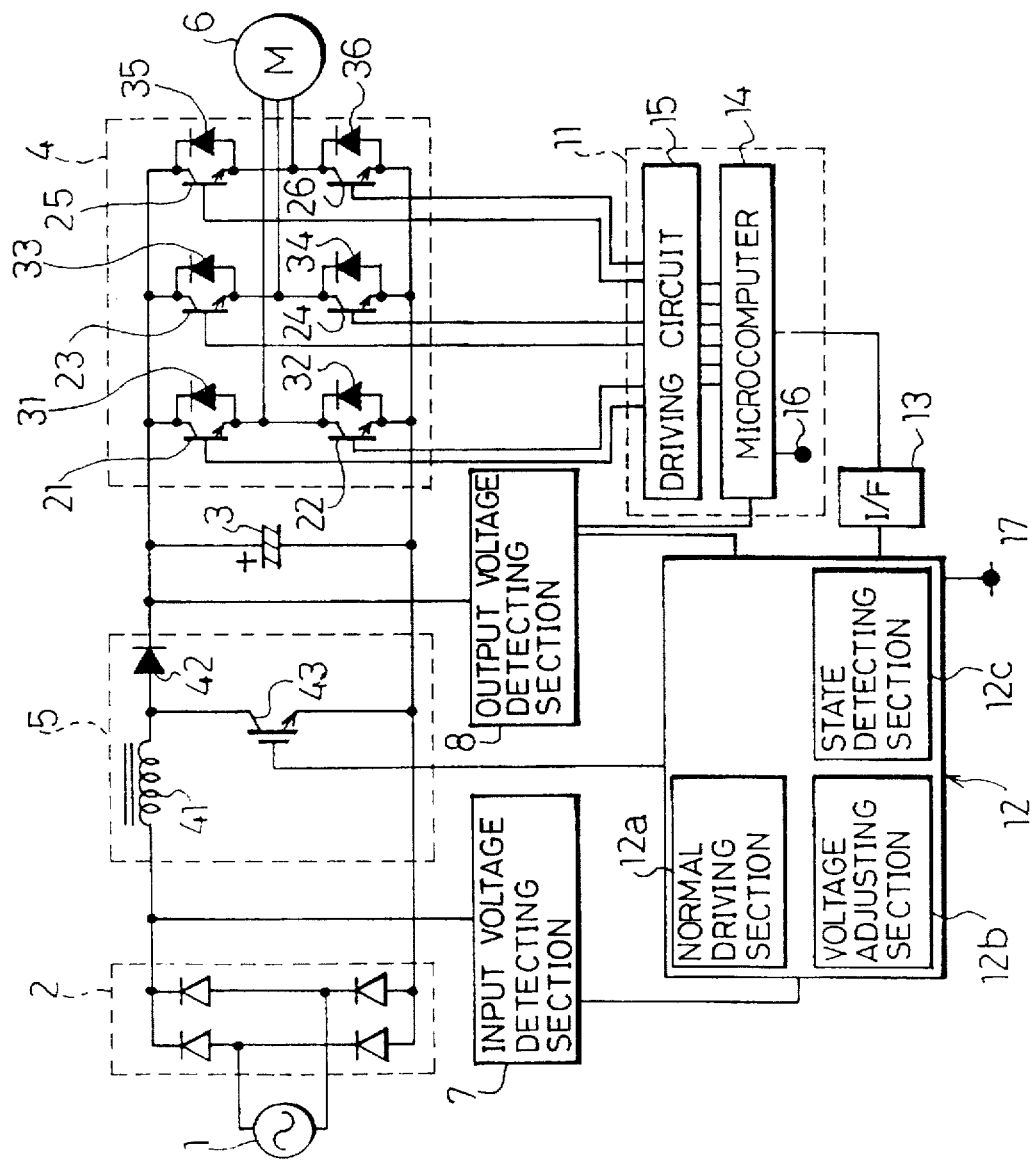
FIG. 1 is a schematic circuit diagram depicting the structure of an air conditioner in accordance with the first embodiment of the present invention.

An object of the present invention is to provide an air conditioning device which permits a stable operation, for example, when starting up, and a protects of components against an abnormality. Another object of the prevent invention is to provide an air conditioning device having a simplified structure by using some components in common.

In order to achieve the above objects, the first air conditioning device in accordance with the present invention includes:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose variable voltage and frequency to be applied to a power compressor;

control means for controlling an output of the DC voltage-AC voltage conversion means according to a load state of the power compressor;

an active filter formed between the rectification means and the smoothing means, for shaping an input current to be an approximate sine wave almost in phase with an input voltage;

active filter control means for controlling the active filter in response to an instruction from the control means, the active filter control means being actuated by a power source separately provided from a power source for the control means; and abnormality detection means for detecting an abnormality or a shut-off of at least one of the active filter and the active filter control means and detecting a shut-off of a power to be supplied to the active filter control means as an abnormality.

According to the first air conditioning device, when an abnormality or a shut off occurs at least in one of the active filter and the active filter control means, the occurrence of abnormality or the shut off is detected by the abnormality detection means. The abnormality detection means also detects a shut off of power to be supplied to the active filter control means as an abnormality. Since this enables the control means to detect the shut off of the active filter control means caused by the stoppage of the power to be supplied thereto, a necessary operation can be taken such as stopping the power compressor.

In order to achieve the above objects, the second air conditioning device in accordance with the present invention includes:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose variable voltage and frequency vary;

an active filter formed between the rectification means and the smoothing means, for shaping an input current to be an approximate sine wave almost in phase with an input voltage; and overvoltage preventing means which shuts off the active filter upon detecting that an output voltage from the active filter is an overvoltage in excess of a predetermined threshold, and which does not detect the overvoltage in excess of the predetermined threshold for a predetermined time immediately after a turn-on time and a turn-off time of the DC voltage-AC voltage conversion means or for a predetermined time immediately after a turn-on time of the active filter.

According to the second air conditioning device, the excess output voltage from the active filter will not be detected by the overvoltage preventing means for each of the described periods. Therefore, even if an overshoot occurs in output voltage of the active filter in the period, the overvoltage preventing means will not stop the active filter. This enables the second air conditioning device to be operated under a stable condition even when the overshoot occurs in output voltage. Under the steady state of the output voltage, upon detecting the excess output voltage by the overvoltage preventing means, the active filter is stopped, thereby preventing an output abnormality of the active filter.

In order to achieve the above objects, the third air conditioning device in accordance with the present invention, include:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose voltage and frequency vary;

an active filter formed between the rectification means and the smoothing means, for shaping an input current to be an approximate sine wave almost in phase with an input voltage; and overvoltage preventing means which shuts off the active filter upon detecting that an output voltage from the active filter is an overvoltage in excess of a predetermined threshold, and which raises the predetermined threshold for a predetermined time when starting up the active filter and the power compressor.

According to the third air conditioning device, the predetermined threshold is raised by the overvoltage preventing means. Thus, an overshoot does not occur in the output voltage of the active filter generated in the described period above the predetermined threshold, and thus the overvoltage preventing means will not stop the active filter. This enables the third air conditioning device to be operated under a stable condition even when generating an overshoot of the output voltage. In the stable condition of the output voltage, upon detecting an output voltage in excess of a predetermined threshold of the normal overvoltage by the overvoltage preventing means, the active filter is stopped, thereby preventing an occurrence of abnormality in output of the active filter.

In order to achieve the above objects, the fourth air conditioning device of the present invention includes:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose voltage and frequency vary;

an active filter formed between the rectification means and the smoothing means, for shaping an input current to be an approximate sine wave almost in phase with an input voltage;

active filter control means including output voltage detection means for detecting an output voltage from the active filter, voltage difference detection means for outputting a difference between an output detected by the output voltage detection means and a reference voltage, and waveform rounding means for rounding an output from the voltage difference detection means, the active filter control means controlling the active filter so as to maintain an output voltage therefrom constant based on the difference detected by the voltage difference detection means; and overvoltage preventing means which shuts off the active filter upon detecting that an output voltage from the active filter is in excess of a predetermined threshold.

According to the fourth air conditioning device, since the waveform of the output from the differential voltage detection means is shaped to be obtuse by the waveform obtuse means, the output voltage from the active filter, when starting up the active filter or the power compressor, changes gradually until it reaches the steady state. Therefore, an occurrence of the overshoot of the output voltage can be eliminated, and the overvoltage preventing means will not stop the active filter. Therefore, even when starting the active filter or the power compressor, the fourth air conditioning device can be operated under the stable condition. Moreover, under the steady state of the output voltage, as in the case of the third air conditioning device, an occurrence of abnormality in output from the active filter can be prevented by the overvoltage preventing means.

In order to achieve the above objects, the fifth air conditioning device of the present invention includes:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose voltage and frequency vary;

control means for controlling an output frequency from the DC voltage-AC voltage conversion means according to a load state of the power compressor and lowers a rate of changing speed of an operating frequency of the power compressor for a predetermined time immediately after starting an alteration and immediately before completing the alternation when altering the operating frequency; and active filter formed between the rectification means and the smoothing means, for shaping an input current to be an approximate sine wave almost in phase with an input voltage.

According to the fifth air conditioning device, the operating frequency is altered, for example, when activating the power compressor, etc., by the control means at a lower variable speed for a predetermined time immediately after the start of the alteration and for a predetermined time immediately before the completion of the alteration. As described, by providing the period where the variable speed of the operating frequency is low, large fluctuations of the input voltage of the active filter can be prevented.

In order to achieve the above object, the sixth air conditioning device in accordance with the present invention is arranged so as to include:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose voltage and frequency vary;

an active filter formed between the rectification means and the smoothing means, for shaping an input current to be an approximate sine wave almost in phase with an input voltage;

a load detection means for detecting a load state of the power compressor;

output voltage setting means for setting an output voltage from the active filter according to the load state of the power compressor; and active filter control means for controlling the active filter based on a predetermined output voltage.

According to the sixth air conditioning device, upon detecting the load state of the power compressor by the load state detection means, the output voltage to be applied to the active filter control means is set by the output voltage setting means according to a detection value of the load state detection means. Then, the active filter control means controls the active filter based on the set value.

Therefore, even if the output voltage from the active filter drops due to an increase in load of the power compressor, by increasing the output voltage according to the load by the active filter control means, a drop in output voltage can be prevented. On the other hand, when the load of the power compressor becomes lighter, by lowering the output voltage by the active filter control means according to the load, a rise in output voltage can be prevented. Therefore, the described arrangement enables the output voltage to be maintained constant irrespectively of variations in load.

In order to achieve the above object, the seventh air conditioning device in accordance with the prevent invention includes:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose voltage and frequency vary to be applied to the power compressor;

an active filter formed between the rectification means and the smoothing means, for shaping an input current to be an approximate sine wave almost in phase with an input voltage, a ground potential thereof matching that of the DC voltage-altering voltage conversion means;

active filter control means for controlling the active filter; and power supply means for supplying a driving power to the DC voltage-AC voltage conversion means through a power supply output terminal, the power supply means supplying a driving power also to the active filter control means through another power source output terminal.

According to the seventh air conditioning device, in the power source means, the ground potential of the DC voltage-AC voltage conversion means and the ground potential of the active filter are identical. The power source for the active filter control means and the power source for the DC voltage-AC voltage conversion means are used in common. As the power source means has a separately provided power source output, respective power sources for use exclusive use in the active filter control means and the DC-AC conversion means are not needed.

In order to achieve the above object, the eighth air conditioning device in accordance with the present invention includes:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose voltage and frequency vary to be applied to the power compressor;

an active filter formed between the rectification means and the smoothing means, the active filter including a choke coil, the active filter shaping an input current to be an approximate sine wave almost in phase with an input voltage by adjusting a flow of current into the smoothing means through the choke coil by switching a switching element; and switching control means for varying a switching frequency of the switching element according to at least one of a current flowing through the choke coil and an output frequency of the AC power source.

According to the eighth air conditioning device, for example, when a switching frequency is raised according to an increase in current flowing through the choke coil by the control of the switching control means, even if the inductance of the choke coil is lowered due to the direct current superimposing characteristic, an increase in ripple current can be prevented. This is true also in the case of raising the switching frequency when the output frequency of the alternating source is raised.

In order to achieve the above objects, the ninth air conditioning device in accordance with the present invention includes:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose voltage and frequency vary to be applied to the power compressor;

an active filter formed between the rectification means and the smoothing means, for shaping an input current to be an approximate sine wave almost in phase with an input voltage;

active filter control means for controlling the active filter;

overvoltage detection means for detecting that an output voltage from the active filter is an overvoltage of not less than a predetermined voltage; and power supply stop means for stopping a power to be supplied to the active filter control means when the output voltage from the active filter is an overvoltage.

According to the ninth air conditioning device, upon detecting an excess output voltage from the active filter by the overvoltage detection means, the power supply to the active filter control means is stopped by the power supply stop means. Then, the active filter control means stops the control of the active filter by stopping the power to be supplied thereto. As a result, the active filter can be surely prevented from overheating even if an overheat of the output voltage occurs by any cause.

In order to achieve the above objects, the tenth air conditioning device in accordance with the prevent invention includes:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose voltage and frequency vary to be applied to a power compressor;

an active filter formed between the rectification means and the smoothing means, for shaping an input current to be an approximate sine wave almost in phase with an input voltage;

output voltage detection means for detecting an output voltage from the active filter;

error detection means for detecting a difference between an output voltage and a reference voltage set beforehand;

output control means for controlling an output voltage from the active filter to be maintained constant based on the difference; and limiting means for limiting the difference between the output voltage and the reference voltage to be not more than a predetermined value when starting up the active filter.

According to the tenth air conditioning device, a difference between the output voltage detected by the output voltage detection means and the reference voltage is detected by the error detection means. Then, the output voltage from the active filter is maintained constant under the control of the output control means. On the other hand, when starting up the active filter, the control means limits the difference to be not more than a predetermined value. As a result, since the difference between the output voltage and a reference voltage becomes smaller than the actual value, an excess, rise in output voltage due to a great difference between the output voltage at turn-on time and the target voltage of the output voltage can be prevented.

In order to achieve the above objects, the eleventh air conditioning device in accordance with the present invention includes:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose voltage and frequency vary to be applied to a power compressor;

an active filter formed between the rectification means and the smoothing means, the active filter shaping an input voltage to be an approximate sine wave almost in phase with an input voltage by adjusting a flow of current into the smoothing means by switching a switching element;

zero cross detection means for detecting a zero cross point of the input voltage of the active filter; and activation means for starting up the active filter at a zero cross point of the input voltage.

According to the eleventh air conditioning device, upon detecting a zero cross point of the input voltage by the zero cross detection means, the active filter is activated by the activation means at the zero cross point. Since the amplitude of the input voltage becomes zero at a zero cross point, the switching width of the switching element is minimized. Therefore, when starting up the active filter at which the difference between the actual output voltage and the target voltage is maximized, the current flowing through the switching element becomes small, and the maximum current of the switching element can be made smaller. Therefore, the maximum rate of the switching element can be reduced, and the reduction in cost of the switching element and an improved reliability can be achieved.

In order to achieve the above object, the twelfth air conditioning device in accordance with the present invention includes:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose voltage and frequency vary to be applied to a power compressor;

an active filter formed between the rectification means and the smoothing means, the active filter including a choke coil and shaping an input current to be an approximate sine wave almost in phase with an input voltage by adjusting a flow of current into the smoothing means through the choke coil by switching a switching element; and inductance alternation means for increasing an inductance of the choke coil for a predetermined time after starting up the active filter.

According to the twelfth air conditioning device, since the inductance of the choke coil increases for a predetermined time after starting up the active filter by the inductance alteration means, the current flowing through the choke coil for the period becomes smaller. Therefore, when activating the active filter, the current flowing through the switching element becomes smaller, thereby enabling a smaller maximum current of the switching element. Therefore, a reduction in cost of the switching element and an improved reliability can be achieved as in the case of the eleventh air conditioning device.

In order to achieve the above object, the thirteenth air conditioning device in accordance with the present invention include:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose voltage and frequency vary to be applied to a power compressor;

an active filter formed between the rectification means and the smoothing means, for shaping an input current to be an approximate sine wave almost in phase with an input voltage;

an AC voltage detection means for detecting an AC voltage of the AC power source;

voltage rise setting means for setting a voltage rise value for an output from the active filter according to the AC voltage of the AC power source; and active filter control means for controlling the output voltage from the active filter based on a predetermined voltage rise value.

According to the thirteenth air conditioning device, upon detecting an AC voltage by the AC voltage detection means, a voltage rise value for the output voltage is set according to the AC voltage detected by the voltage rise setting means. Here, the voltage rise value is set such that, for example, the voltage rise value for the 100 V air conditioning device is twice as much as that of the 200 V air conditioning device. In this way, the active filter is controlled by the active filter control means based on the set value.

The described arrangement enables the output voltage from the active filter to be maintained constant irrespective of the AC voltage. Therefore, among different kinds of the AC voltage, the active filter can be used in common, thereby reducing the number of components.

In order to achieve the above object, the fourteenth air conditioning device in accordance with the present invention includes:

rectification means for rectifying an AC voltage outputted from an AC power source;

smoothing means for smoothing an AC voltage rectified by the rectification means to be converted into a DC voltage;

a DC voltage-AC voltage conversion means for converting by chopping the DC voltage from the smoothing means into an AC voltage whose voltage and frequency vary to be applied to a power compressor;

an active filter formed between the rectification means and the smoothing means, the active filter shaping an input current to be an approximate sine wave almost in phase with an input voltage by adjusting a flow of current into the smoothing means by switching a switching element;

input voltage detection means for detecting an input voltage to the active filter;

waveform generation means for generating a sine wave like waveform according to a phase angle of the input current of the active filter; and phase synchronization means for synchronizing the sine wave like waveform with a phase of the input voltage of the active filter; and switching control means for controlling a switching of the switching element based on the sine wave like waveform in synchronous with the input voltage.

According to the fourteenth air conditioning device, the sine wave like waveform generated from the wave generation means is used in place of the waveform of the actual input current. The sine wave like waveform is made to be in phase with the input voltage. Then, the switching of the switching element is controlled by the switching control means based on the sine wave like waveform in phase with the input voltage by the switching control means.

Therefore, even when a large distortion of the input current occurs, by adopting the sine wave like waveform, the switching can be controlled to achieve the target value without being affected. In general, the described sine wave like waveform is generated in a digital form by the calculation by the computer, etc. As a result, an improved noise resistance of the waveform can be achieved, thereby enabling a stable switching control.

For a fuller understanding of the nature and advantages of the invention, reference should be made to the ensuing detailed description taken in conjunction with the accompanying drawings.

DESCRIPTION OF THE EMBODIMENTS

First Embodiment

Figure 2:
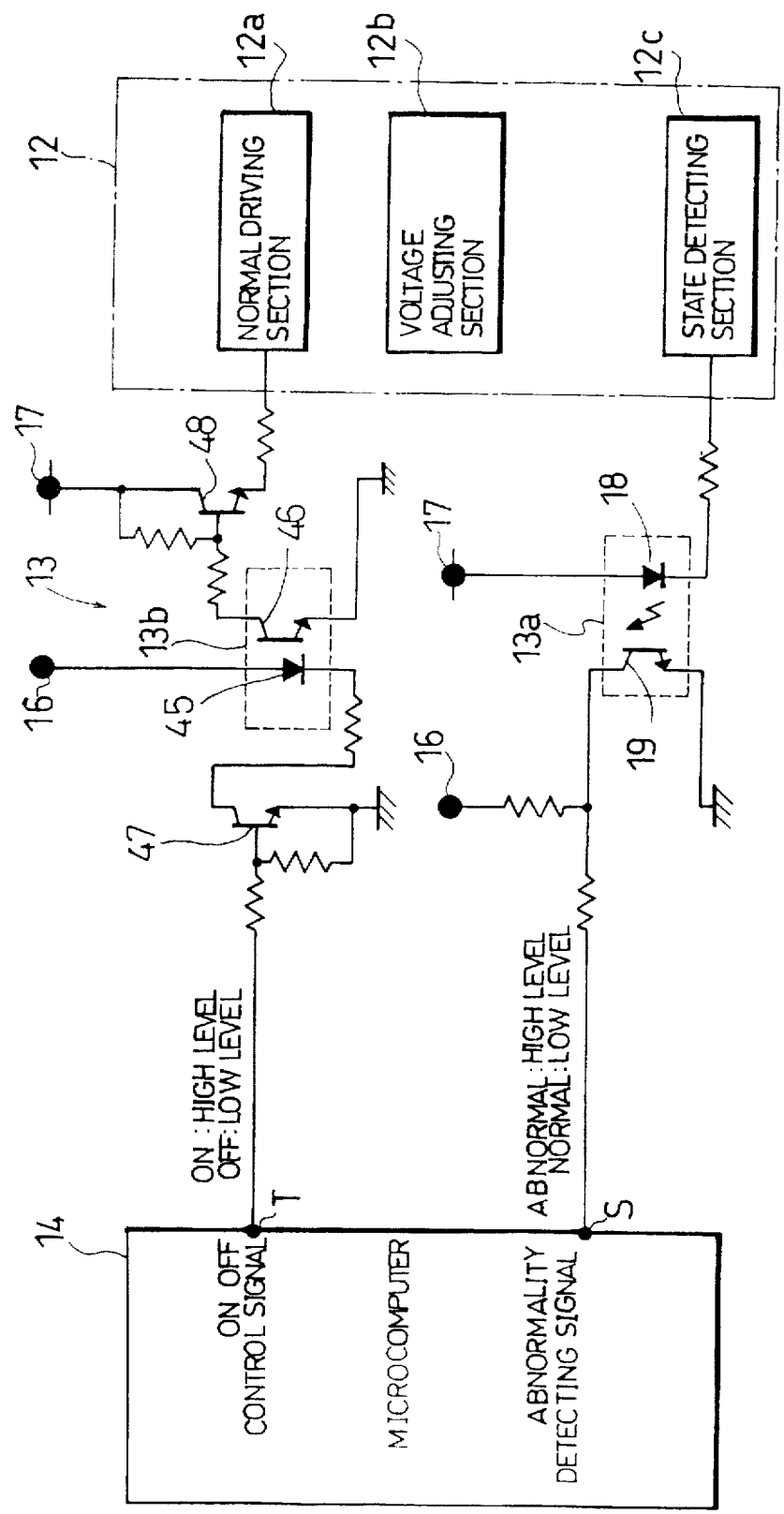
FIG. 2 is a schematic circuit diagram depicting the structure of a circuit for sending a signal between a microcomputer and a switching control section in the air conditioner of FIG. 1.
Figure 3:
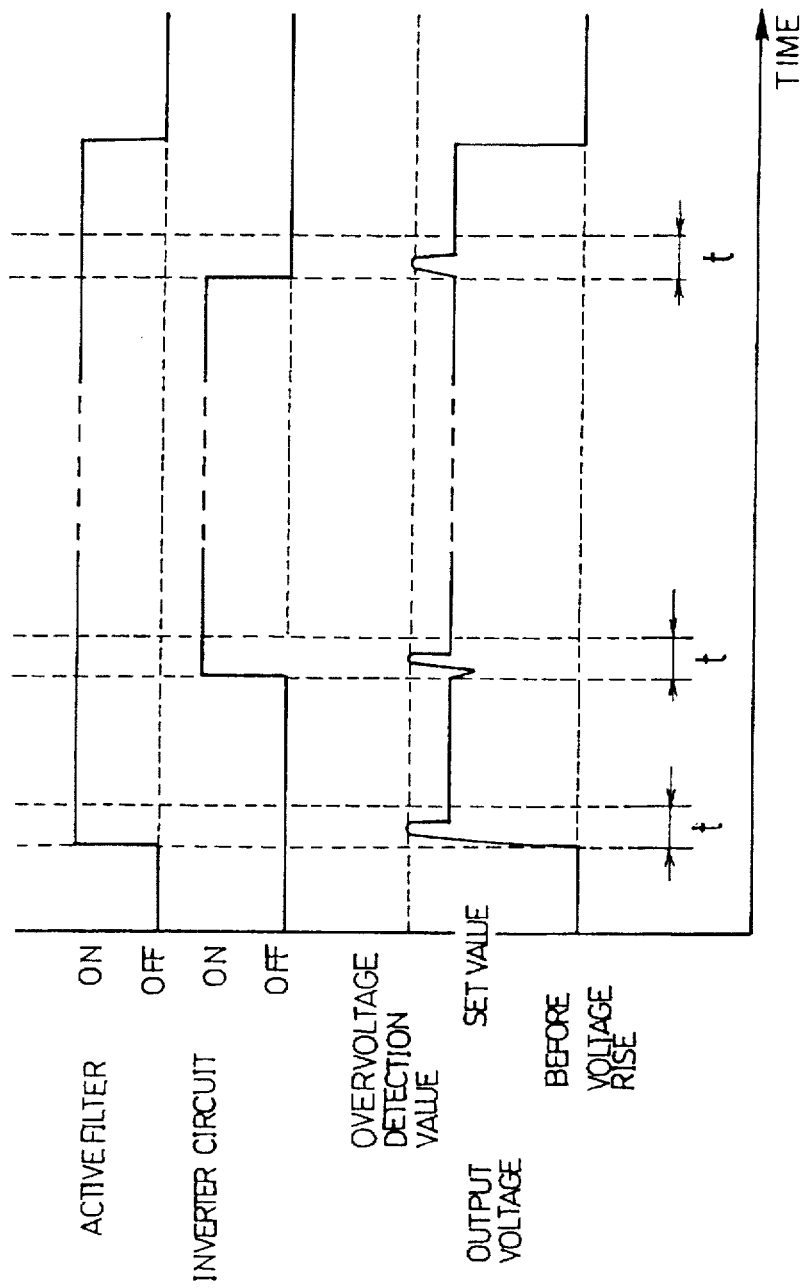
FIG. 3 is a view showing a waveform representing the operation of an active filter and an inverter circuit in the air conditioner of FIG. 1.

The following descriptions will discuss one embodiment of the present invention in reference to FIG. 1 through FIG. 3.

As shown in FIG. 1, an air conditioning device in accordance with the present embodiment includes a bridge rectifying circuit 2, a smoothing condenser 3, an inverter circuit 4 and an active filter 5 as a power source system. The air conditioning device also includes an input voltage detecting section 7, an output voltage detecting section 8, an inverter control section 11, a switching control section 12 and an interface section 13 (I/F in figures) as a control system. The inverter control section 11 is composed of a microcomputer 14 and a driving circuit 15.

The power source system is provided for generating a DC voltage by rectifying an output from a commercial power source 1 in a bridge rectifying circuit 2 and smoothing it by the smoothing condenser 3. Further, based on the DC voltage, an AC voltage of three phases is generated by the inverter circuit 4 to be applied to a power compressor 6.

The inverter circuit 4 includes six transistors 21 through 26 and six diodes 31 through 36. The transistors 21 and 22, the transistors 23 and 24 and the transistors 25 and 26 are respectively connected in series between two AC power source lines. On the other hand, the diodes 31 through 36 are respectively connected to the transistors 21 through 26 in parallel. The inverter circuit 4 outputs an AC voltage of three phases by switching the transistors 21 through 26 under the control of the microcomputer 14.

The power compressor 6 is connected to respective junctions between the transistors 21 and 22, the transistors 23 and 24 and the transistors 25 and 26. The power compressor 6 is actuated by the AC voltage of three phases from the inverter circuit 4.

In the power source system, the active filter 5 is connected between the bridge rectifying circuit 2 and the smoothing condenser 3. The active filter 5 includes a choke coil 41, a fast recovery diode 42 and a power transistor 43. In the present embodiment, an insulating gate bipolar transistor is adopted as the power transistor 43. However, other high speed switching element may be used.

The choke coil 41 and, the fast recovery diode 42 are provided in series on the positive electrode side of the power source line. The power transistor 43 (switching element) is arranged such that a collector thereof is connected to a junction of one end of the choke coil 41 and an anode of a fast recovery diode 42, and an emitter thereof is connected to the power source line on the negative electrode side.

The active filter 5 is provided for improving a harmonic suppression and a power factor. The active filter 5 controls a current flowing through the choke coil 41 with respect to the current flowing into the smoothing condenser 3 through the choke coil 41 and the fast recovery diode 42 by switching the power transistor 43.

In the control system, the microcomputer 14 controls switching of the transistors 21 through 26 according to an air conditioning load so as to control an output frequency of the inverter circuit 4. The microcomputer 14 activates the switching circuit 12 in synchronous with a starting time of the power compressor 6.

On the other hand, the switching control section 12 controls an output voltage from the active filter 5 by controlling the pulse width of the switching control signal to be applied to a control electrode of the power transistor 43. The switching control section 12 performs a feedback control so as to maintain the output voltage from the active filter 5 constant.

The input voltage detecting section 7 includes a voltage dividing circuit composed of, for example, a resistor. The input voltage detecting section 7 divides and detects an input voltage to the active filter 5 generated between the rectifying power source lines. The output voltage detecting section 8 also includes the same voltage dividing circuit. The output voltage detecting section 8 divides and detects an output voltage from the active filter 5 generated between the DC power source lines.

The switching control section 12 includes a normal driving section 12a, a voltage adjusting section 12b and a state detecting section 12c.

Based on the control signal from the microcomputer 14 (to be described later), the normal driving section 12a generates a switching control signal based on the input voltage detected by the input voltage detecting section 7. More specifically, the normal driving section 12a controls the ON/OFF of the power transistor 43 so as to adjust the current flowing into the smoothing condenser 3 from the choke coil 41 through the fast recovery diode 42, synchronous with the input voltage waveform from the bridge rectifying circuit 2. By the operation of the normal driving section 12a, the input current waveform is shaped to be an approximate sine wave.

The voltage adjusting section 12b controls an output voltage by varying the time duration of the ON/OFF of the power transistor 43 according to a change in output voltage detected by the output voltage detecting section 8. The output voltage of the active filter 5 is adjusted to the voltage value set by the microcomputer 14.

The state detecting section 12c detects if an abnormality has occurred in the active filter 5 based on the output voltage detected by the output voltage detecting section 8. More specifically, the state detecting section 12c outputs an abnormality detecting signal when the detection voltage from the output voltage detecting section 8 is set below a predetermined level so as to detect the active filter 5 in the abnormal state or the stop state.

The microcomputer 14 controls each section of the air conditioner based on the content set by the operating section (not shown) provided in a main body of the air conditioner of the present embodiment. The microcomputer 14 outputs a drive control signal to the driving circuit 15 based on the output voltage detected by the output voltage detecting section 8. The driving circuit 15 generates a drive signal to be applied to a base of the transistors 21 through 26 at a timing based on the control signal.

The microcomputer 14 stops the inverter circuit 4 upon detecting the occurrence of abnormality in the active filter 5 by the state detecting section 12c. Further, the microcomputer 14 determines that the power compressor 6 is in the stop state or an abnormality has occurred in the inverter circuit 4 when a detected voltage by the output voltage detecting section 8 exceeds a predetermined value, and is further raised above a predetermined voltage value and stops the active filter 5.

A circuit for connecting the microcomputer 14 and the switching control section 12 will be explained.

The microcomputer 14 and the switching control section 12 are electrically insulated, and are driven independently respectively by the power sources 16 and 17. A communication of the signal is performed optically through the interface section 13 between the microcomputer 14 and the switching control section 12.

As shown in FIG. 2, the interface section 13 is composed of the photocouplers 13a and 13b. The photocoupler 13a is composed of a light emitting diode 18 and a photo transistor 19. The photocoupler 13b is composed of a light emitting diode 45 and a photo transistor 46. The photocoupler 13a and the state detecting section 21c are included in the abnormality detection means, for example.

The light emitting diode 18 is arranged such that an anode thereof is connected to the power source 17, and a cathode thereof is connected to the state detecting section 12c. The photo transistor 19 is arranged such that the collector is connected to an abnormality detection port (hereinafter simply referred to as a port) S of the microcomputer 14 and the power source 16.

The light emitting diode 45 is arranged such that an anode thereof is connected to the power source 16 and a cathode thereof is connected to the control signal output port (hereinafter simply referred to as a port) T of the microcomputer 14 through the transistor 47. The photo transistor 46 is arranged such that the collector is connected to the power source 17 and to the normal driving section 12a through the transistor 48.

In the state where the switching control section 12 is normally operated by the power supplied from the power source 17, the photocoupler 13a is set in the ON position in the described circuit. As a result, a low level signal is always inputted to the port S in the microcomputer 14.

In response to the low level signal inputted to the port S, the microcomputer 14 determines that the active filter 5 and the switching control section 12 are in the normal state, and transmits a high level ON signal from the port T. In response to the ON signal, the photocoupler 13b is set in its ON position, and the power is supplied to the normal driving section 12a from the power source 17. As a result, the normal driving section 12a is set in the operable state.

On the other hand, if an abnormality has occurred which cause the power supply to the switching control section 12 to stop, the photocoupler 13a is set in its OFF position. As a result, the high level signal is inputted to the port S of the microcomputer 14. Even when the switching control section 12 is in the normal state, if an abnormality in the active filter 5 is detected by the state detecting section 12c, the photocoupler 13a is set in the OFF position, and a high level signal is inputted to the port S.

In response to the signal of the high level inputted to the port S, the microcomputer 14 determines that an abnormality has occurred in at least one of the active filter 5 and the switching control section 12, and transmits a low level OFF signal from the port T. Then, the photocoupler 13b is turned OFF by an OFF signal, and a power is not supplied to the normal driving section 12a from the power source 17. As a result, the normal driving section 12a is set in an inoperable state.

According to the air conditioner in accordance with the present invention, upon pressing a start button of the operational unit, a high level ON signal is transmitted from the port T of the microcomputer 14 so as to set the photocoupler 13b in the ON position. Then, the power is supplied to the switching control section 12. As a result, as shown in FIG. 3, the active filter 5 starts driving, and after an elapse of a predetermined time, the inverter circuit 4 also starts driving.

In the power source system, the AC voltage from the commercial power source 1 is full wave rectified by the bridge rectifying circuit 2, and then inputted to the active filter 5. The switching control section 12 switches ON/OFF the power transistor 43 according to a control signal from the microcomputer 14 so that the output voltage from the active filter 5 becomes the set value.

Since the power transistor 43 is set in the OFF position when the current flowing through the choke coil 41 is set to a predetermined value, the power is stored in the choke coil 41. On the other hand, since the power transistor 43 is turned ON when the current flowing through the collector and the emitter becomes higher than a predetermined value, the power stored in the choke coil 41 is released.

As a result, the input current waveform becomes a sine wave in phase with the input voltage waveform, and the output voltage from the active filter 5 is raised to a predetermined value. The raised output voltage is smoothened by the smoothing condenser 3, and then supplied to the inverter circuit 4. As a result, the generation of the harmonic current can be suppressed, and the power factor can be improved, thereby achieving an effective use of the power source.

On the other hand, when the inverter circuit 4 starts driving, a drive control signal is outputted from the microcomputer 14 to the driving circuit 15. Then, the driving circuit 15 switches the six transistors 21 through 26. As a result, the output voltage from the active filter 5 is chopped. The power compressor 6 is driven with an application of the chopped voltage (PWM waveform). By driving the power compressor 6 in the described manner, the air conditioner of the present invention starts driving.

During the operation of the air conditioner in accordance with the present invention, the switching control section 12 always detects an output voltage from the active filter 5 by the output voltage detecting section 8. The switching control section 12 adjusts the output voltage by varying the time duration of the ON/OFF of the power transistor 43 according to the change in the output voltage.

The photocoupler 13a is always set in the ON position by the state detecting section 12c, and thus a low level signal is inputted to the port S of the microcomputer 14. Then, from the low level signal, the microcomputer 14 determines that the active filter 5 or the switching control section 12 is in the normal state, and continues the normal operation of the air conditioner of the present embodiment.

By stopping the supply of the power, for example, when an abnormality occurs in the active filter 5 or the switching control section 12, the photocouplers 13a and 13b are turned OFF in the interface section 13. Thus, the active filter 5 is stopped driving, and the application voltage to the power compressor 6 becomes short, thereby presenting the problem that th e power compressor 6 is easily locked, or may even stop operating.

In order to counter act the above-mentioned problem, the photocoupler 13a is set in the OFF position, so that the signal of the high level is inputted to the port S. in response to the input signal, the microcomputer 14 determines that an abnormality has occurred in the active filter 5 or the switching control section 12, and stops the operation of the inverter circuit 4 immediately.

The shortage of the application voltage to the power compressor 6 due to the abnormality occurred in the active filter 5 can be prevented by other arrangements (to be described later).

Furthermore, the microcomputer 14 always detects the output voltage from the active filter 5 by the output voltage detecting section 8. For example, when the operation of the power compressor 6 is stopped, or the abnormality has occurred in the inverter circuit 4, the output voltage would exceed the set value and is further raised above an overvoltage detection value (shown in FIG. 3). Then, a low level OFF signal is sent from the port T of the microcomputer 14. In response to the low level OFF signal, the photocoupler 13b is set in the OFF position. When the photocoupler 13b is set in the OFF position, as the power supply to the normal driving section 12a is stopped, the active filter 5 would be stopped operating.

Additionally, when the active filter 5 or the inverter circuit 4 is stopped due to the abnormality occurred therein, the user would be informed by an LED, buzzer, etc., formed on the indoor unit of the air conditioner of the present embodiment. In the case where the air conditioner of the present embodiment is stopped by pressing the stop button in the operational unit, or by automatically stopping the air conditioner by the timer, the inverter circuit 4 also stops driving. After a predetermined time has elapsed after stopping the inverter circuit, the active filter 5 is also stopped driving, thereby terminating the operation of the air conditioner.

As described, a signal is transmitted and received between the microcomputer 14 and the switching control section 12 through the interface section 13 composed of the photocouplers 13a and 13b. Therefore, when an abnormality has occurred in the active filter 5 or the switching control section 12, a signal of the high level is inputted to the port S so as to inform the microcomputer 14 of the occurrence of the abnormality. As a result, the active filter 5 can be prevented from being driven by the microcomputer 14 even when the abnormality has occurred.

The microcomputer 14 stops the inverter circuit 4 upon detecting the abnormal state or the stop state of the active filter 5 or the switching control section 12. As a result, the power compressor 6 can be prevented from being locked due to the shortage of the application voltage.

Furthermore, when the output voltage from the active filter 5 is raised above the overvoltage detection value, the microcomputer 14 determines that the inverter circuit 4 is in the abnormal state or the stop state and stops the operation of the active filter 5. As a result, the smoothing condenser 3 and the inverter circuit 4 can be prevented from breaking due to the overvoltage, and the occurrence of the secondary fault can be prevented.

When the active filter 5 starts driving, the output voltage is raised with respect to the input voltage. Here, in response to the time lag of the feedback through the output voltage detecting section 8, as shown in FIG. 3, the output voltage may be raised above the overvoltage detection value for an instant. Furthermore, since a steady output voltage cannot be achieved also when the inverter circuit 4 starts and stops driving, the overvoltage may be generated as in the aforementioned case. In this case, although each section is being driven in a normal condition, the microcomputer 14 determines it to be in the abnormal condition by the overvoltage protecting function and stops the active filter 5.

As shown in FIG. 3, in the microcomputer 14, an abnormality detection inhibiting period t, in which the detection of the abnormality is not performed, is set immediately after starting and stopping the driving of the inverter circuit 14 or immediately after starting the driving of the active filter 5. Therefore, even if the high level signal is inputted to the port S in the abnormality detection inhibiting period neither, the active filter 5 nor the inverter circuit 4 would not be stopped. As a result, the problem that the active filter 5 and the inverter circuit 4 are stopped in the normal operation can be prevented, thereby driving the air conditioner of the present invention in a stable condition.

In the present embodiment, the state detecting section 12c is formed in the switching control section 12. However, the present invention is not limited to this, and the state detecting section 12c may be actuated by a separately provided power source from the microcomputer 14 or the switching control section 12. Alternatively, it may be also arranged such that the microcomputer 14 also serves as the state detecting section 12c for directly detecting the state of the active filter 5 or the switching control section 12.

Another arrangement for preventing the shortage of the power of the power compressor 6 will be explained.

Figure 4:
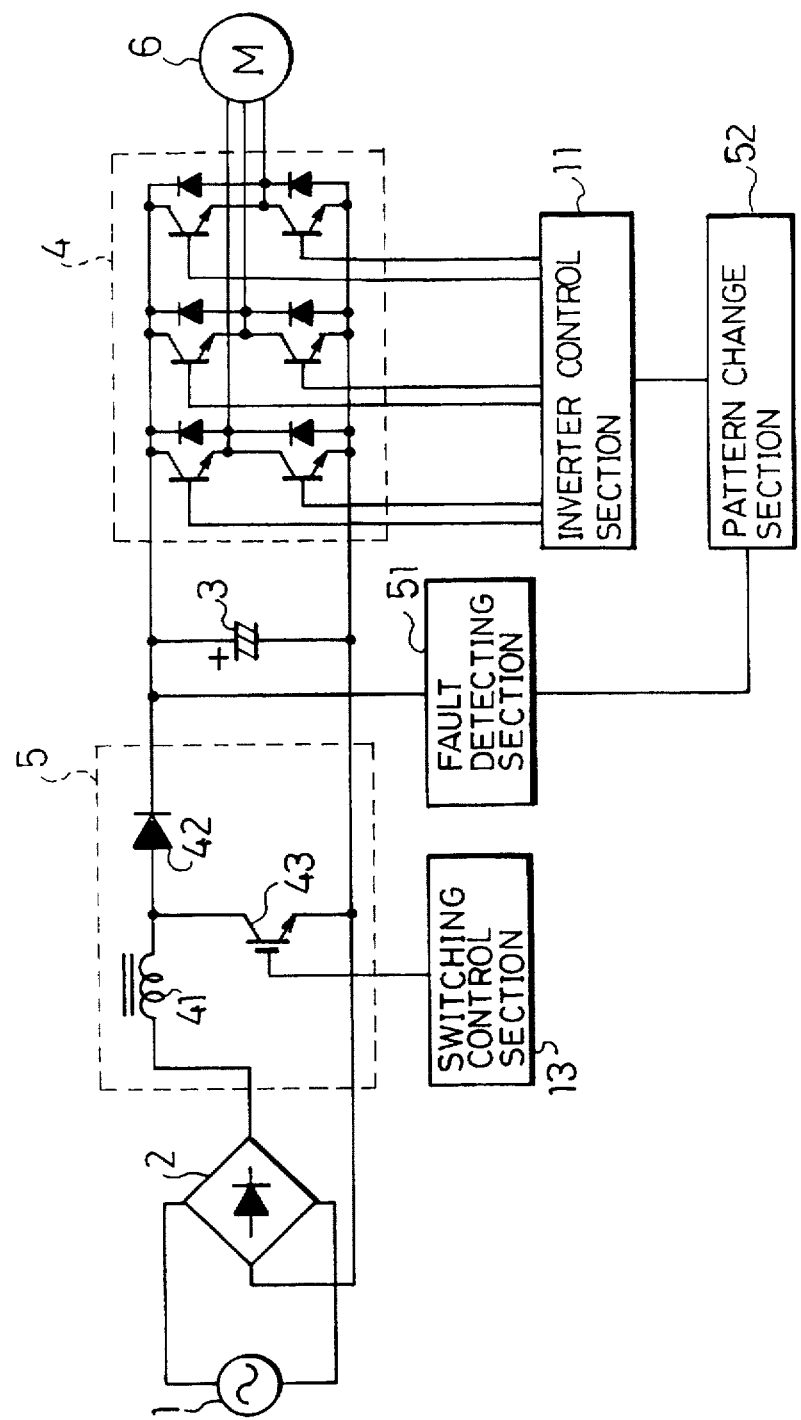
FIG. 4 is a circuit diagram depicting another structure of the air conditioner of FIG. 1 to compensate an applied voltage to a power compressor when the active filter breaks.

As shown in FIG. 4, the described arrangement includes a fault detecting section 51 for detecting the fault of the active filter 5 and the pattern change section 52.

The fault detecting section 51 may be the circuit for detecting the fault of the active filter 5, for example, by detecting the load state of the power compressor 6. The fault detecting section 51 may be an output voltage detecting section 8 or the circuit for detecting the load current. When using the output voltage detecting section 8 as the fault detecting section 51, the stoppage of the power compressor 6 is detected by a drop in output voltage.

The pattern change section 52 changes the table of the V/F pattern which represent the correlation between the driving signal voltage to be applied to the inverter circuit 4 from the inverter control section 11 and the operating frequency.

Figure 5A:
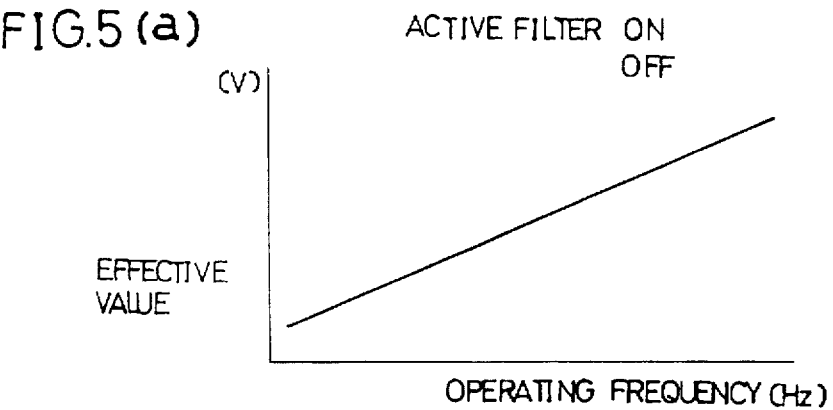
FIG. 5(a) is a graph showing the relation between an operating frequency of the power compressor set invariably whether the active filter is broken or not and an effective value of the output from the inverter circuit.
Figure 5B:
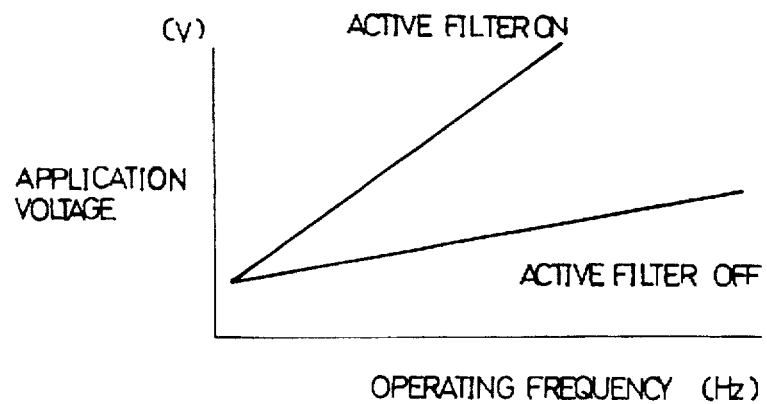
FIG. 5(b) is a graph showing the relation between the operating frequency and an applied voltage of the power compressor when the active filter operates normally and the same is broken.

Normally, the correlation between the effective value of the output voltage from the inverter circuit 4 and the operating frequency is on the assumption that the active filter 5 is being operated. Therefore, as shown in FIG. 5(a), the correlation is determined by the V/F pattern. However, when the active filter 5 is in failure, since the voltage rising operation by the active filter 5 cannot be performed, as shown in FIG. 5(b), the voltage to be actually applied to the power compressor 6 would drop.

Figure 6A:
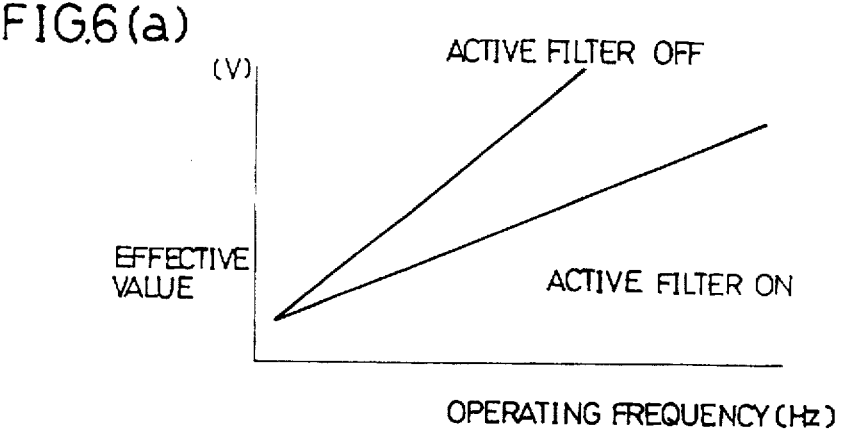
FIG. 6(a) is a graph showing the relation between the operating frequencies of the power compressor set separately when the active filter operates normally and the same is broken, and the effective value of the output from the inverter circuit.

On the other hand, in the event of a failure in the active filter 5, the pattern change section 52 changes the V/F pattern (the linear line representing the off position of the active filter) as shown in FIG. 6(a). As a result, when a failure occurs in the active filter 5, the output voltage of the active filter 5 becomes higher than the normal operation state, and the effective value of the output voltage from the inverter circuit 4 with respect to the operating frequency of the power compressor 6 becomes higher than the normal operation state of the active filter 5.

Figure 6B:
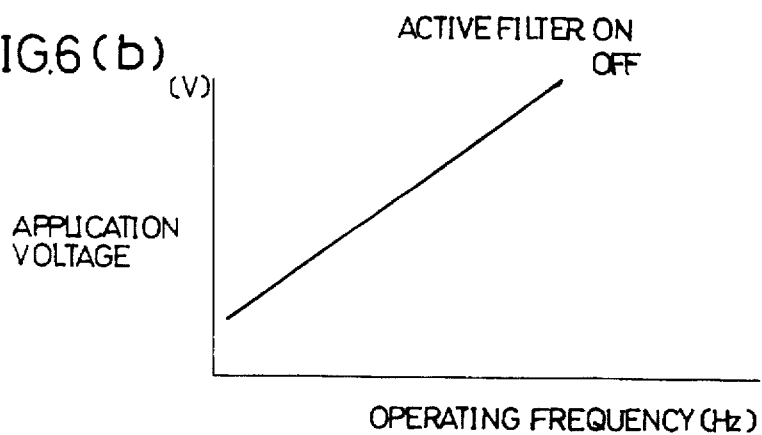
FIG. 6(b) is a graph showing the relation between the operating frequency and an applied voltage of the power compressor when the active filter operates normally and the same is broken.

As a result, the correlation between the voltage to be actually applied to the power compressor 6 and the operating frequency is maintained constant irrespective of the state of the active filter 5 (normal or abnormal) as shown in FIG. 6(b). Therefore, even if a failure occurs in the active filter 5, the operation of the air conditioner can be continued without stopping the power compressor 6.

However, in the described state, since the operation is continued, it is required to inform the user of the failure of the active filter 5. As previously mentioned, the LED, the buzzer, etc., is used for informing the user that it is not in the normal operational mode. Since this enables the operation of the air conditioner to be continued as an emergency operation until the serviceman arrives, the user can manage the failure more efficiently.

Second Embodiment

The following description will discuss the second embodiment of the present invention in reference to FIG. 7 through FIG. 22. For convenience in explanations, members having the same functions as the first embodiment will be designated by the same reference numerals, and thus the description thereof shall be omitted here.

Figure 7:
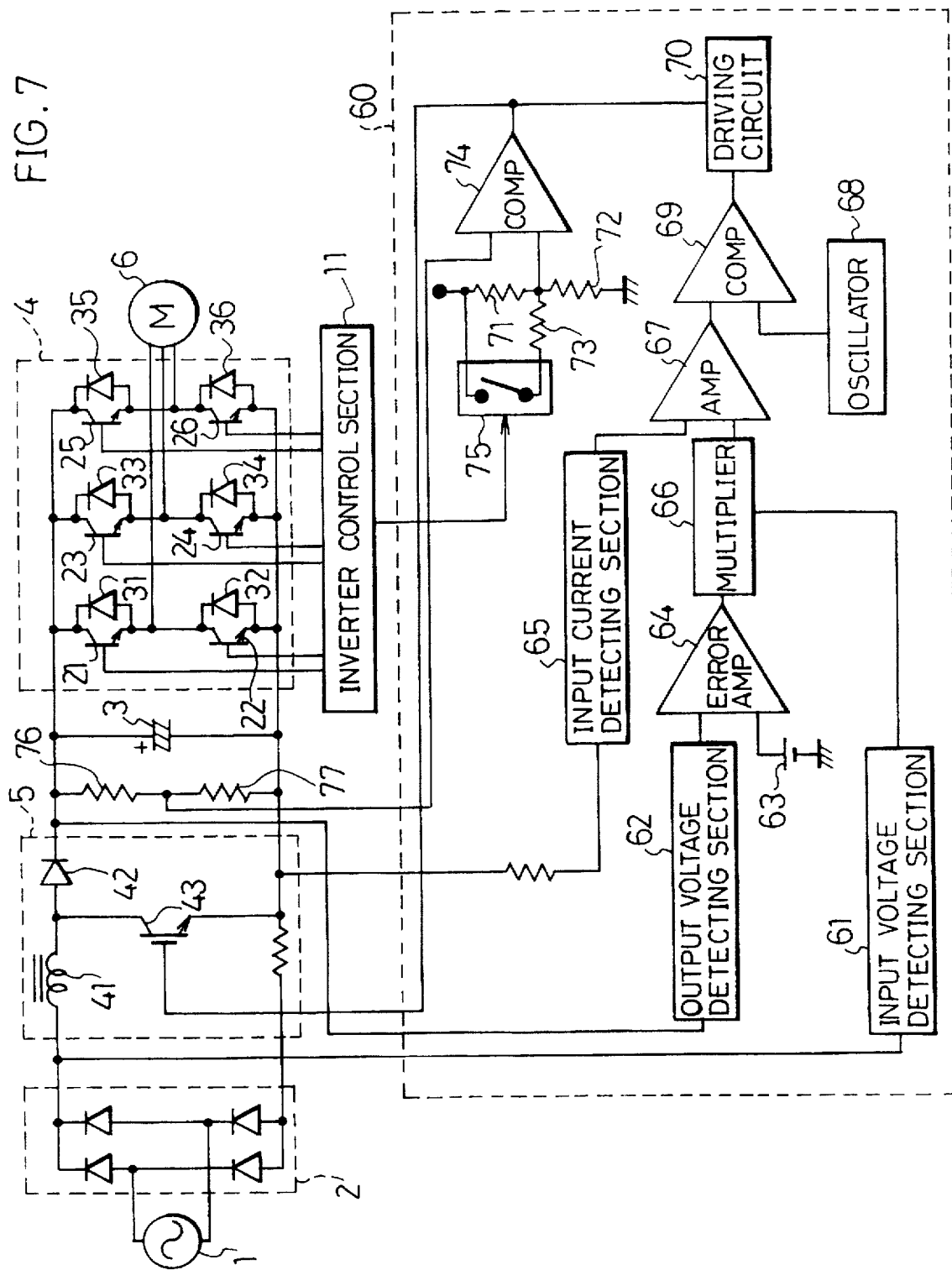
FIG. 7 is a schematic circuit diagram depicting the structure of an air conditioner in accordance with the second embodiment of the present invention.

As shown in FIG. 7, an air conditioner in accordance with the present embodiment is provided with the switching control section 60. The switching control section 60 is provided for controlling the output voltage from the active filter 5 by controlling a pulse width of a switching control signal to be applied to a control electrode of the power transistor 43. The switching control section 60 performs a feedback control so as to maintain an output voltage from the active filter 5 constant.

The switching control section 60 includes an input voltage detecting section 61, an output voltage detecting section 62, a reference power source 63, an error amplifier 64, an input current detecting section 65, a multiplier 66, an amplifier 67, an oscillator 68, a comparator 69 and a driving circuit 70. The switching control section 60 includes resistors 71 through 73 as the overvoltage protection circuit, a comparator 74 and a switch 75.

Other than the resistors 71 through 73, the comparator 74 and the switch 75, the overvoltage protecting circuit includes resistors 76 and 77. The resistors 76 and 77 are formed between the active filter 5 and the smoothing condenser 3 in the power source system, for dividing and detecting the output voltage from the active filter 5.

Figure 50:
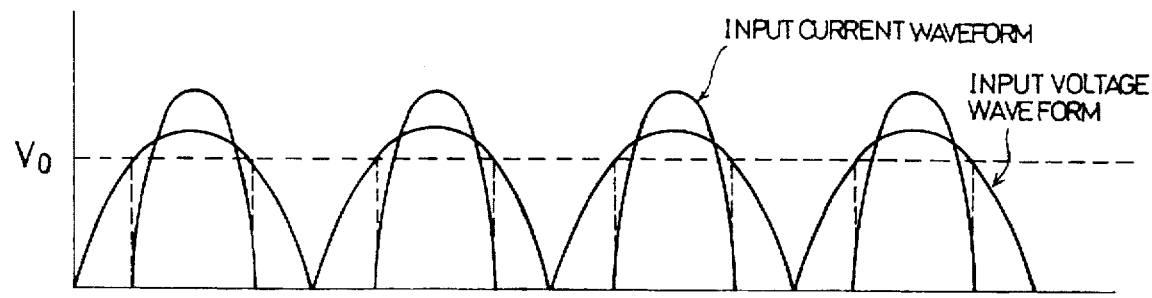
FIG. 50 is a view showing a waveform representing an input voltage and an input current to a condenser input type power source circuit.
Figure 51:
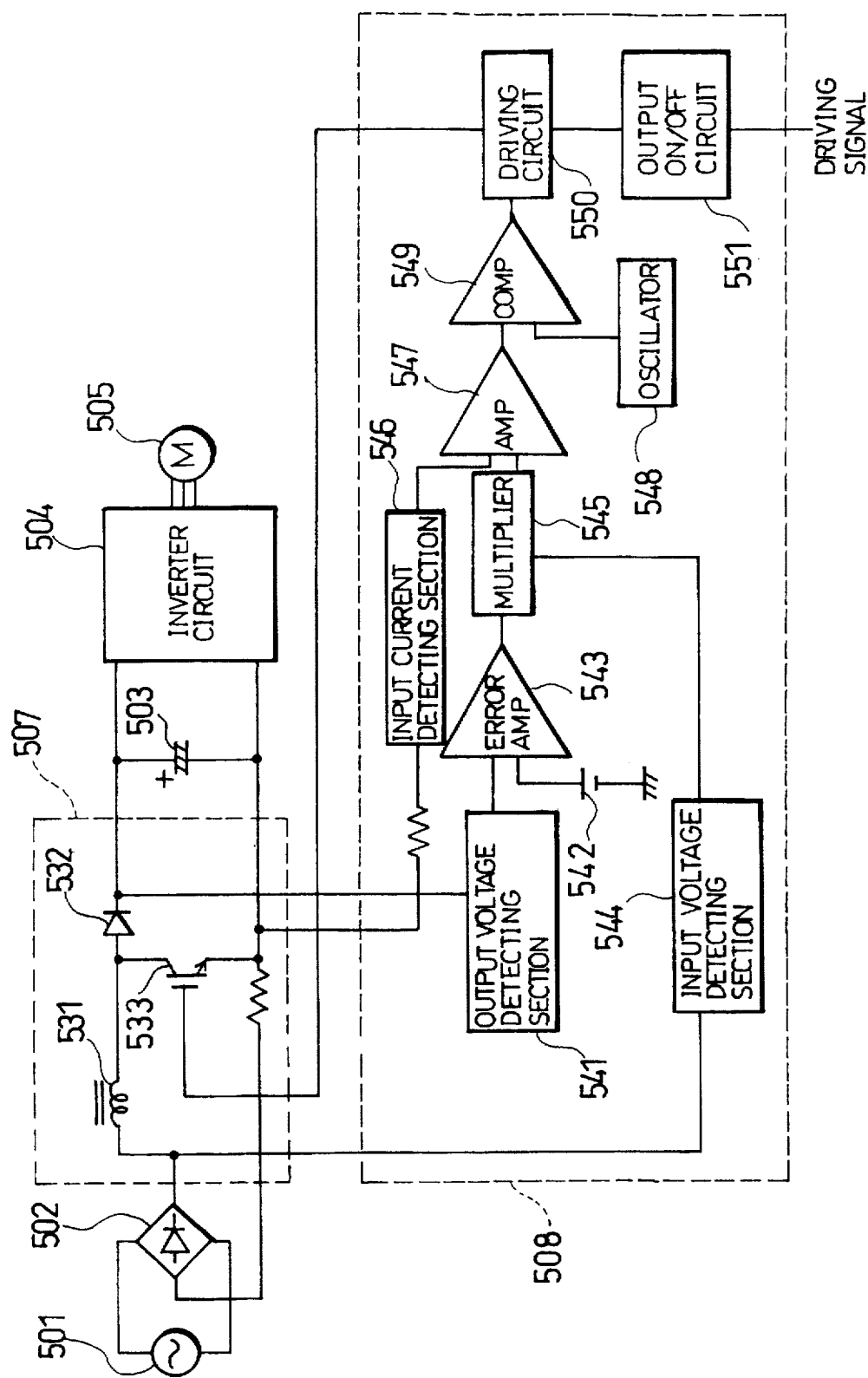
FIG. 51 is a detailed schematic circuit diagram depicting the structure of a switching control section in the air conditioner of FIG. 49.
Figure 52:
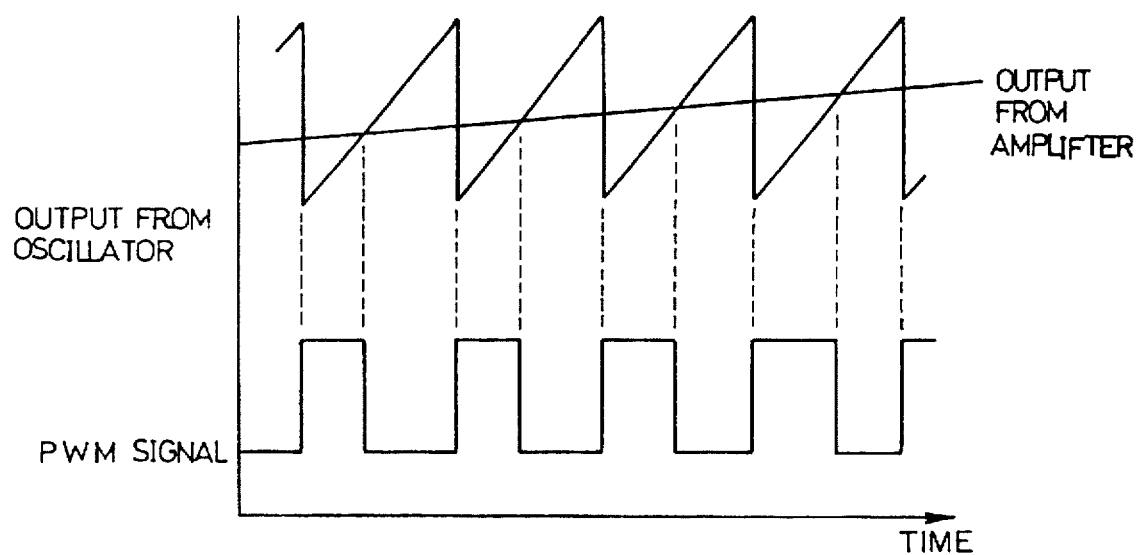
FIG. 52 is a view showing a waveform representing the operation of a PWM circuit.
Figure 53:
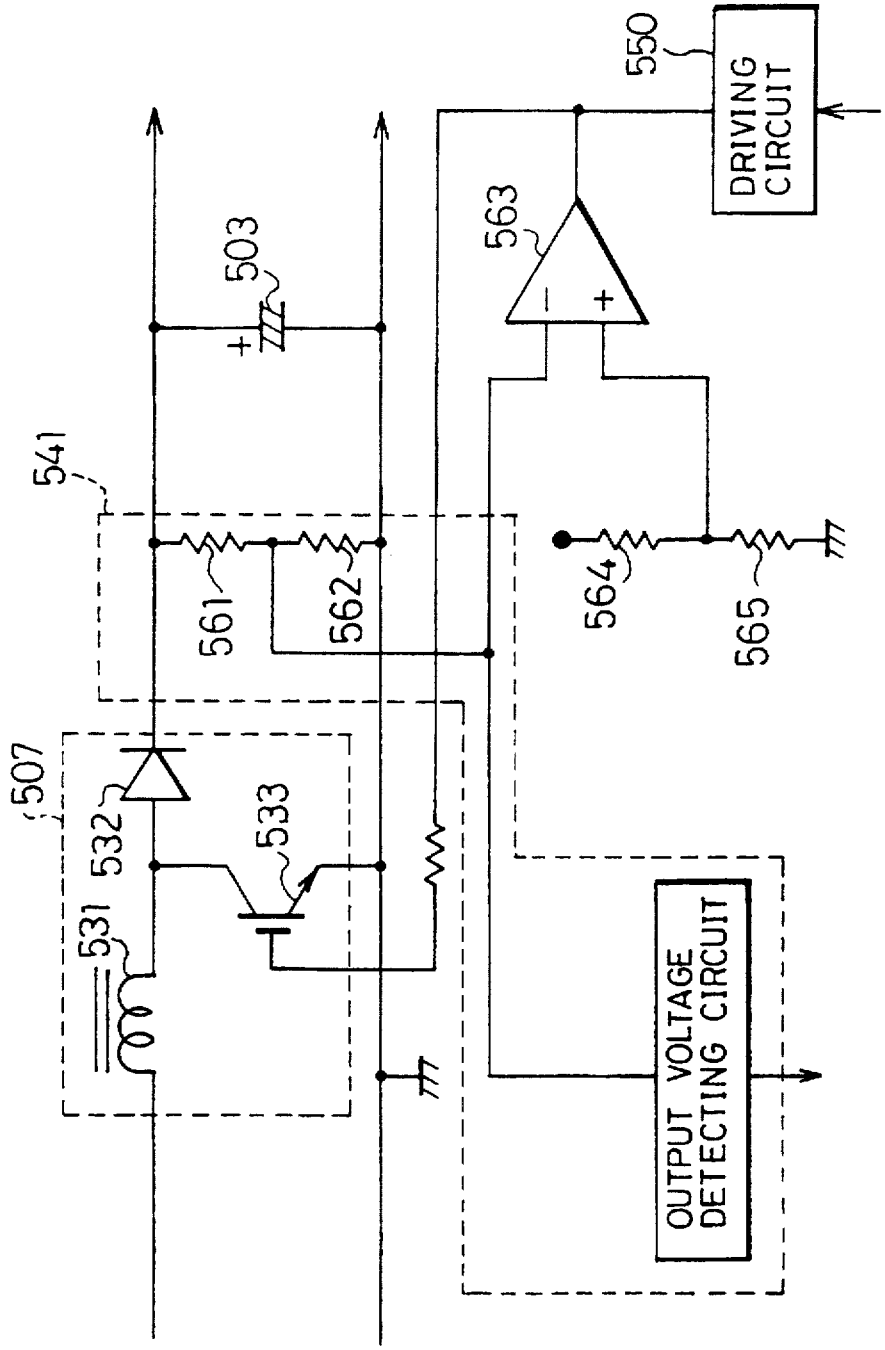
FIG. 53 is a schematic circuit diagram depicting the structure of an overvoltage protection circuit employed in the conventional air conditioner.
Figure 54:
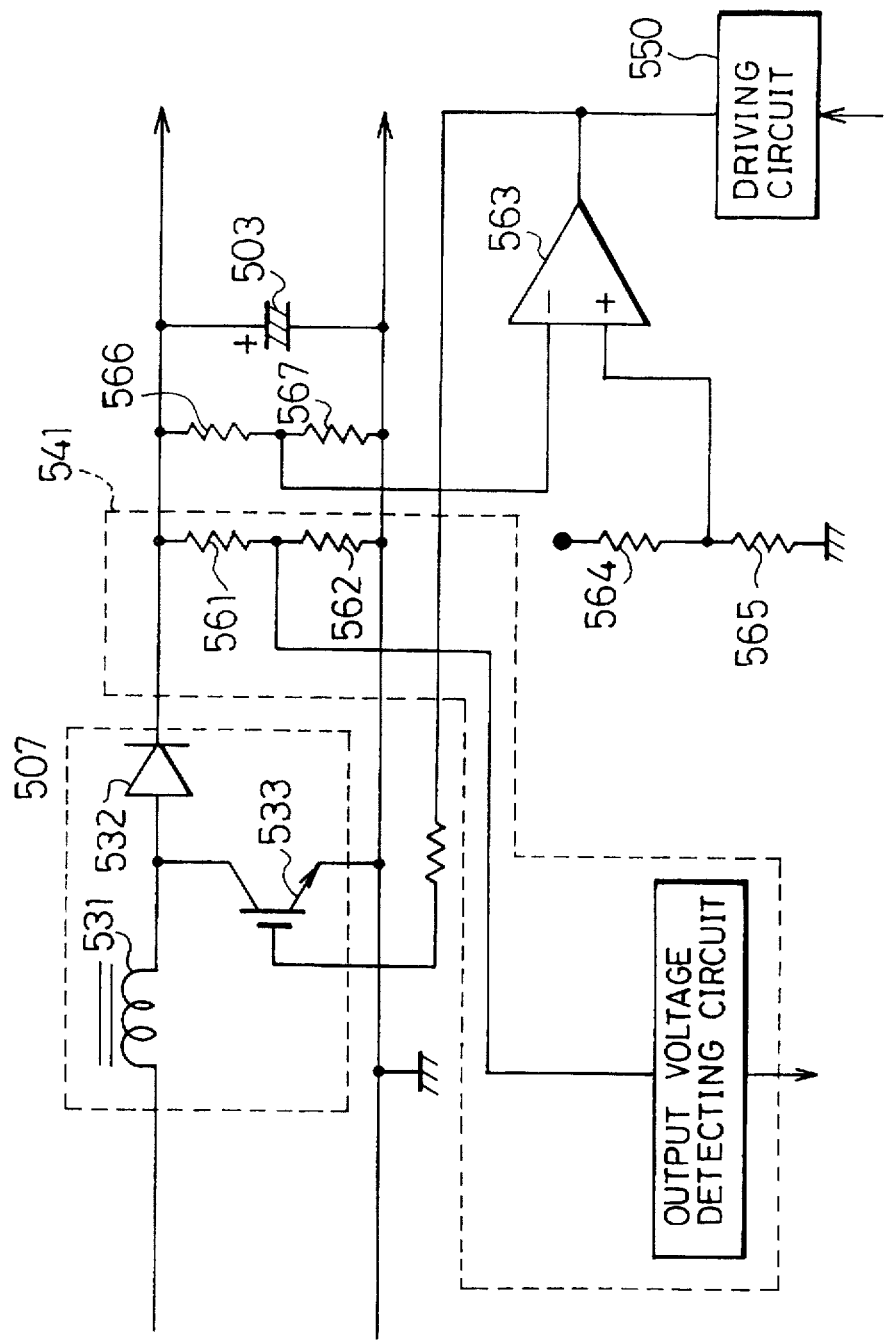
FIG. 54 is a schematic circuit diagram depicting the structure of another overvoltage protection circuit employed in the conventional air conditioner.
Figure 55:
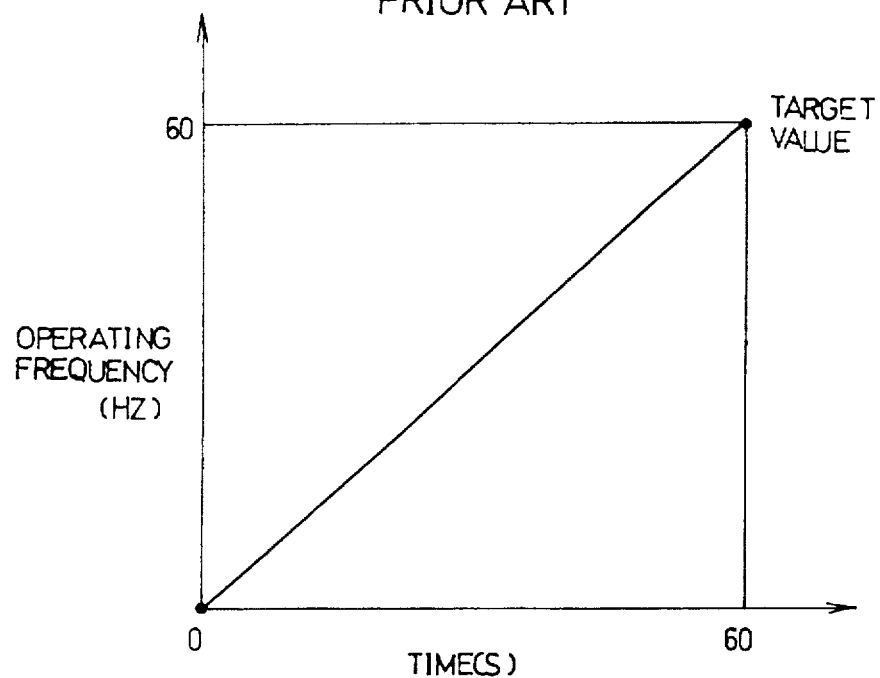
FIG. 55 is a graph showing how the operating frequency of a power compressor is changed at a regular changing speed in the conventional air conditioner.
Figure 56:
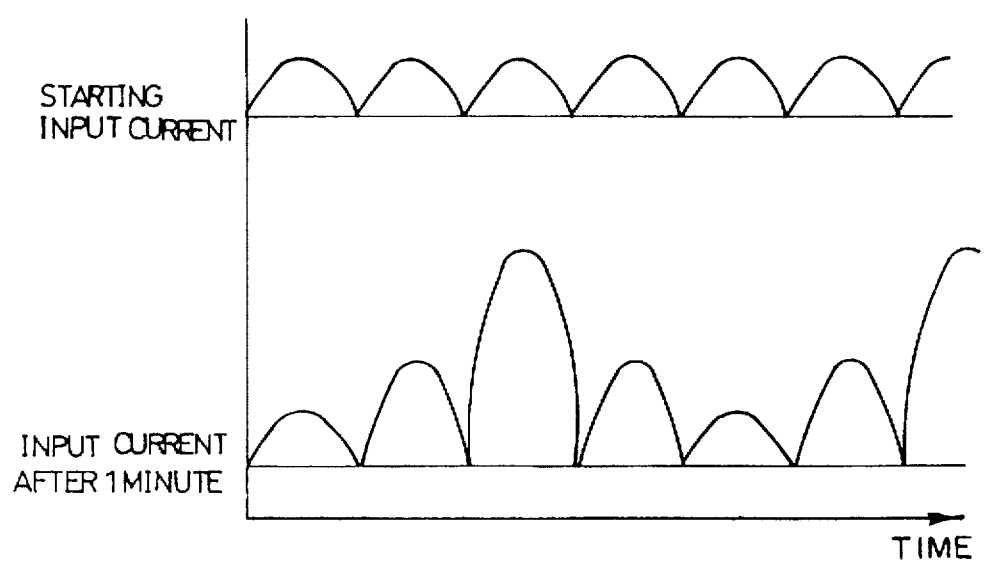
FIG. 56 is a view showing a waveform representing an input current to the active filter, which correspondingly changes before and after the operating frequency is changed.
Figure 57:
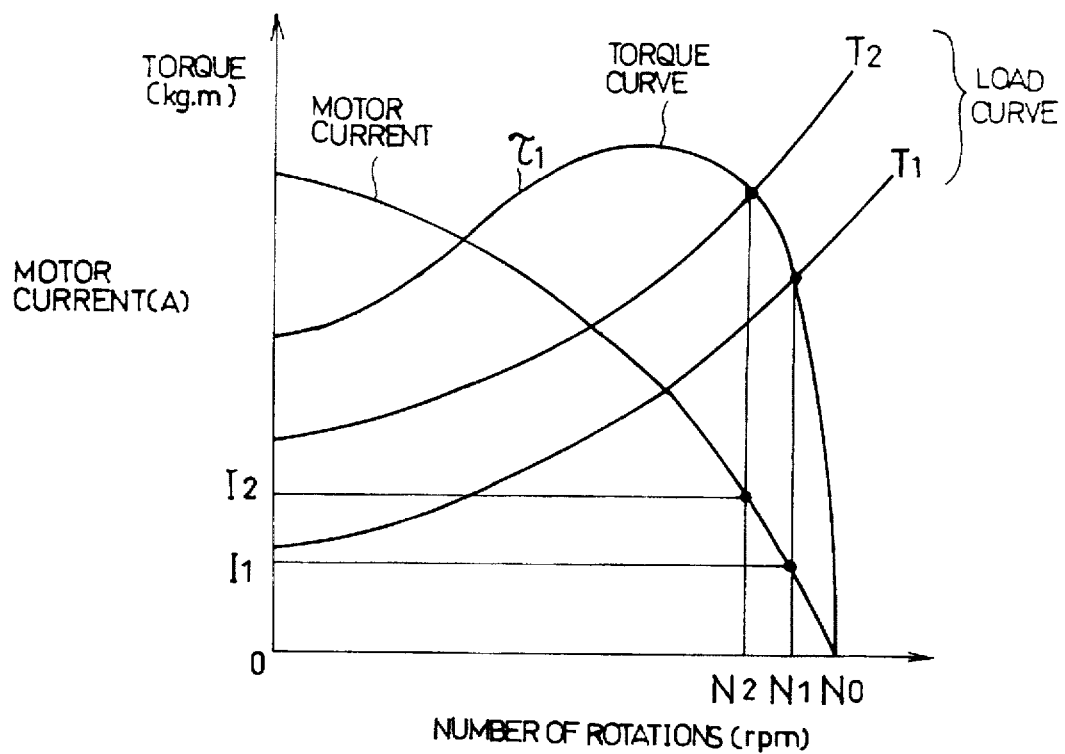
FIG. 57 is a view showing the characteristics of a typical power compressor.

A main control section composed of the input voltage detecting section 61, the output voltage detecting section 62, the reference power source 63, the error amplifier 64, the input current detecting section 65, the multiplier 66, the amplifier 67, the oscillator 68, the comparator 69 and the driving circuit 70 has almost the same function as the switching control section in the aforementioned conventional air conditioner (see FIG. 50).

Namely, in the main control section, the DC voltage generated in the smoothing condenser 3 is detected by the output voltage detecting section 62, and the voltage difference between the detected value and the reference voltage generated from the reference power source 63 is outputted from the error amplifier 64. In the multiplier 66, the difference voltage from the error amplifier 64 is multiplied by the voltage waveform from the input voltage detecting section 61, while the current to be inputted to the active filter 5 is fetched from the emitter side of the power transistor 33, and the signal voltage according to the current value is detected by the input current detecting section 65.

In the amplifier 67, the difference between the detection value and the output from the multiplier 66 is amplified. The output from the amplifier 67 is converted to a PWM signal by the PWM circuit composed of the comparator 69 and the oscillator 68. The PWM signal is amplified by the driving circuit 70 to be applied to the control electrode of the power transistor 43.

The main control section varies the pulse width of the PWM signal so as to maintain the output voltage constant by the applying the feedback control to the output voltage from the active filter 5. The main control section performs a switching control so that the input current of the active filter 5 becomes a sine wave in phase with the input voltage.

In the overvoltage protecting circuit, the output voltage (detection voltage) from the active filter 5 divided by the resistors 76 and 77 is compared with the DC voltage (protective voltage) divided by the resistors 71 and 72 in the comparator 74. As a result of comparison, if the detection voltage is greater than the protective voltage, the output from the driving circuit 70 is forced to be stopped by the output from the comparator 74.

Figure 8:
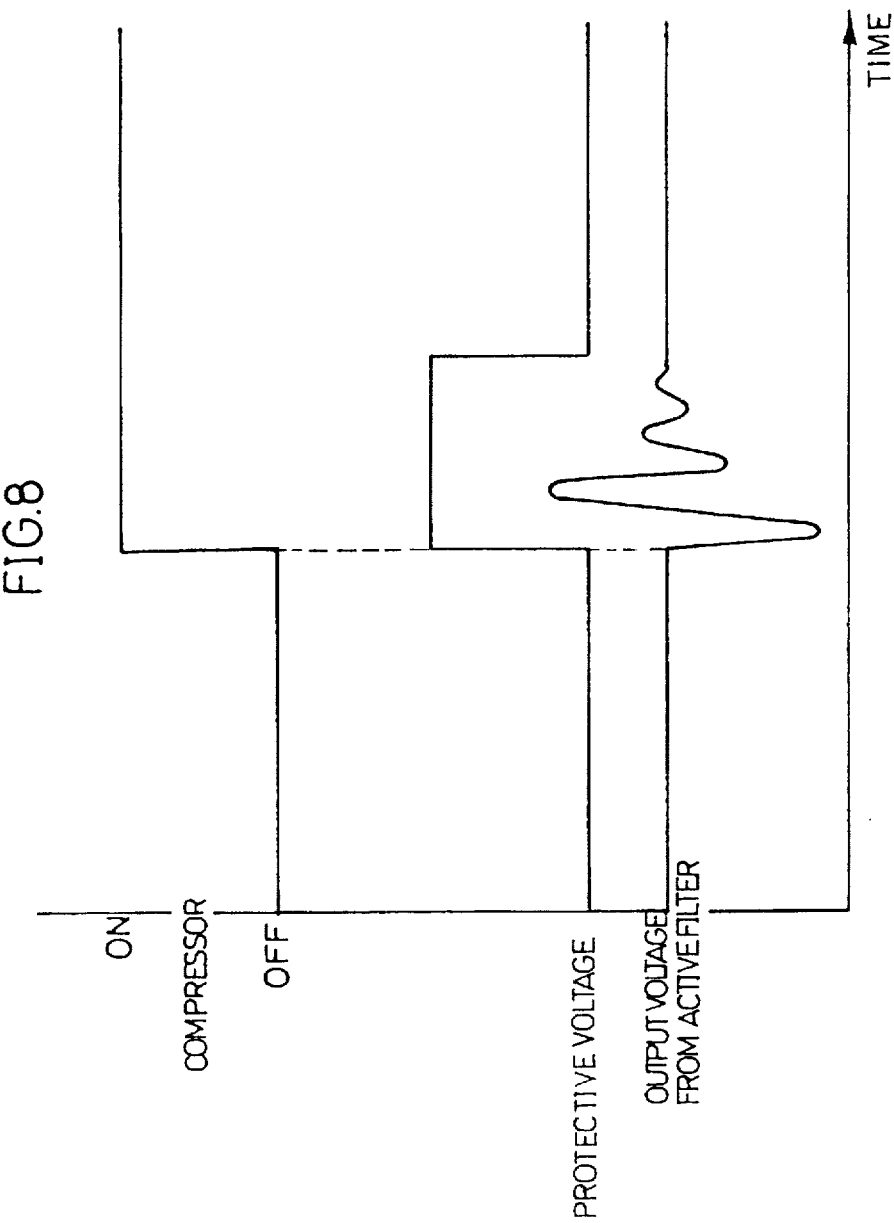
FIG. 8 is a view showing a waveform representing the operation of an overvoltage protection circuit at the activation of the active filter or power compressor in the air conditioner of FIG. 7.

In the overvoltage protection circuit, for a predetermined time from the start of the active filter 5 or the power compressor 6, the switch 75 is closed in response to an instruction from the inverter control section 11. In this period, as shown in FIG. 8, the resistor 73 is added to the resistor 71, and the protective voltage is raised. As a result, even if an overshoot occurs in the output voltage from the active filter 5, the overvoltage protection circuit will not be operated.

In this state, although the absolute level of the rise in output voltage due to the overshoot is large, since this occurs for only a several tens of milli-seconds, the rise is within the maximum rates of the active filter 5, the transistors 21 through 26 of the inverter circuit 4 and the smoothing condenser 3. Therefore, the problem of an element failure, a shorter duration of life, a lower performance, etc., can be prevented. Therefore, the protective voltage can be temporarily raised without problem.

Figure 9:
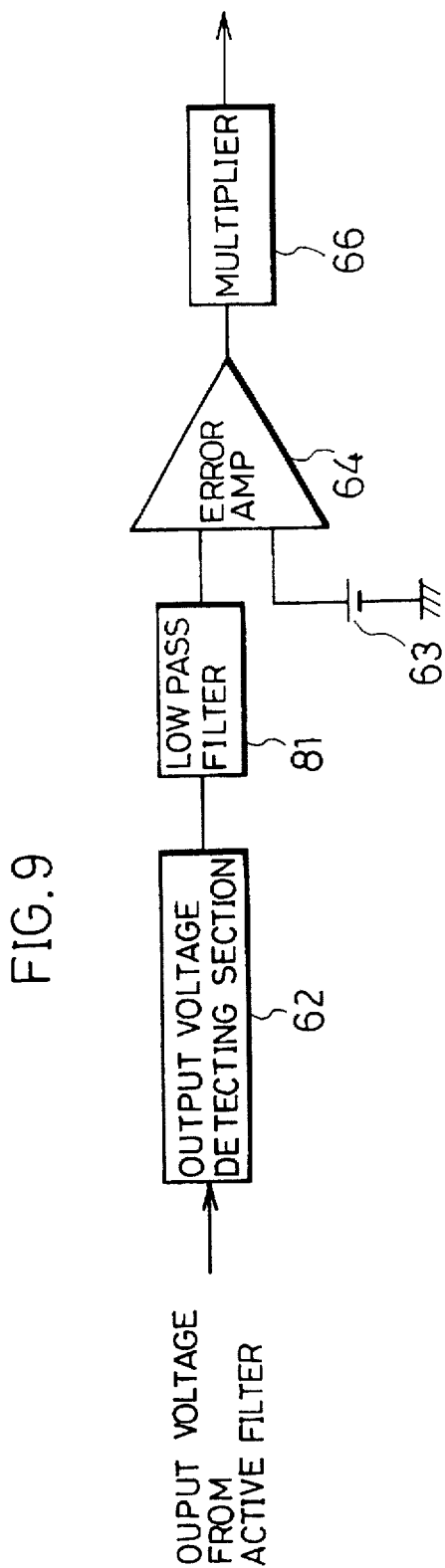
FIG. 9 is a block diagram depicting the structure of a switching control section in the air conditioner of FIG. 7 when a low-pass filter is provided.
Figure 10:
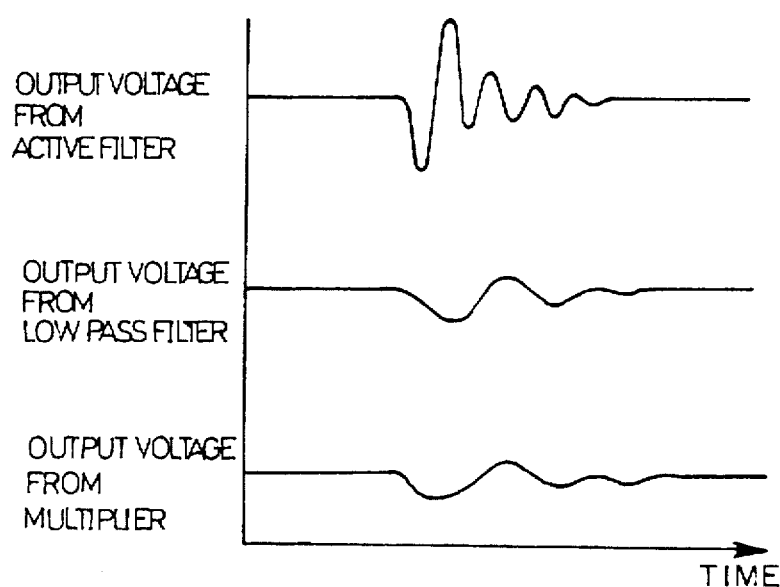
FIG. 10 is a view showing a waveform explaining how the ringing of the output voltage from the active filter is deteriorated by the low-pass filter.

In order to prevent the operation error of the overvoltage protecting circuit due to the overshoot, the air conditioner in accordance with the present embodiment may include a low pass filter 81 formed in the secondary stage of the output voltage detecting section 62 as shown in FIG. 9. According to this arrangement, as shown in FIG. 10, a high frequency component of the ringing of the output voltage from the active filter 5 is cut by the low pass filter 81, and thus when the output voltage is inputted to the error amplifier 64, it is already rounded. Therefore, the feedback system which is mainly composed of the error amplifier 64 shown in FIG. 9 can be prevented from over reacting to the ringing. As a result, the outputs from the error amplifier 64 and the multiplier 66 can be prevented from varying greatly, thereby preventing the overshoot of the output voltage from the active filter 5.

Figure 11:
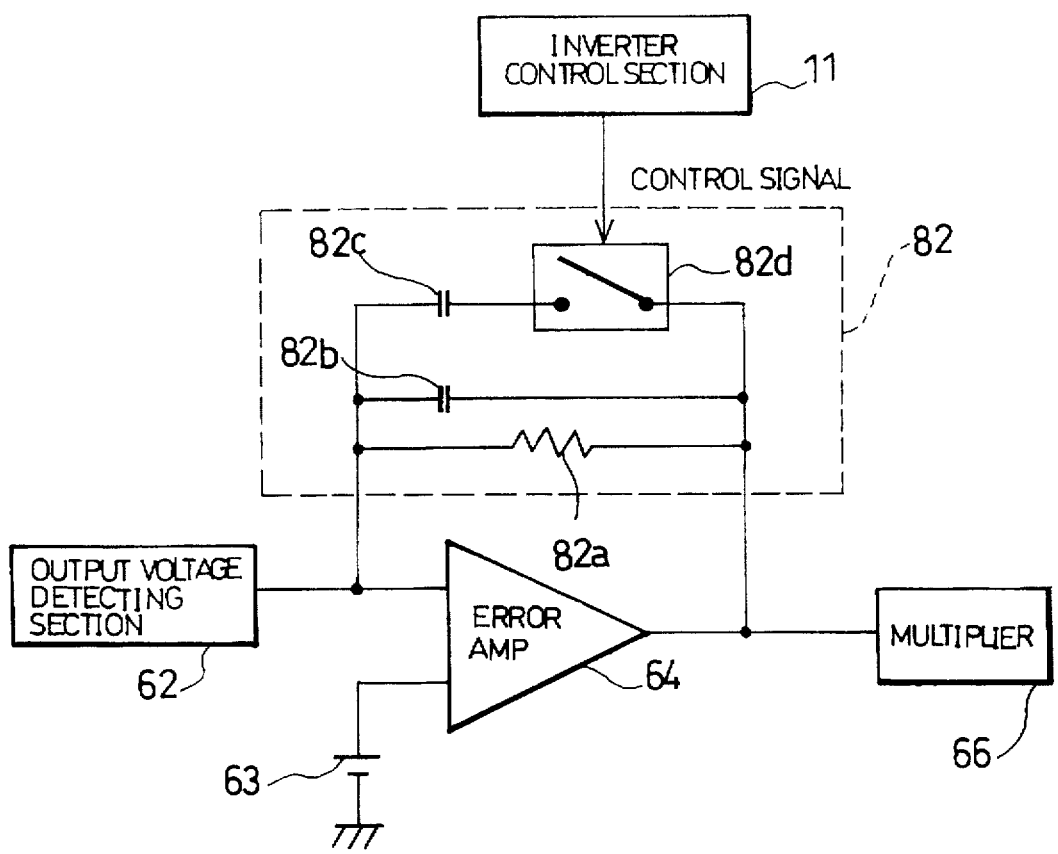
FIG. 11 is a schematic circuit diagram depicting the structure of the switching control section when a time constant changing section is provided.

Furthermore, the air conditioner of the present embodiment includes a time constant change section 82 as shown in FIG. 11 for preventing the operation error of the overvoltage protection circuit due to the overshoot.

The time constant change section 82 includes the resistor 82a and the condensers 82b and 82c which are connected in parallel between the input terminal and the output terminal of the error amplifier 64.

The switch 82d is arranged so as to be closed by the control signal which is generated from the inverter control section. 11 for a predetermined time from the start of the power compressor 6. The time constant change section 82 having the described arrangement alters the time constant of the feedback system to a greater value in the described period.

Figure 12:
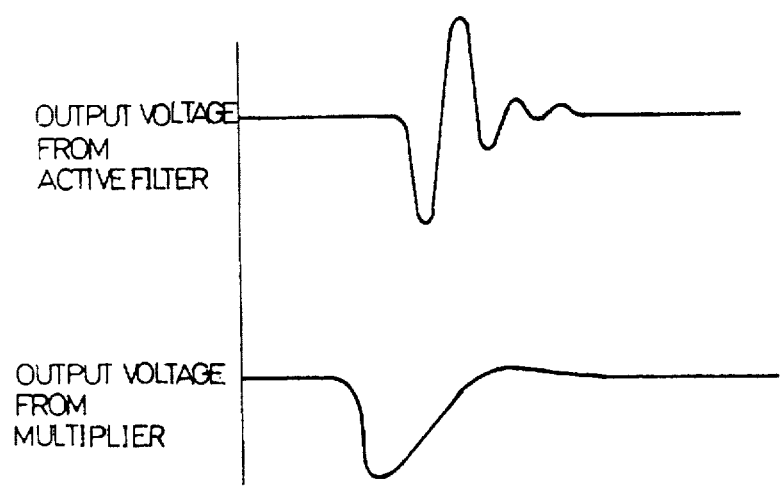
FIG. 12 is a view showing a waveform explaining how the ringing of the output voltage from the active filter is deteriorated by the time constant changing section.

As a result, as shown in FIG. 12, the feedback system will not overreacted to the ringing. Therefore, the output voltage from the active filter 5 changes smoothly until it reaches the normal state. Therefore, when starting the power compressor 6, an occurrence of overshoot in the output voltage from the active filter 5 can be prevented.

Figure 13:
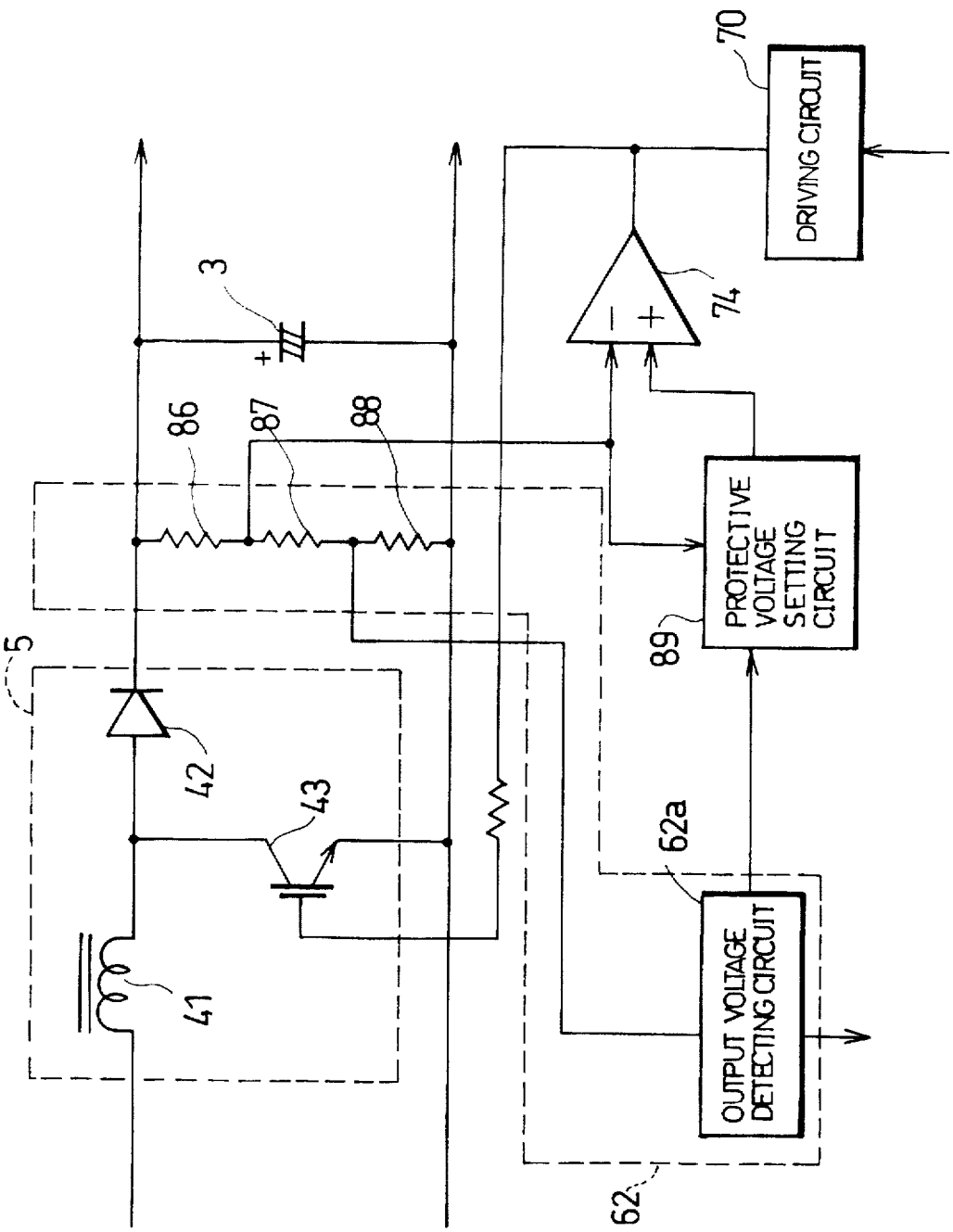
FIG. 13 is a schematic circuit diagram depicting the structure of another overvoltage protection circuit in the air conditioner of FIG. 7.

Another arrangement of the overvoltage protection circuit is shown in FIG. 13, wherein a voltage dividing circuit composed of resistors 86 through 88 connected in series is adopted. The voltage dividing circuit is also used as means for detecting an output voltage from an output voltage detecting section 62 for example and determines an output voltage based on the resistor 88. The voltage dividing circuit determines the output voltage for the overvoltage protection circuit by the resistors 87 and 88.

The difference between the output voltage and the protective voltage is determined by the voltages on both sides of the resistors 88. Therefore, when starting the active filter 5, an output voltage is detected by the output voltage detecting circuit 62a in the output voltage detecting section 62. Then, by setting the protective voltage based on the output voltage by the protective voltage setting circuit 89, the difference between the output voltage and the protective voltage, i.e., the detection margin can be maintained constant irrespective of the level of the output voltage. As a result, the problem that the overvoltage protection circuit is likely to be operated by making smaller the detection margin can be eliminated.

According to the air conditioner of the present invention, the inverter control section 11 controls the operating frequency so as to alter the change rate of the operating frequency at a predetermined time period when it is required to greatly alter the operating frequency, for an emergency, for example, when the power compressor 6 is started or a sudden change occurs in load.

Figure 14:
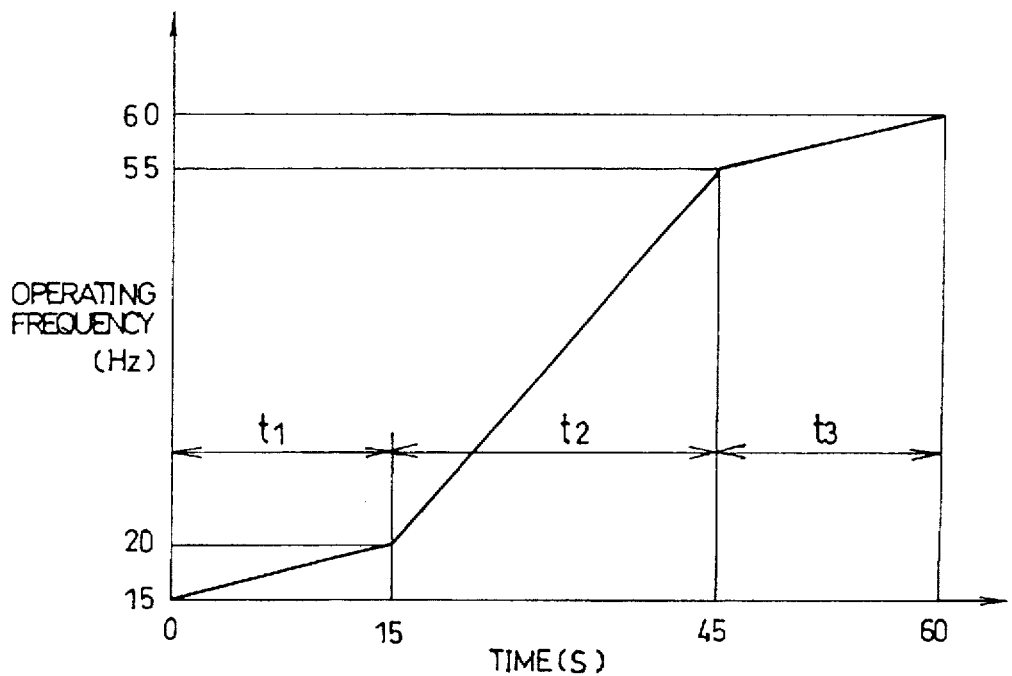
FIG. 14 is a graph showing how the operating frequency of the power compressor is changed by different changing speed in every predetermined periods by an inverter control section in the air conditioner of FIG. 7.

For example, when starting the power compressor 6, as shown in FIG. 14, the operating frequency increases from 15 Hz to 20 Hz in a time period $t_1$ (for 15 seconds elapsed after the start time). Thereafter, it is raised to 55 Hz in a time period $t_2$ (for 30 seconds from 15 seconds to 45 seconds after the start time), and further raised to 60 Hz at a time period $t_3$ (for 15 seconds from 45 seconds to 60 seconds after the start time). In the time periods $t_1$ and $t_3$, the change rate of the operating frequency is 0.33 Hz/s which is by far lower than the constant change rate (0.75 Hz/s) of the conventional arrangement.

Figure 15:
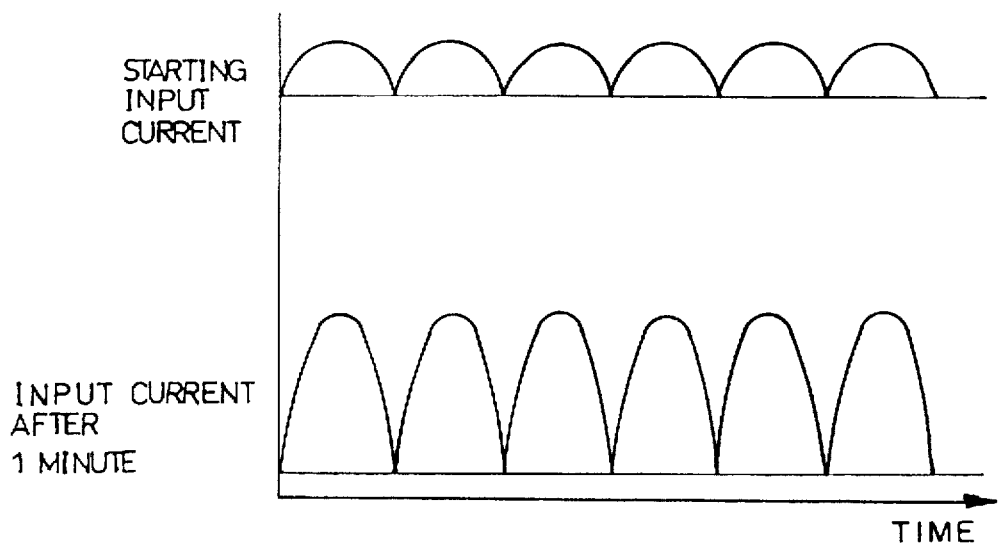
FIG. 15 is a view showing a waveform representing the an input current to the active filter, which changes before and after the operating frequency is changed based on the characteristics shown in FIG. 14.
Figure 16:
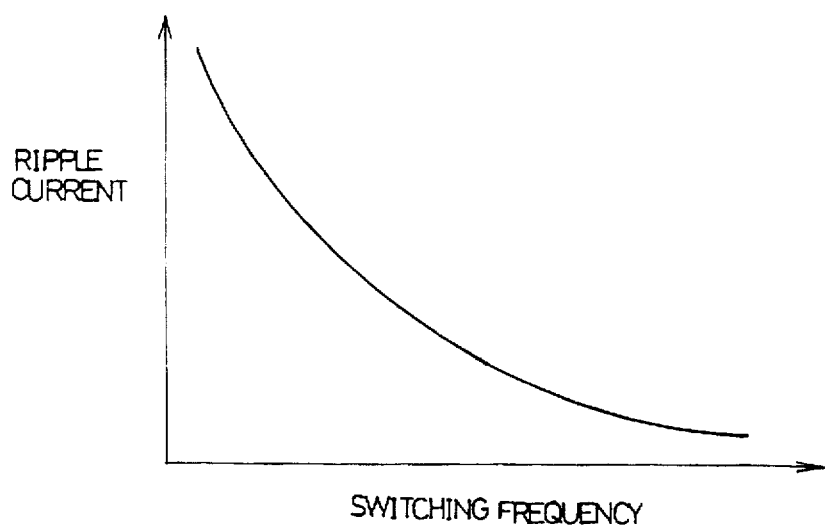
FIG. 16 is a view showing a waveform representing the relation between a switching frequency and a ripple current.

Therefore, in the time periods $t_1$ and $t_2$, an increase in load current of the power compressor 6 is greatly suppressed. Therefore, even if the change rate at the time period $t_2$ is higher than the conventional change rate, the input current of the active filter 5 is amplified without showing fluctuations from the start time as shown in FIG. 15.

In order to reduce the ripple current, the air conditioner of the present embodiment adopts the following arrangement.

Figure 17:
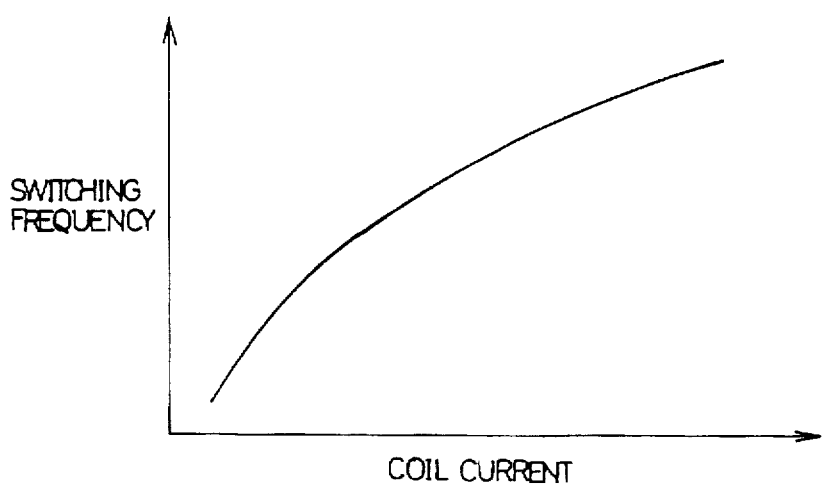
FIG. 17 is a view showing a waveform representing the relation between a coil current and the switching frequency.

As previously described, the ripple current has the following characteristic. When the coil current flowing through the choke coil 41 increases, the inductance of the choke coil 41 reduces. As a result, the ripple current increases. On the other hand, as shown in formula (1) and FIG. 16, as the switching frequency of the power transistor 43 increases, the ripple current reduces. Therefore, as shown in FIG. 17, by increasing the switching frequency as the coil current increases, an increase in ripple current can be suppressed.

Figure 18:
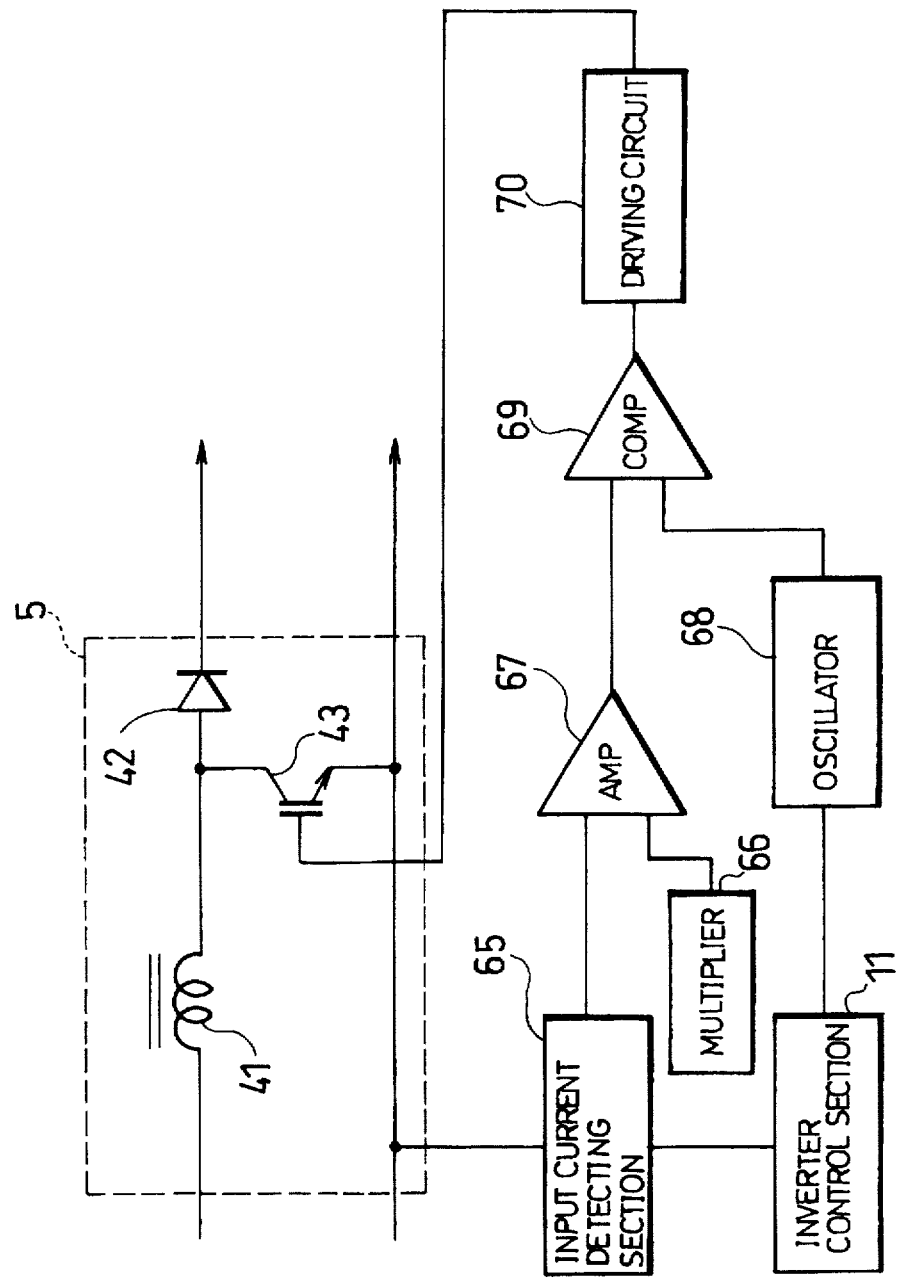
FIG. 18 is a schematic circuit diagram depicting the structure to control an oscillating frequency of an oscillator provided in the switching control section in accordance with a load current.

As shown in FIG. 18, in the air conditioner of the present invention, the oscillation frequency of the oscillator 68 is controlled based on the input current (coil current) detected by the input current detecting section 65. Therefore, as the coil current increases, the oscillation frequency for determining the switching frequency based on the coil current can be raised.

Figure 19:
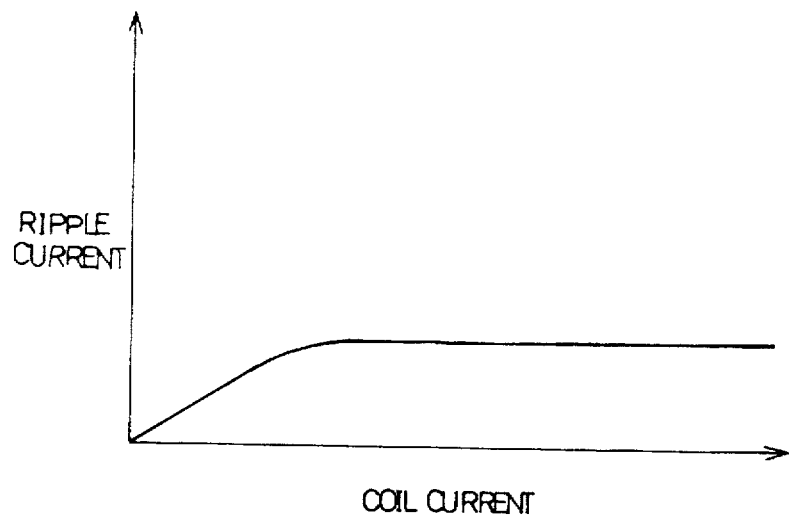
FIG. 19 is a graph showing the relation between the coil current and ripple current indicating that an increase in the ripple current is suppressed by the structure shown in FIG. 18.
Figure 20:
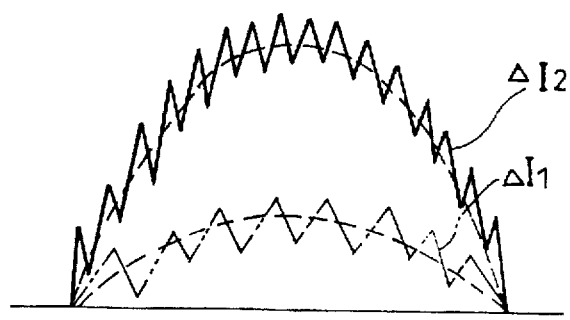
FIG. 20 is a view showing a waveform of the ripple current when the coil current is large.

As a result, as shown in FIG. 19, the ripple current can be suppressed to a predetermined level even when the coil current is increased. Additionally, as shown in FIG. 20, the ripple current $\Delta I_2$ at a large coil current is not very different from the ripple current $\Delta I_1$ at a small coil current (shown by an alternate long and two short dashes line in the figure).

When the switching frequency increases, the switching loss also increases. Therefore, in the described arrangement, when both the coil current and the ripple current are small, the switching frequency is set low in order to avoid an increase in switching loss.

Figure 21:
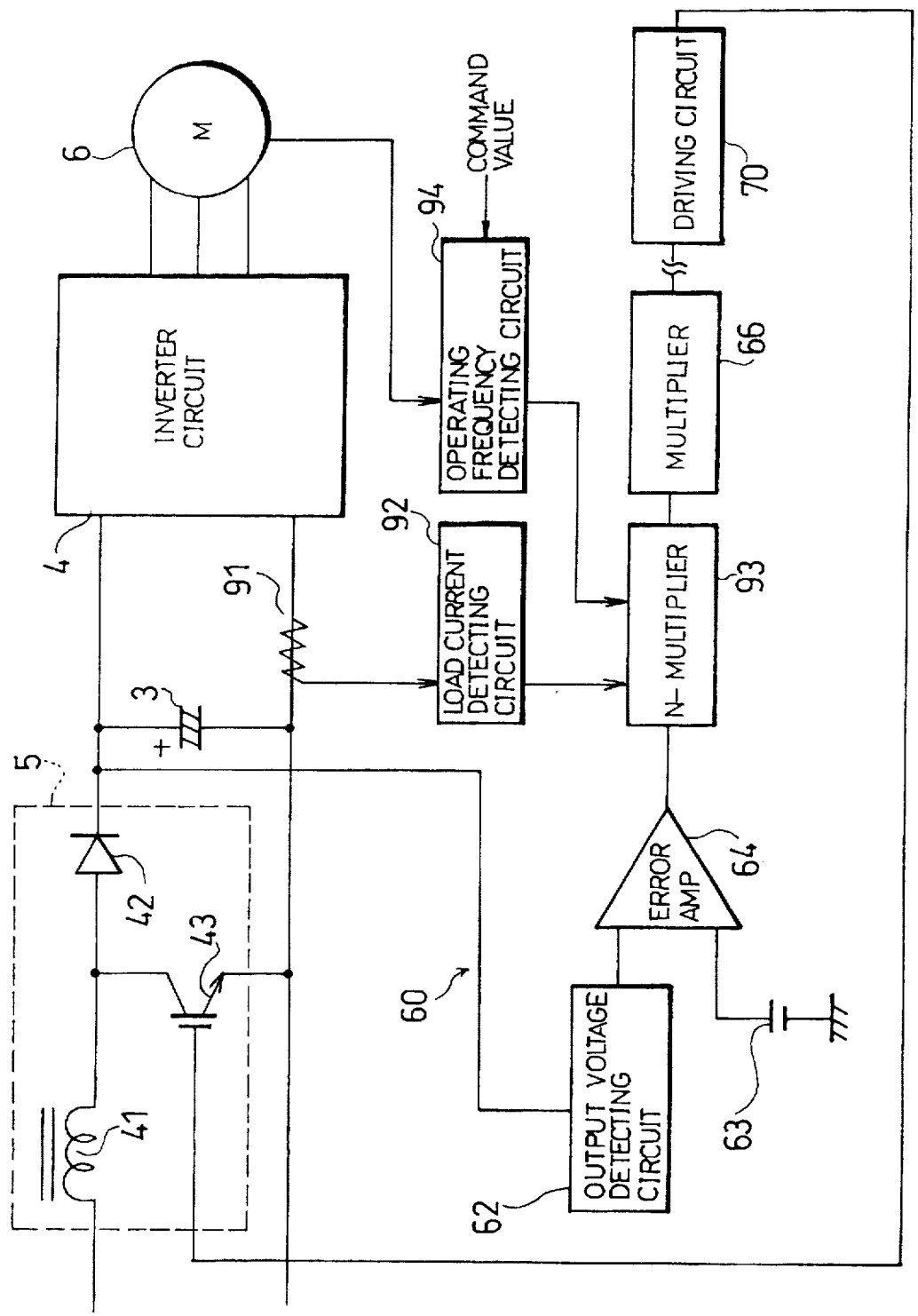
FIG. 21 is a schematic circuit diagram depicting the structure to boost the output voltage from the active filter based on the load current and slip of the power compressor.

In order to maintain the operation capacity of the power compressor 6 according to the air conditioning load, the air conditioner of the present embodiment includes a current detector 91, such as a Hall element, a current transformer, etc., a load current detecting circuit 92, an N-multiplier 93 and an operating frequency detecting circuit 94 as shown in FIG. 21.

In the described arrangement, upon detecting the current flowing through the power compressor 6 by the current detector 91, the detection value is outputted to the N-multiplier 93 in a form of a voltage signal according to a current value from the load current detecting circuit 92 including the voltage dividing resistor. On the other hand, in the power compressor 6, by the number of rotations detector adopting the Hall element, etc., (not shown), the actual operating frequency of the power compressor 6 is detected. In the operating frequency detector 94, generated is a signal is generated according to a difference between the detected operating frequency and the instruction value for the operating frequency generated from the inverter control section 11, i.e., the slip.

In the steady initial operating state (in the state where the operating frequency of the power compressor 6 is stable), the current amount of slip and the load current are stored in the inverter control section 11. During the operation, as the air conditioning load becomes heavier, the load current and the amount of slip becomes larger. In this state, in the N-multiplier circuit 93, the output from the error amplifier 64 is multiplied by a number set according to the difference between the actual values and the stored values for the load current and the amount of slip. As a result, the gain of the error amplifier 64 is kept altering until the difference is eliminated.

Figure 22:
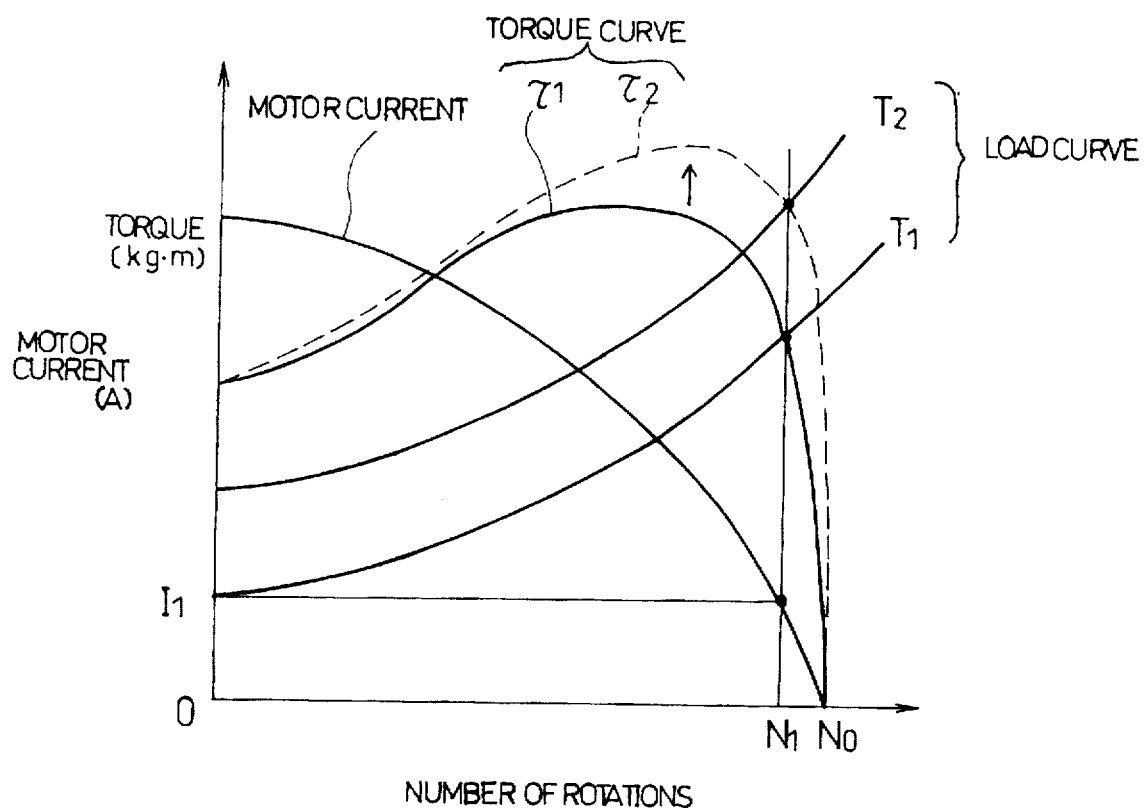
FIG. 22 is a view showing the characteristics of the power compressor improved by the structure of FIG. 21.

When the gain of the error amplifier 64 is altered in the described manner, the switching of the power transistor 43 is controlled so as to increase the output voltage from the active filter 5. As a result, as shown in FIG. 22, the torque curve $\tau_1$ is changed to the torque curve $\tau_2$ so as to be raised at the maximum point. Therefore, even if the load is increased from $T_1$ to $T_2$, the number of rotations remains $N_1$, and the load current is also maintained $I_1$.

As described, by raising the output voltage from the active filter 5 based on the actual number of rotations and the load current, the number of rotations (air conditioning capacity) of the power compressor 6 can be maintained constant irrespectively of the air conditioning load.

Additionally, since the load current and the amount of slip can be controlled independently, the described control is enabled using only one of them. The position of the current detector 91 is not limited to the input terminal side of the inverter circuit 4, and it may be formed on the output side of the inverter circuit 4.

Third Embodiment

The following descriptions will discuss the third embodiment of the present invention in reference to FIG. 23 through FIG. 31.

Figure 23:
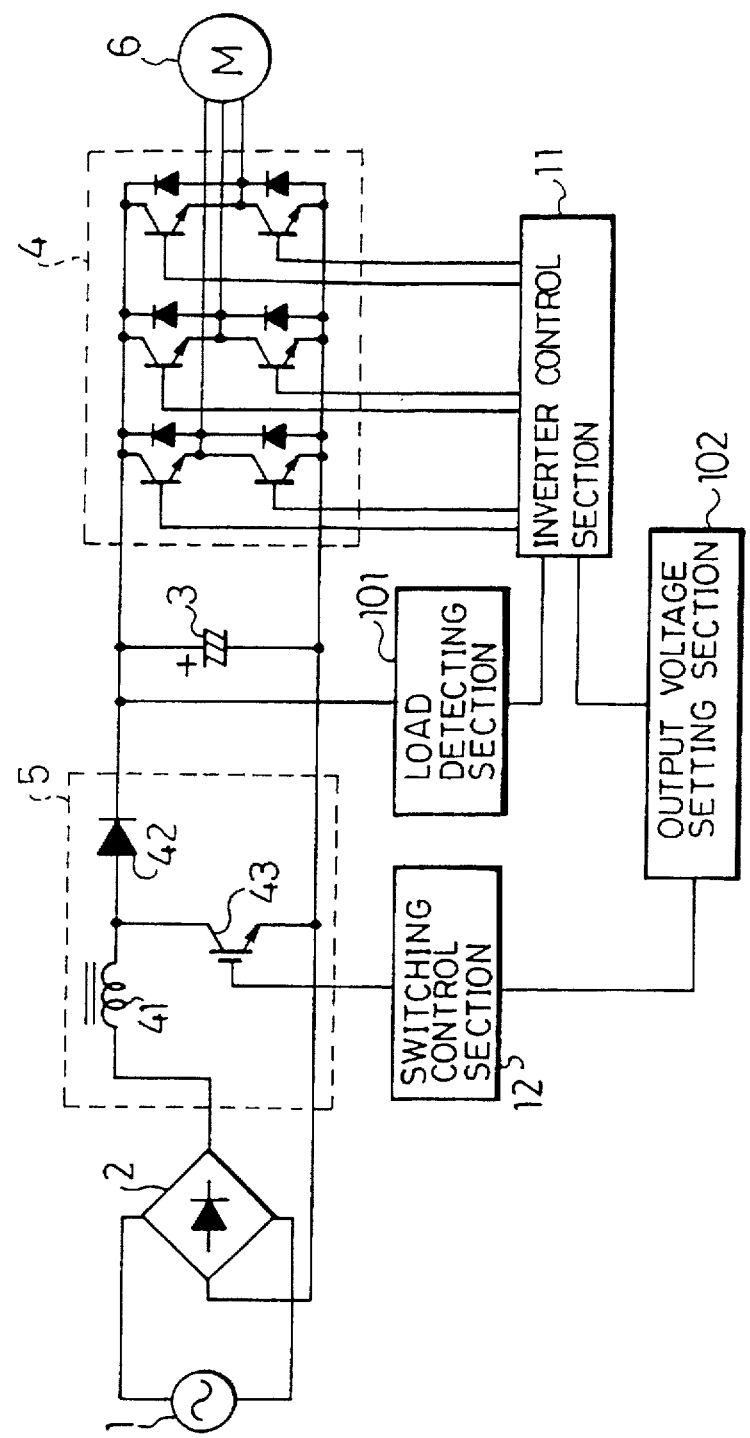
FIG. 23 is a schematic circuit diagram depicting the structure of an air conditioner in accordance with the third embodiment of the present invention.

As shown in FIG. 23, an air conditioner in accordance with the present invention includes a load detecting section 101 and an output voltage setting section 102.

Figure 24:
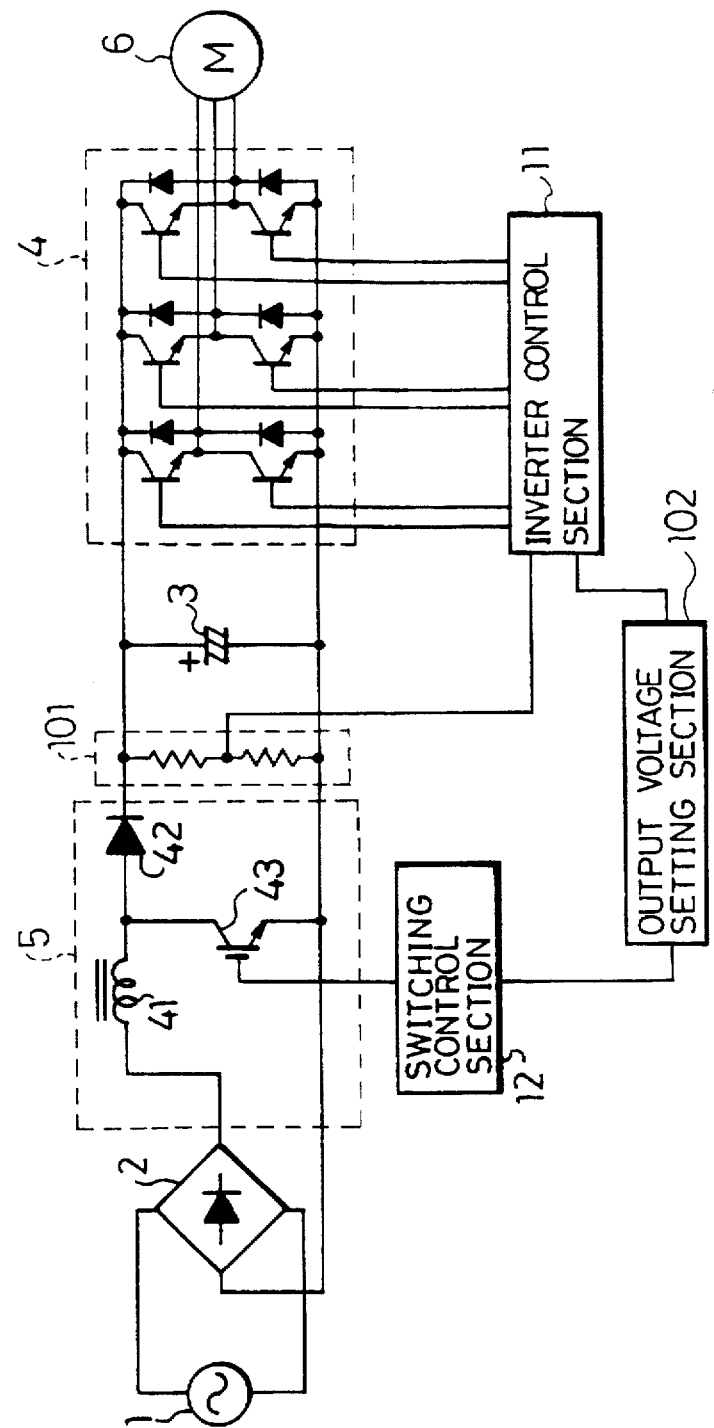
FIG. 24 is a detailed schematic circuit diagram depicting the structure of a load detecting section in the air conditioner of FIG. 23.
Figure 25:
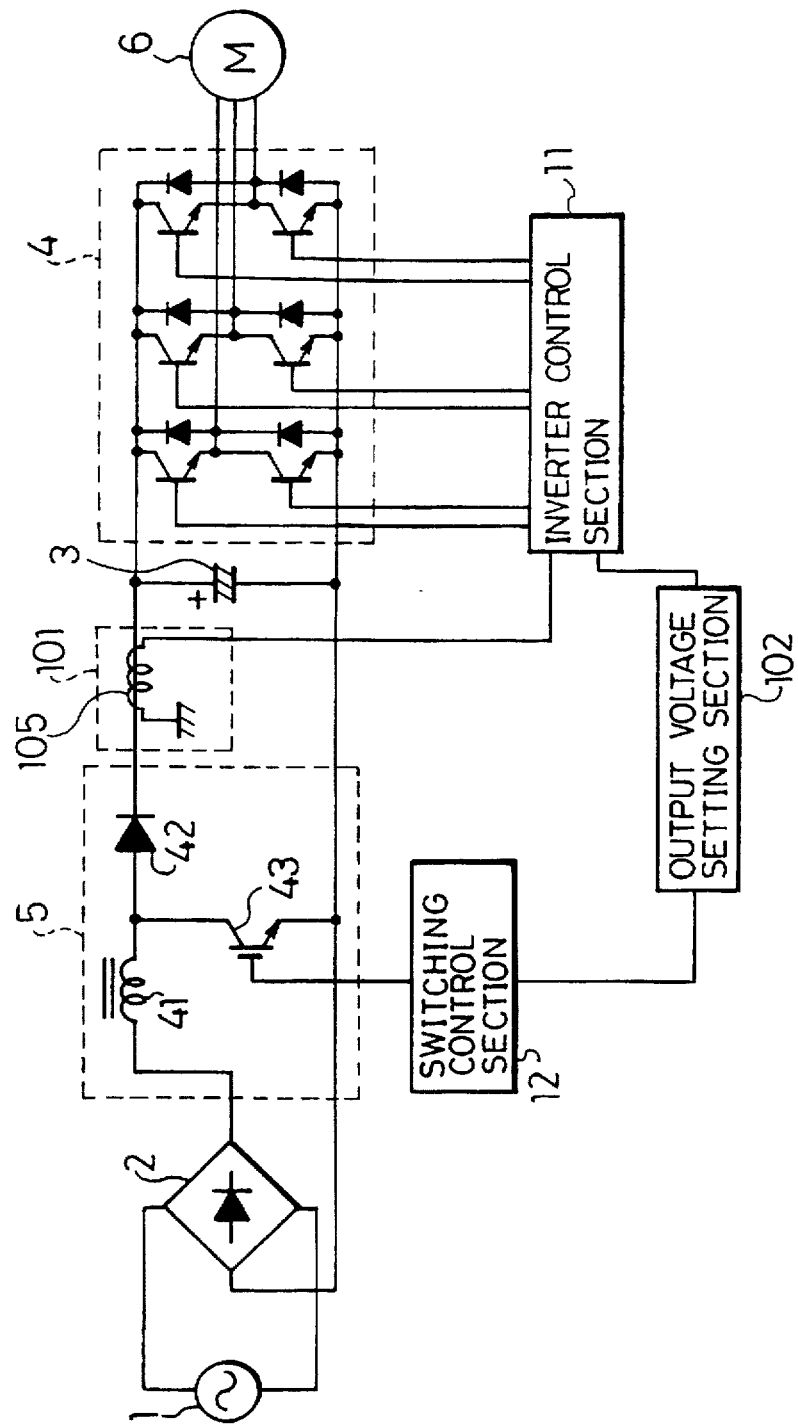
FIG. 25 is another detailed schematic circuit diagram depicting the structure of the load detecting section in the air conditioner of FIG. 23.
Figure 26:
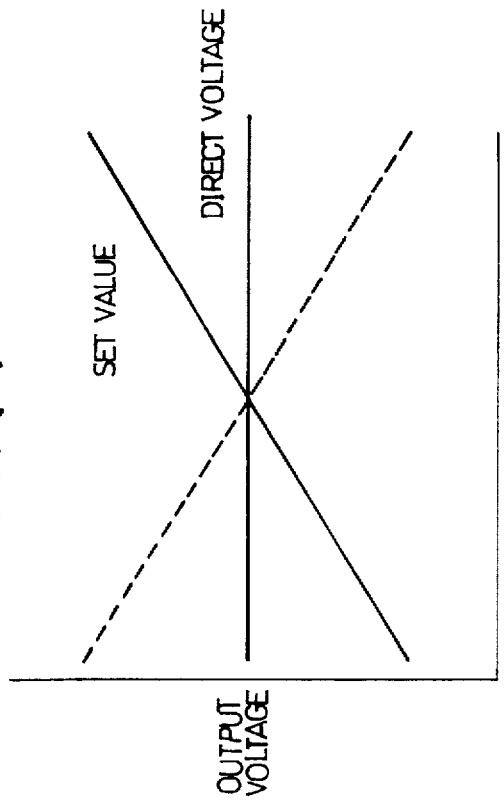
FIG. 26(a) is a graph showing the relation between a load condition of the power compressor and the output voltage from the active filter.
FIG. 26(b) is graph showing the relation between a load condition of the power compressor and the output voltage from the active filter when a set value of the output voltage from the active filter is changed in accordance with the load condition of the power compressor.
Figure 26:
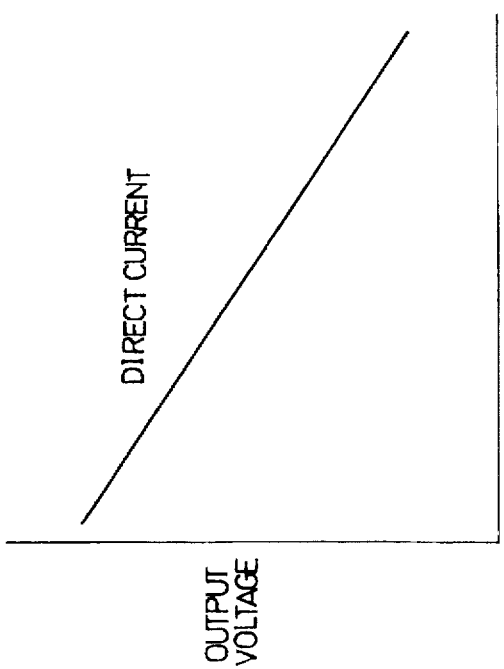

The load detecting section 101 as the load detection means, for example, is a circuit for detecting the load state of the power compressor 6. For example, as shown in FIG. 24, the load detecting section 101 is a voltage dividing circuit composed of resistors 103 and 104. The load detecting section 101 divides a terminal voltage of the smoothing condenser 3, i.e., an output from the active filter 5 by the resistors 103 and 104. As shown in FIG. 25, the load detecting section 101 is composed of a current transformer 105 formed between the fast recovery diode 42 and the smoothing condenser 3. The load detecting section 101 detects the current flowing through the DC power source line.

As the means for detecting the load current, the Hall element may be used, for example in place of the current transformer 105.

As shown in FIG. 26(a), when the load is heavy, since the operating frequency of the power compressor 6 becomes high, the flow of current increases. As a result, the output voltage from the active filter 5 is lowered. On the other hand, when the load is light, since the operating frequency of the power compressor 6 becomes low, the flow of current reduces. As a result, the output voltage from the active filter 5 is raised. Therefore, by detecting the output voltage or the current, the load state of the power compressor 6 can be detected.

The output voltage setting section 102 is a circuit for setting the output voltage from the active filter 5 according to an instruction from the inverter control section 11. The set value outputted from the output voltage setting section 102 is applied to the switching control section 12.

Based on the detection value from the load detecting section 101, the inverter control section 11 increases the output voltage from the active filter 5 as the load in the power compressor 6 becomes heavier. As already mentioned in the first embodiment, the inverter control section 11 stops the active filter 5 when the power compressor 6 is in its stoppage position. Concrete examples of the methods of stopping the active filter 5 include a method of applying an OFF signal to an enable input terminal of the control IC which constitutes the switching control section 12, and a method of turning OFF the power of the active filter control section 13.

In the air conditioner having the described arrangement, the load state of the power compressor 6 is always detected by the load detecting section 101. In this state, when the load is heavy, the terminal voltage of the smoothing condenser 3 is lowered. Upon recognizing the change in terminal voltage, the inverter control section 11 gives an instruction for raising the set value to the output voltage setting section 102 as shown by a solid thin line in FIG. 26(b). Then, the switching control section 12 increases the output voltage from the active filter 5, for example, by setting the ON time duration of the power transistor 43 longer.

On the other hand, when the load is light, as the terminal voltage of the smoothing condenser 3 is higher the inverter control section 11 gives an instruction for lowering the set value. In response to the instruction, the switching control section 12 lowers the output voltage from the active filter 5.

As a result, as shown by the solid line in FIG. 26(b), the output voltage becomes constant irrespective of the load state of the power compressor 6. Therefore, when the load is heavy, the drop in voltage can be prevented. As a result, the problems which are likely to occur when the load is heavy that the vibrations of the power compressor 6 become greater, or the power compressor 6 is locked can be prevented. On the other hand, when the load is light, an increase in output voltage can be suppressed. Therefore, the inverter circuit 4 and the smoothing condenser 3 can be prevented from breaking due to an increase in voltage.

In the state where no load is incurred where the power compressor 6 is in its stoppage position, the output voltage from the active filter 5 is raised. When the stoppage of the power compressor 6 is detected by the inverter control section 11, by supplying a stop signal to the switching control section 12, the switching control section 12 stops the active filter 5. As a result, an increase in output voltage when no load is incurred can be suppressed. Additionally, when the power compressor 6 is stopped, almost no current flows in all the power lines. Therefore, the harmonic current is small and would not cause a problem even when the active filter 5 is in the stoppage.

In the described arrangement, the set value of the output voltage from the active filter 5 is varied according to the load state of the power compressor 6. In order to control the output voltage to fall within the set value irrespectively of the change in load, the raised voltage of the active filter 5 may be varied according to the load state other than the described arrangement. Since the output voltage and the inductance of the choke coil 41 are in proportion, by lowering the inductance of the choke coil 41, the output voltage can be lowered. The arrangement for varying the inductance will be explained below. In the arrangement shown in FIG. 27, two choke coils 41a and 42b having different inductances are formed in parallel in replace of the choke coil 41 in the active filter 5. The connection between the choke coils 41a and 41b and the bridge rectifying circuit 2 is switched by the switch 106. Namely, when the load is heavy, the choke coil 41b having a high inductance is connected to the bridge rectifying circuit 2, while when the load is light, the choke coil 41a having a low inductance is connected to the bridge rectifying circuit 2.

Figure 28:
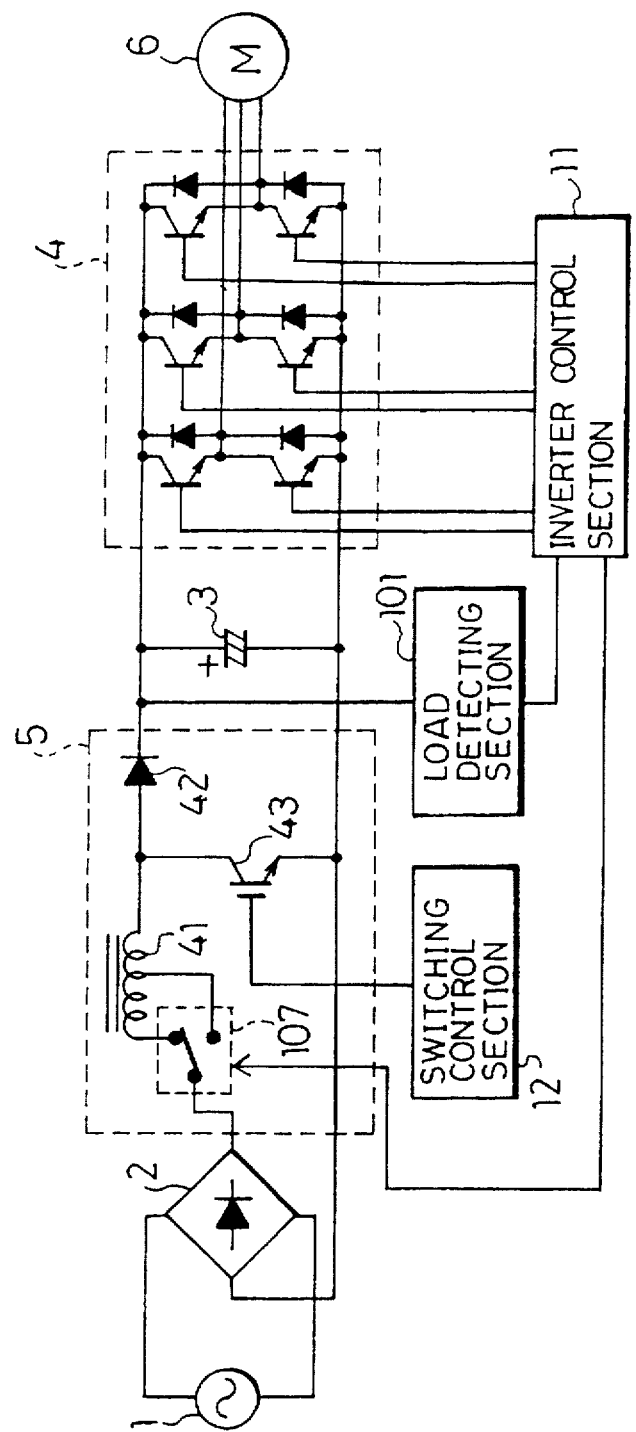
FIG. 28 is another schematic circuit diagram depicting the structure to change the inductance of the choke coil.

In the arrangement shown in FIG. 28, in the active filter 5, plural taps are formed on the choke coil 41. Each tap is switched by the switch 107.

Figure 29:
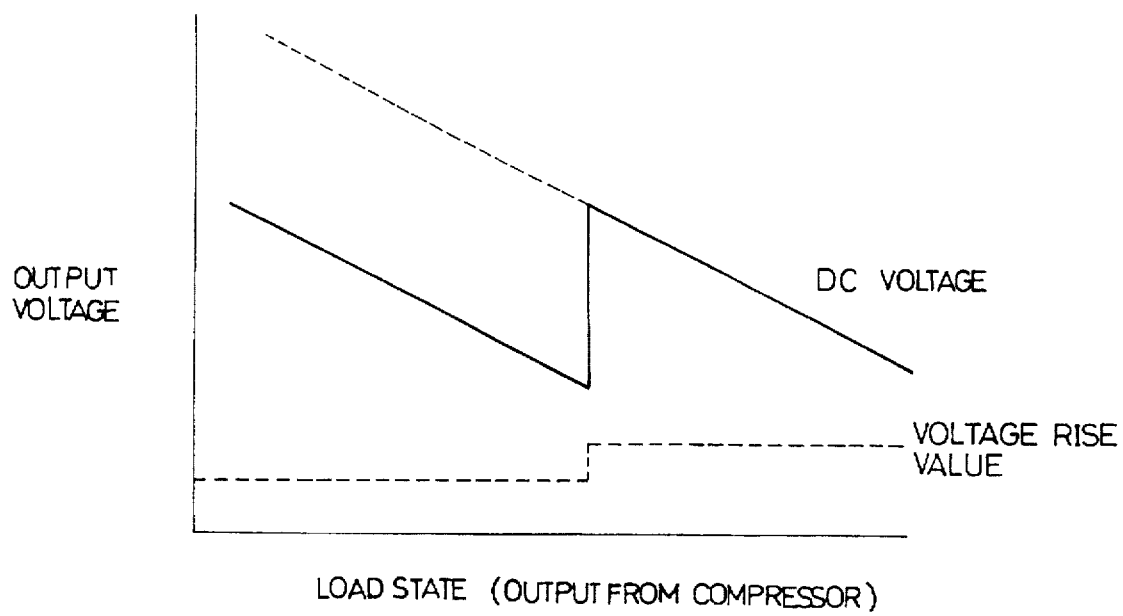
FIG. 29 is a graph showing the relation between the load condition of the power compressor and the output voltage from the active filter when the inductance of the choke coil is changed by the structures of FIGS. 27 and 28.

In the described arrangement, the inductance is switched according to the state of the load as shown in FIG. 29. As a result, when the load is light, by lowering the inductance, the raise in voltage of the active filter 5 can be suppressed. On the other hand, when the load is heavy, by lowering the impedance, the rise in voltage of the active filter 5 becomes greater. Therefore, an increase in voltage when the load is light can be suppressed.

Figure 27:
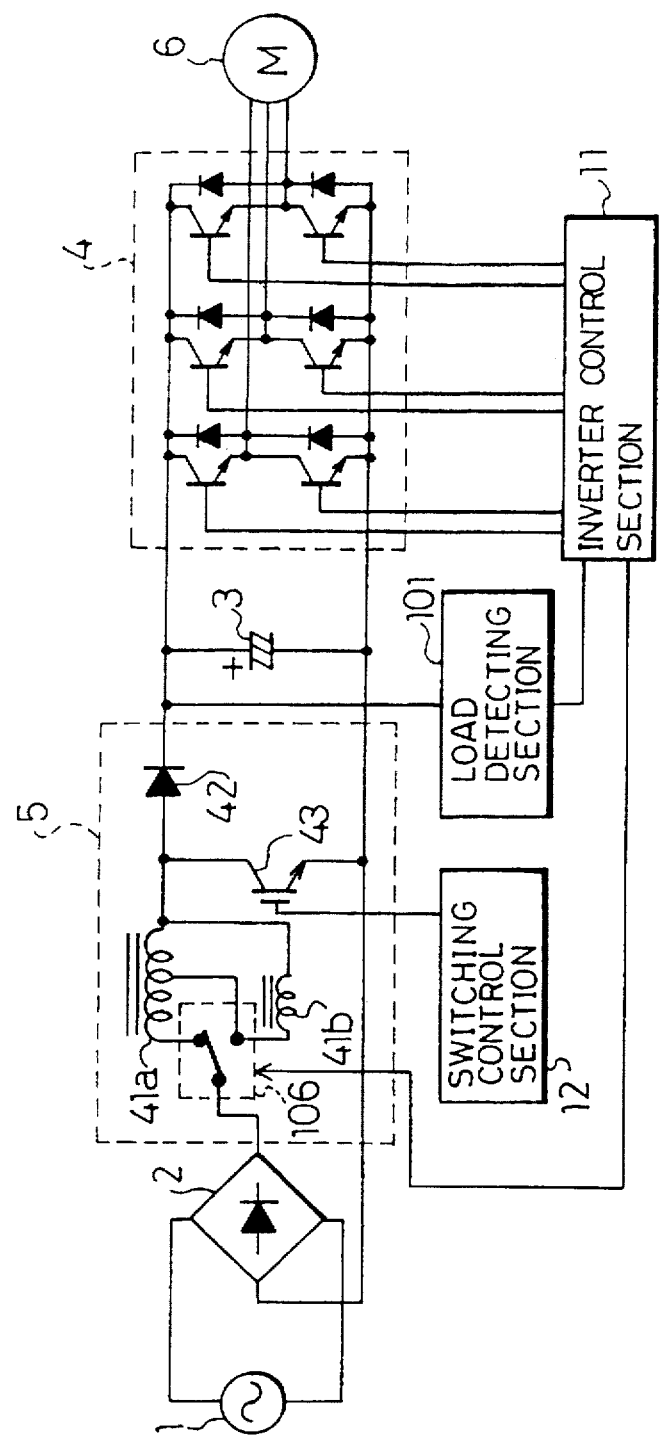
FIG. 27 is a schematic circuit diagram depicting the structure to change the inductance of a choke coil.

In the arrangement shown in FIG. 27, the two choke coils 41a and 41b having different inductances are adopted. However, the present invention is not limited to this arrangement. For example, it may be arranged such that plural choke coils are adopted so that the load can be finely switched according to the load. In this way, the output from the active filter 5 can be set still closer to a constant value.

A modified example of the air conditioner in accordance with the present embodiment will be explained.

Figure 30:
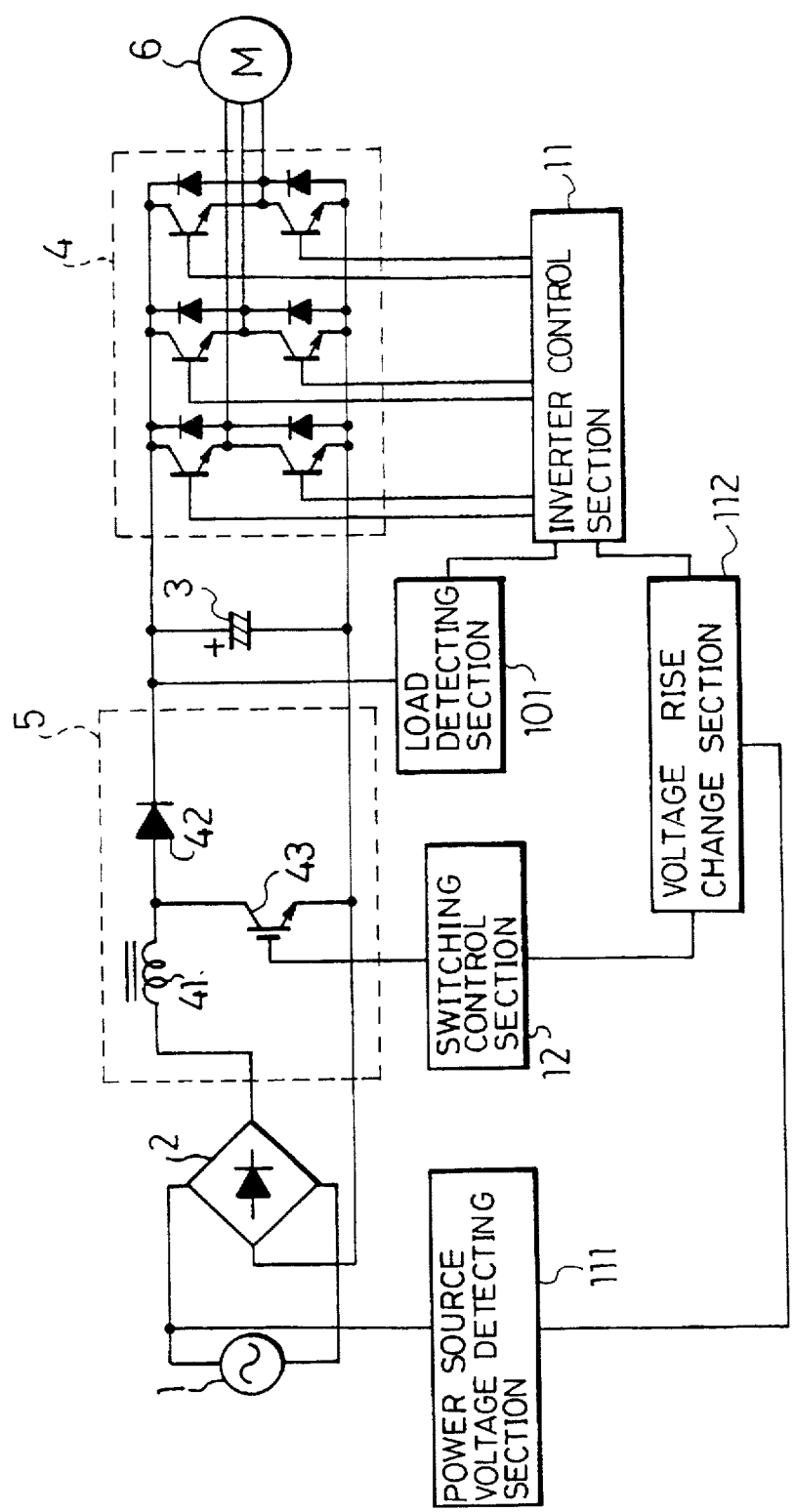
FIG. 30 is a schematic circuit diagram depicting a modified structure of an air conditioner in accordance with the third embodiment of the present invention.

As shown in FIG. 30, the air conditioner in accordance with the modified example includes a power source voltage detecting section 111 and a voltage rise change section 112.

The power source voltage detecting section 111 is a circuit for detecting an AC voltage output from the commercial power source 1. The power source voltage detecting section 111 divides and detects the AC voltage. The voltage rise change section 112 determines whether the AC voltage is 100 V or 200 V based on the voltage detected by the power source voltage detecting section 111. Based on the result of determination, the voltage rise change section 112 changes the value for setting the output voltage from the active filter 5. More concretely, when the AC voltage is 100 V, the voltage rise change section 112 sends a value for setting the voltage rise of the active filter 5 which is twice as high as that when the alternating current is 200 V to the switching control section 12.

Other than changing the set value, the voltage rise change section 112 may be arranged so as to change the impedance of the choke coil 41 (41a and 41b) by switching the switch 106 and 107 shown in FIG. 27 and FIG. 28.

Figure 31:
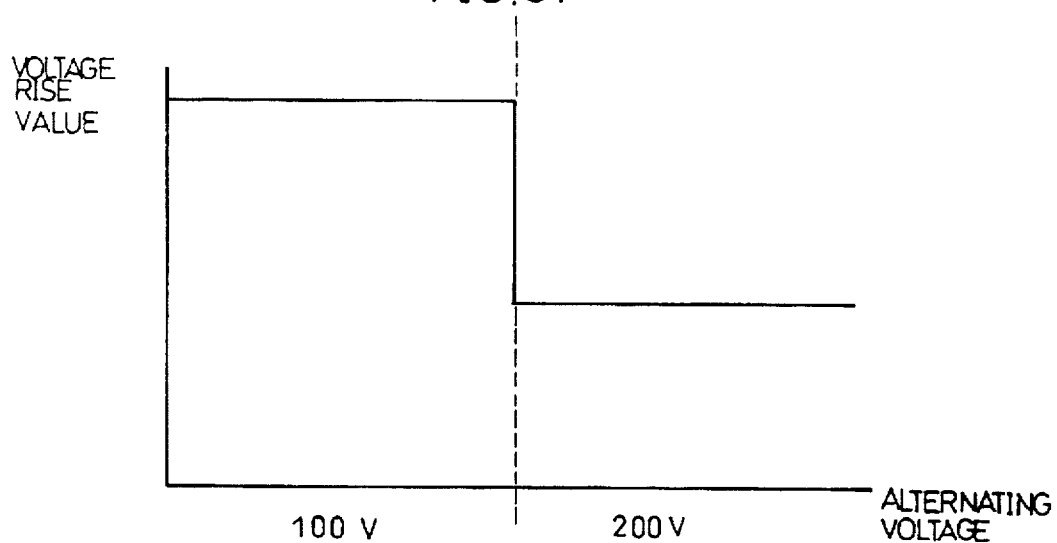
FIG. 31 is a view explaining a correspondence between the increased voltage value in the active filter to be changed and the output voltage (alternate current voltage) of a commercial power source in case of the air conditioner of FIG. 30.

In the air conditioner of the modified example, by altering the set value of the output voltage from the active filter 5 or switching the inductance, as shown in FIG. 31, the voltage rise when the AC voltage is 100 V becomes twice as high as the voltage rise in the case where the AC voltage is 200 V. As a result, the output voltage from the active filter 5 can be maintained constant irrespective of the level of the AC voltage. According to the described arrangement, a single active filter 5 can be used in common when the AC voltage is 100 V and when the AC voltage is 200 V. In the described preferred embodiment, the power source voltage detecting section 111 is used for determining the kind of the commercial power source 1. However, it may be used for detecting the variations in the power source voltage. By using this function, the set value and the voltage rise in the output voltage from the active filter 5 can be altered according to the variations in power source voltage, and the output voltage from the active filter 5 can be maintained constant. Therefore, the operation of the power compressor 6 can be stabilized, and the reliability of the air conditioner can be improved.

Fourth Embodiment

The following description will discuss the fourth embodiment of the present invention in reference to FIG. 32 through FIG. 36. For convenience in explanations, members having the same functions as aforementioned embodiments will be designated by the same reference numerals, and thus the descriptions thereof shall be omitted here.

Figure 32:
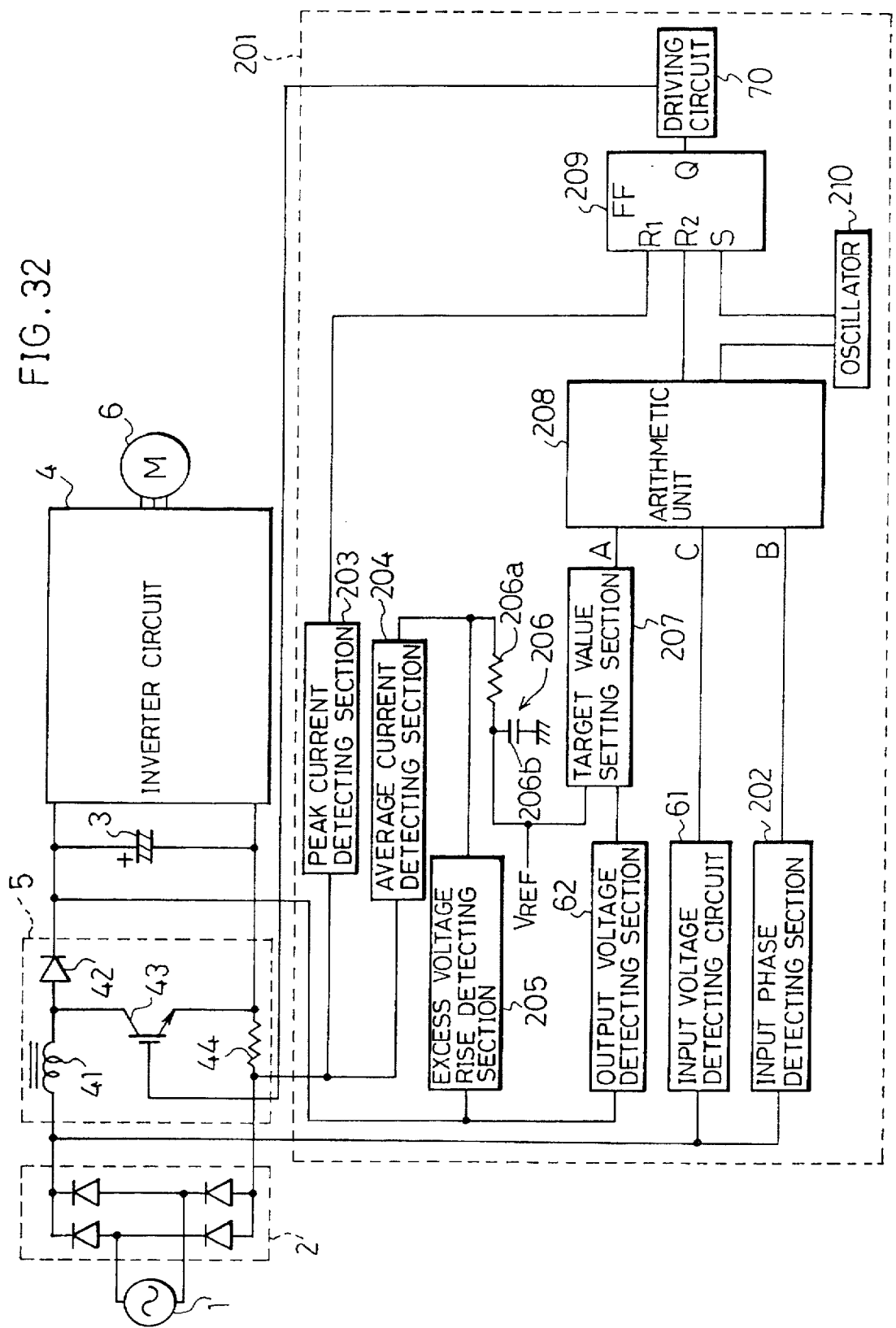
FIG. 32 is a schematic circuit diagram depicting the structure of an air conditioner in accordance with the fourth embodiment of the present invention.

As shown in FIG. 32, an air conditioner in accordance with the present embodiment includes a switching control section 201 for controlling a switching of the power transistor 43.

The switching control section 201 includes an input voltage detecting section 61', an output voltage detecting section 62, an input current phase detecting section 202, a peak current detecting section 203, an average current detecting section 204, an excess voltage rise detecting section 205, an integrating circuit 206, a target value setting section 207, an arithmetic unit 208, a flip flop (FF in the figure) 209, an oscillator 210 and a driving circuit 70.

The input current phase detecting section 202 converts a current into a voltage by the voltage dividing resistor, and detects an input current waveform as a phase of the input current. The input current phase detecting section 202 may be arranged such that an input current is detected by other current transformer, etc.

The peak current detecting section 203 detects a peak current in excess of a predetermined threshold based on a current value converted into a voltage value by the current detecting resistor 44. The current detecting resistor 44 is an overcurrent detecting resistor having a very small resistance value of around 20 mΩ. The current detecting resistor 44 is formed on the power source line in the active filter 5.

Figure 33:
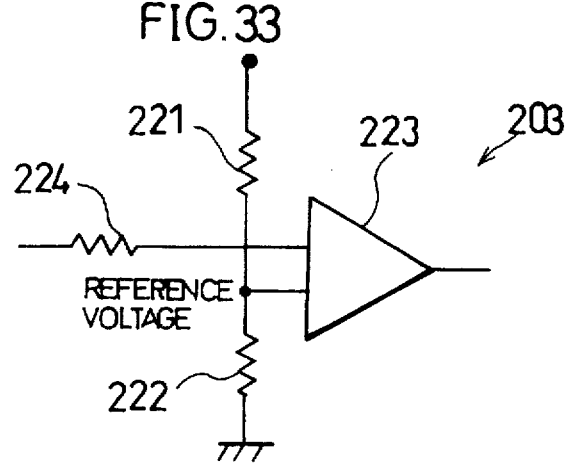
FIG. 33 is a schematic circuit diagram depicting the structure of a peak current detecting section in the air conditioner of FIG. 32.

As shown in FIG. 33, the peak current detecting section 203 includes resistors 221 and 222 for use in generating a reference voltage, a comparator 223 and an input resistor 224. The peak current detecting section 203 detects an overcurrent when the detection voltage (current value) to be inputted through the input resistor 224 is above the reference voltage generated by the resistors 221 and 222.

Figure 34:
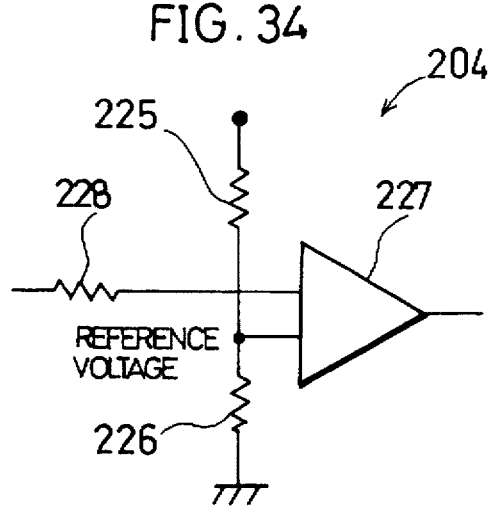
FIG. 34 is a schematic circuit diagram depicting the structure of an average current detecting section in the air conditioner of FIG. 32.

The average current detecting section 204 is provided for detecting an average current in excess of a predetermined threshold based on the current value converted into the voltage value by the current detecting resistor 44. As shown in FIG. 34, the average current detecting section 204 includes resistors 225 and 226 for use in generating the reference voltage, a comparator 227 and an input resistor 228. The average current detecting section 204 detects an overcurrent when the detection voltage (current value) to be inputted through the input resistor 228 is above the reference voltage generated by the resistors 225 and 226.

Figure 35:
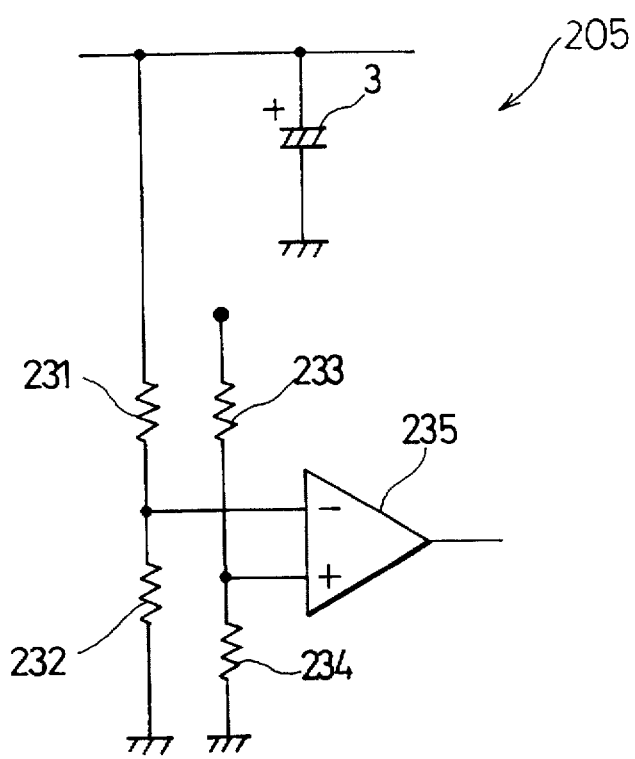
FIG. 35 is a schematic circuit diagram depicting the structure of an excess voltage rise detecting section in the air conditioner of FIG. 32.
Figure 36:
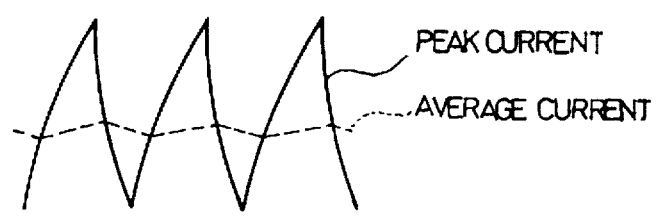
FIG. 36 is a view showing a waveform representing a current flowing in the active filter in the air conditioner of FIG. 32.

The reference voltage to be generated from the average current detecting section 204 is set to a low voltage different from the reference voltage generated from the peak current detecting section 203. As shown in FIG. 35, the excess voltage rise detecting section 205 includes resistors 231 through 234, and the comparator 235. The resistors 231 and 232 constitute the voltage dividing circuit for dividing an output voltage from the active filter 5. The resistors 233 and 234 constitute a reference voltage circuit for generating a reference voltage by dividing a direct current. The comparator 235 detects an excess voltage rise when the detected voltage by the resistors 231 and 232 is above a reference voltage.

The integrating circuit 206 is composed of a resistor 206a and a condenser 206b. The integrating circuit 206 outputs an integral value of the detection signal from the average current detecting section 204 and the excess voltage rise detecting section 205.

The target value setting section 207 is basically composed of an error amplifier. The target value setting section 207 generates a value in proportion to a difference between the reference voltage VREF and an output from the output voltage detecting section 62. The target value setting section 207 is arranged such that the integrating circuit 206 is connected to the same terminal as the terminal to which the reference voltage $V_{REF}$ is to be inputted. The arithmetic unit 208 outputs a calculated value $I_M$ by the arithmetic expression $I_M=AB/C$ wherein A is an output from the target value setting section 207, B is an output from the input phase detecting section 202 and C is an output (effective value) from the input voltage detecting section 61'. The arithmetic unit 208 compares a differential signal between the calculated value $I_M$ and the input current with a triangular wave from the oscillator 210, and outputs the PWM signal.

Here, the input current to be compared with the calculated value $I_M$ is detected by, for example, the input current detecting section 65 (see FIG. 7) of the second embodiment.

The flip flop 209 includes three input terminals $R_1$, $R_2$ and S, and a single output terminal Q. In the flip flop 209, the detection signal from the peak current detecting section 203 and the calculated value from the arithmetic unit 208 are respectively inputted to the input terminals $R_1$ and $R_2$, while a pulse signal having a predetermined frequency is inputted from the oscillator 210. The flip flop 209 is a RS flip flop for outputting drive data based on an input signal from the input terminal S and an input signal from the input terminal $R_1$ or the input terminal $R_2$.

In the air conditioner having the described arrangement of the present invention, based on an output from the bridge rectifying circuit 2, the input voltage from the active filter 5 is detected by the input voltage detecting section 61', and the input current to the active filter 5 is detected by the input current phase detecting section 202. These detection values are inputted to the arithmetic unit 208.

The output voltage from the active filter 5 is detected by the output voltage detecting section 62 based on the terminal voltage of the smoothing condenser 3. The existence of the excess voltage rise of the active filter 5 is determined by the excess voltage rise detecting section 205. The detection value of the output voltage is inputted to the target value setting section 207.

Furthermore, based on the voltage converted from the current in the current detecting resistor 44, the overcurrent is detected by the peak current detecting section 203, and the overcurrent is detected by the average current detecting section 204. The detection signal from the excess voltage rise detecting section 205 and the detection signal from the average current phase detecting section 204 are inputted to the target value setting section 207 through the integrating circuit 206 where a noise component is removed.

In the target setting section 207, the detection value from the output voltage detecting section 62 is corrected by the reference voltage $V_{REF}$. After the correction, the detection value is sent to the arithmetic unit 208 as a target value. In this state, if an overcurrent or an overvoltage generates in the active filter 5, the detection signal from the integrating circuit 206 becomes low level, and thus the reference voltage $V_{REF}$ drops, and the target value becomes smaller.

In the arithmetic unit 208, the following calculation is performed based on a detection value from the input voltage detecting section 61', the detection value from the input current phase detecting section 202 and the target value from the target value setting section 207. The result of calculation is outputted as a value for determining a switching width of the power transistor 43.

In the flip flop 209, drive data is determined based on an output from the arithmetic unit 208 and a pulse signal outputted at a switching frequency from the oscillator 210. Then, the driving circuit 70 drives a power transistor 63 by outputting a driving signal based on the drive data thus obtained.

Upon detecting the excess voltage rise by the excess voltage rise detecting section 205 or detecting the overcurrent by the average current detecting section 204, a target value drops. Thus, the driving circuit 70 stops an output from the power transistor 43. Furthermore, in the flip flop 209, in response to a peak current detecting signal outputted from the peak current detecting section 203, the drive data which forces the power transistor 43 to be stopped is determined based on the peak current detection signal and the pulse signal.

The air conditioner in accordance with the present embodiment includes the excess voltage rise detecting section 205. Therefore, even if the output voltage detecting section 62 is not in the normal operation state due to some problem, an abnormality in output from the active filter 5 is detected by the excess voltage rise detecting section 205. Therefore, since in the switching control section 201, the protection function is activated so as to eliminate the abnormality in output, an application of an overvoltage to components such as the smoothing condenser 3, etc., can be promptly eliminated.

In general, the air conditioner is arranged such that the inverter circuit includes switching power devices such as a transistor, etc., for commutating a large current, and the commutation is repetitively performed by these devices. For this reason, the commutation noise generated with the commutation appears along the AC power source line of the active filter.

On the other hand, the overcurrent protection circuit of the active filter 5 in the air conditioner of the present invention detects a voltage generated from the current detecting resistor 44 as a current, and performs a protecting operation by comparing the peak value of the detection value with the reference value. However, since the peak current shown by the solid line in FIG. 36 and the average current shown by the broken line flow in the current detecting resistor 44, in order to detect the overcurrent also with respect to the average current, it is required to lower the detection level of the overcurrent.

However, when the overcurrent detection level is lowered, the problem is presented in that the overcurrent protecting circuit may be activated by the commutation noise.

In order to counteract the described problem, the air conditioner in accordance with the present embodiment is provided with the average current detecting section 204 which permits a higher overcurrent detection level of the peak current detecting section 203 to be set. As a result, the peak current detecting section 203 can be prevented from being operated by mistake by the line noise generated from the active filter 5.

The average current detecting section 204 and the excess voltage rise detecting section 205 perform detecting operations by the comparators 227 and 235 as described earlier. The level of the noise generated from the active filter 5 is raised by the line noise. Therefore, when the output from the comparator 227 and 235 is directly applied to the feedback system, the feedback control is either dispersed or stopped.

On the other hand, the air conditioner in accordance with the present embodiment is provided with the integrating circuit 206. Therefore, a detection signal having a smaller width as being outputted by mistake due to the noise is removed from the detection signal from the average current detecting section 204 and the excess voltage rise detecting section 205 almost completely. Therefore, the dispersion or the stoppage of the feedback control caused by the noise can be prevented.

Furthermore, in the air conditioner in accordance with the present invention, based on the detection value from the output voltage detecting section 62, which is corrected by the detecting signal from the average current detecting signal 204 by the target value setting section 207, the ON time duration of the power transistor 43 is determined. As a result, within the operable range of the air conditioner, when the load is suddenly varied, or when a heavy load is incurred, the ON time duration of the power transistor 43 is set shorter so as to reduce the load incurred to the power transistor 43. Therefore, even in the described state, the active filter 5 can be operated under the stable condition, and the operation of the air conditioner of the present embodiment can be continued.

Fifth Embodiment

The following description will discuss the fifth embodiment of the present invention in reference to FIG. 37 through FIG. 40.

Figure 37:
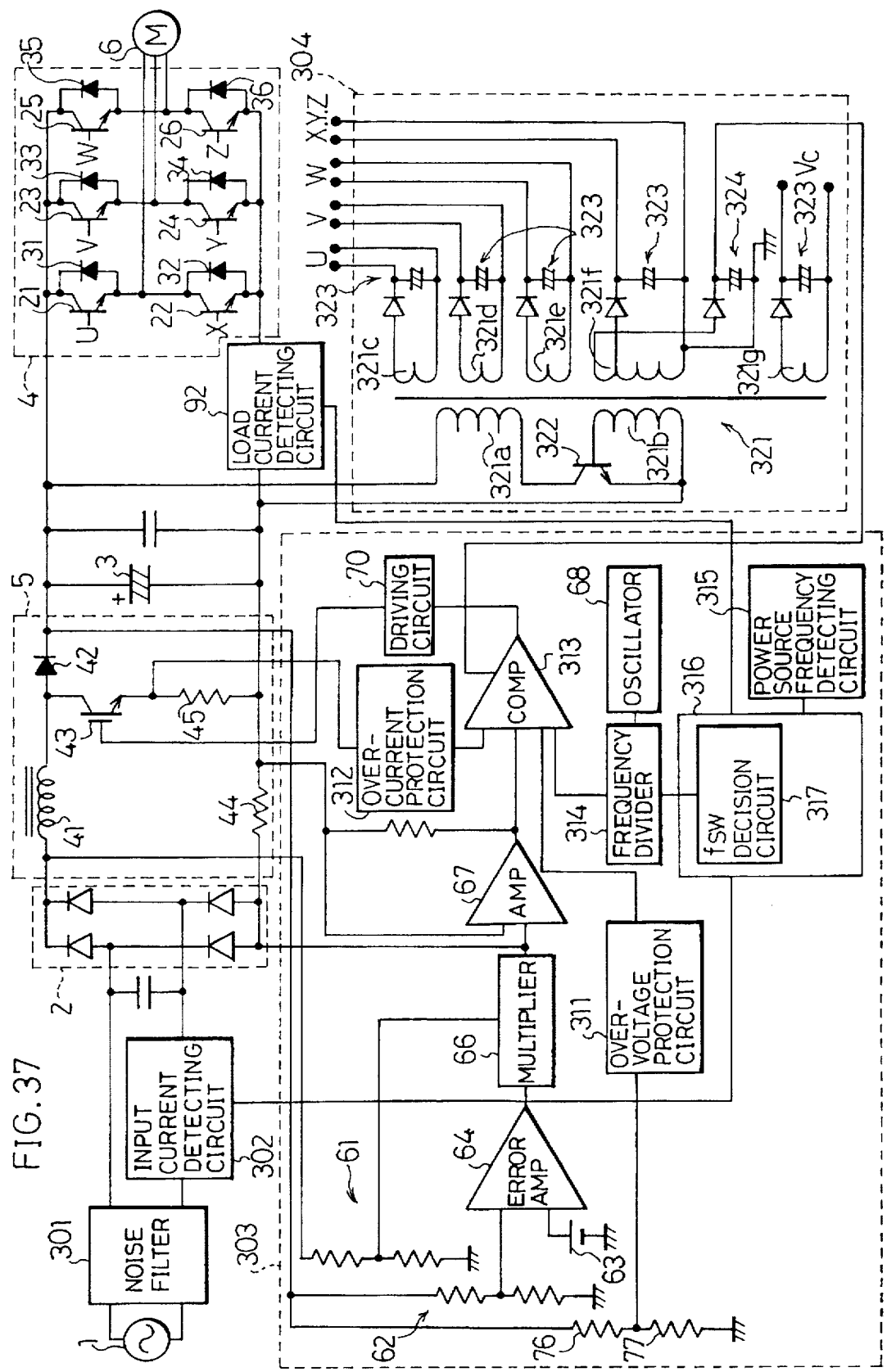
FIG. 37 is a schematic circuit diagram depicting the structure of an air conditioner in accordance with the fifth embodiment of the present invention.

As shown in FIG. 37, the air conditioner in accordance with the present embodiment is provided with a noise filter 301 and an input current detecting section 302 formed between the commercial power source 1 and the bridge rectifying circuit 2 along the AC power source line. The air conditioner in accordance with the present invention also includes a switching control section 303 for controlling a switching of the power transistor 43 and a power source section 304 for the inverter circuit 4. The active filter 5 is provided with a resistor 45 for use in detecting an overcurrent on the emitter side of the power transistor 43. The noise filter 301 is a filter for eliminating a line noise from the commercial power source 1. The input current detecting circuit 302 is a circuit for detecting an input current to be supplied to the inverter circuit 4 from the commercial use power source 1.

The basic configuration of the switching circuit 303 is the same as that of the switching control section 60 (see FIG. 7) of the second embodiment. The switching circuit 303 includes the input voltage detecting section 61, the output voltage detecting section 62, the reference power source 63, the error amplifier 64, the multiplier 66, the amplifier 67, the oscillator 68 and the driving circuit 70. The air conditioner of the present embodiment also includes resistors 76 and 77, an overvoltage protection circuit 311, an overcurrent protection circuit 312, a comparator 313, a frequency divider 314, a power source frequency detecting circuit 315, a microcomputer 316, etc. The input voltage detecting section 61 and the output voltage detecting section 62 are constituted respectively by voltage dividing resistors.

The overvoltage protection circuit 311 corresponds to the circuit (see FIG. 7) composed of the resistors 71 and 72 and the comparator 74. The overvoltage protection circuit 311 compares the output voltage (detection voltage) from the active filter 5 detected by the resistors 76 and 77 with the protective voltage generated from the resistors 71 and 72, and if the detection voltage is above the protective voltage, the output from the driving circuit 70 is forced to be stopped.

The overcurrent protection circuit 312 is a circuit for outputting an overcurrent protecting signal when the current flowing through the power transistor 43 detected by the resistor 45 is an overcurrent. The comparator 313 compares an output from the oscillator 68 divided by the frequency divider 314, the output from the amplifier 67, the output from the overvoltage protection circuit 311 and the output from the overcurrent protection circuit 312 so as to output a PWM signal.

The power source frequency detecting circuit 315 is a circuit for detecting the power source frequency of the commercial power source 1. The microcomputer 316 is a control section including a switching frequency determining circuit 317 (fSW determining circuit). The switching frequency determining circuit 317 determines the switching frequency of the power transistor 43 based on outputs from the input current detecting circuit 302 and the load current detecting circuit 92.

The power source section 304 generates a control signal to be applied to the base of the transistors 21 through 26 of the inverter circuit 4. The power source section 304 also generates a power source voltage for the switching control section 303. The power source section 304 is constituted by a DC/DC converter including a high frequency transformer 321.

The primary coils 321a and 321b of the high frequency transformer 321 are connected via a switching transistor 322 connected in series, and are also connected to the power source line on the output side of the active filter 5. On the secondary side of the high frequency transformer 321, secondary coils 321c through 321g are provided. In each of the secondary coils 321c through 321g, a rectifying circuit 323 composed of a diode and a condenser is formed.

The U-phase, V-phase or W-phase power circuits respectively composed of the secondary coils 321c through 321e and the rectifying circuits 323 are connected to respective bases of the transistors 21, 23 and 25.

In the voltage rise tap of the secondary coil 321f, another rectifying circuit 324 composed of a diode and a condenser is provided. The power source for the switching control section 303 is composed of the rectifying circuit 324 and the secondary coil 321f. The control power source for generating the control voltage Vc of the inverter circuit 4 is composed of the secondary coil 321g and the rectifying circuit 323.

According to the air conditioner having the described arrangement, an error of the output voltage from the active filter 5 is outputted with respect to the reference voltage is outputted by the error amplifier 64. In the multiplier 66, the input voltage is corrected by the error. As a result, the input voltage waveform corrected by the output voltage waveform is obtained.

The output current from the bridge rectifying circuit 2 is detected by the current detecting resistor 44, and is amplified by the amplifier 67 in synchronous with the input voltage waveform from the multiplier 66. Therefore, the output from the amplifier 67 has a waveform in synchronous with the input voltage waveform from the multiplier 66.

Figure 38:
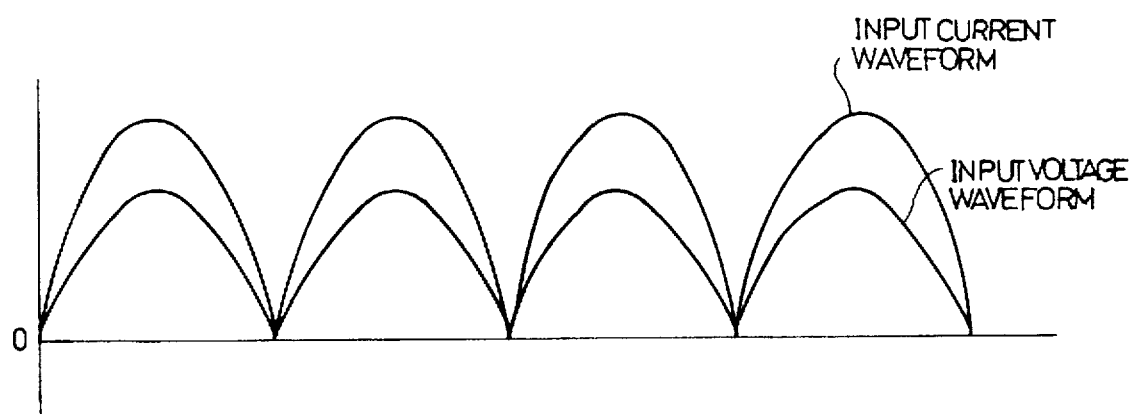
FIG. 38 is a view showing a waveform representing the relation between the input voltage and input current in the air conditioner of FIG. 37.

In the comparator 313, the output from the amplifier 67 is compared with a triangular wave obtained by dividing the frequency of the output from the oscillator 68 by the frequency divider 314 so as to generate the PWM signal. The power transistor 43 switches a current by the PWM signal applied to the control electrode through the driving circuit 70. As a result, as shown in FIG. 38, the current of the active filter 5 becomes a sine wave in phase with the input voltage waveform.

Figure 58:
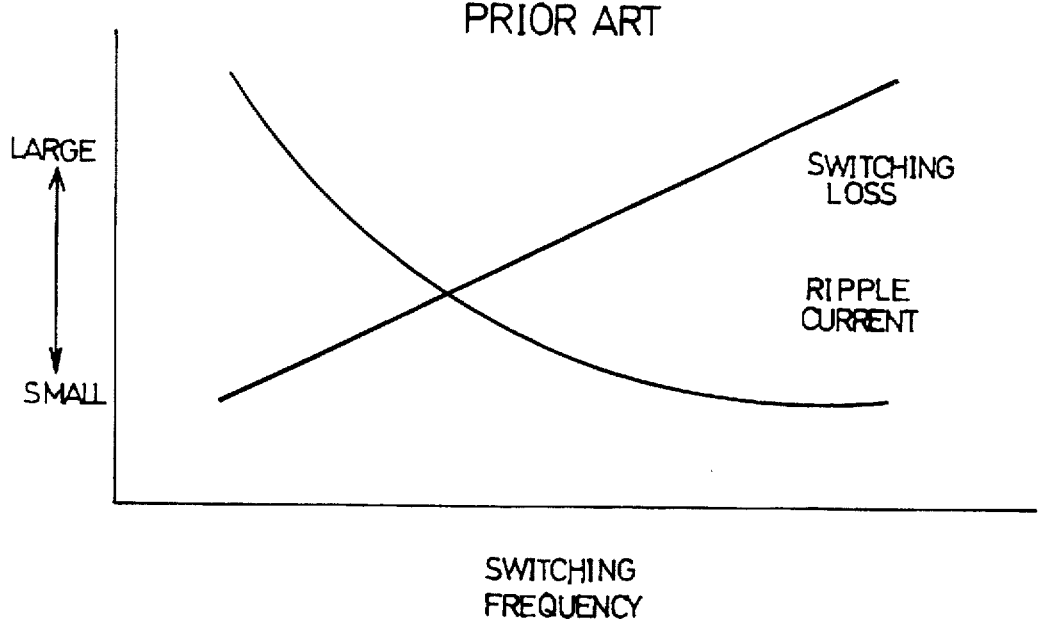
FIG. 58 is a graph showing the relation among a switching frequency and switching loss of the power transistor, and a ripple current in the active filter.
Figure 59:
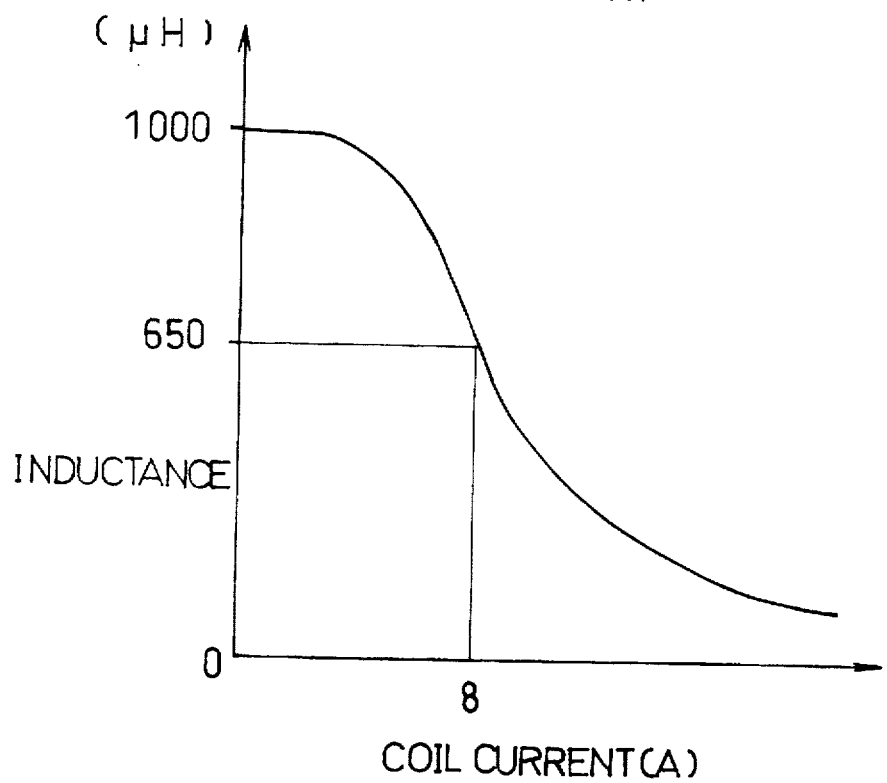
FIG. 59 is a graph showing the relation between a coil current and the inductance of a choke coil.
Figure 60:
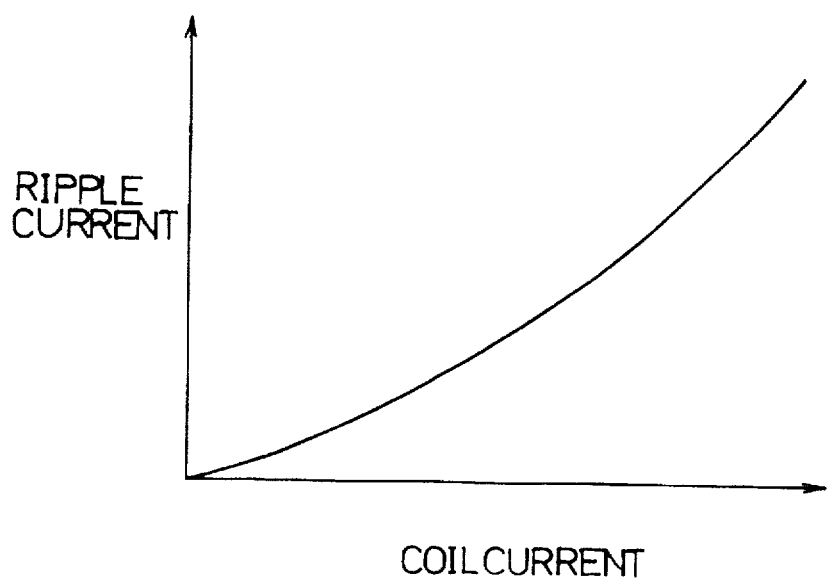
FIG. 60 is a graph showing the relation between the coil current and ripple current.
Figure 61:
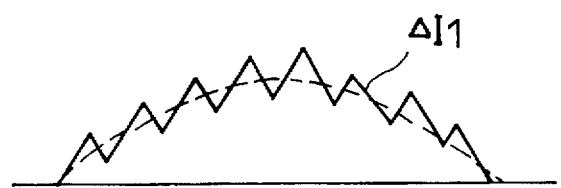
FIG. 61 is a view showing a waveform of the ripple current when the coil current is small.
Figure 62:
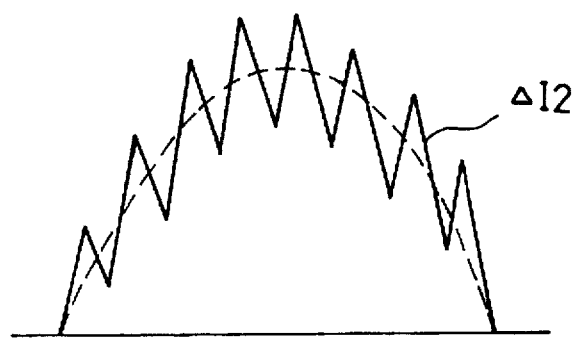
FIG. 62 is a view showing a waveform of the ripple current when the coil current is large.
Figure 63:
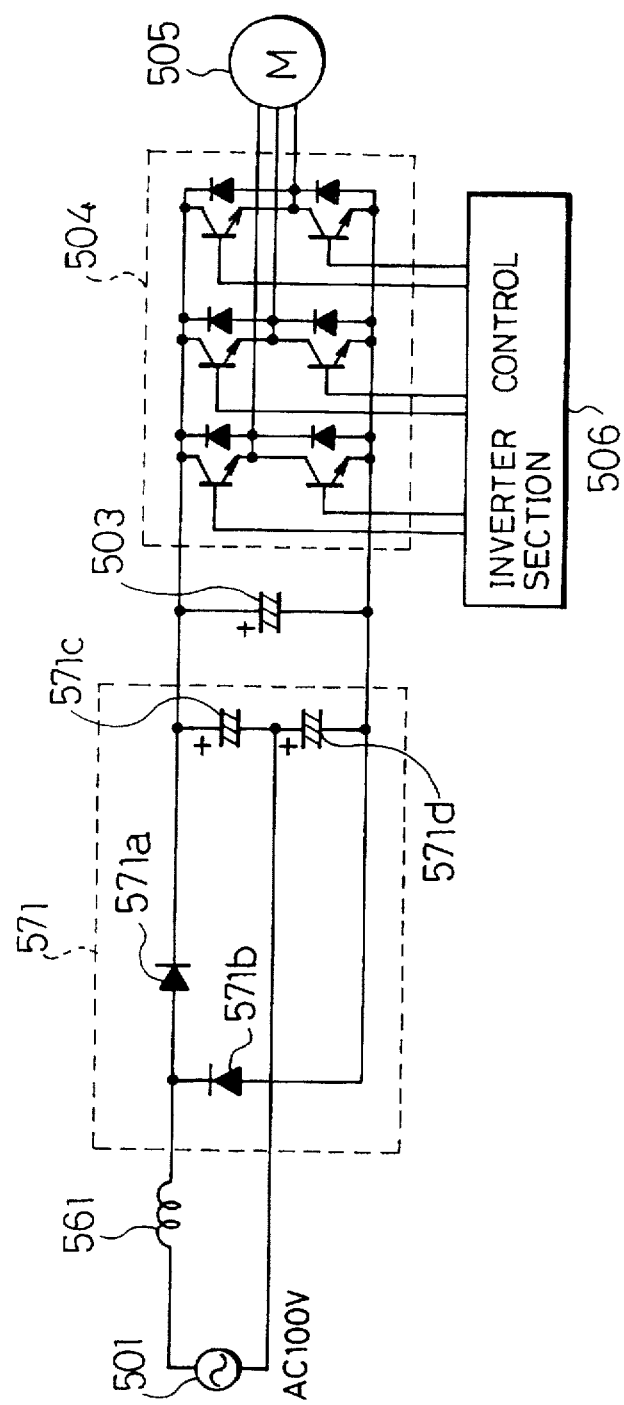
FIG. 63 is a schematic circuit diagram depicting the structure of a conventional air conditioner of 100 V model.
Figure 64:
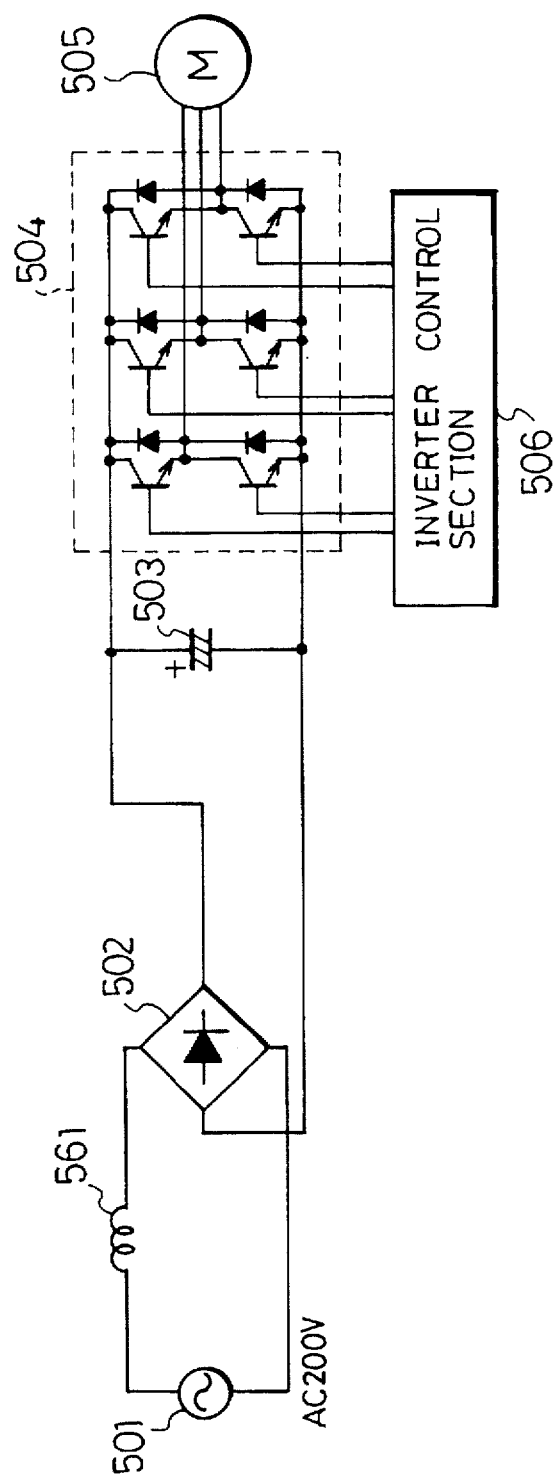
FIG. 64 is a schematic circuit diagram depicting the structure of a conventional air conditioner of 200 V model.

The switching frequency $f_{sw}$ of the power transistor 43, the switching loss and the ripple current $\Delta I$ of the choke coil 41 have the following correlation. Namely, as described earlier in reference to FIG. 58, when the switching frequency $f_{sw}$ is raised, the ripple current $\Delta I$ is suppressed; however, the switching loss increases on the contrary.

According to the air conditioner of the present embodiment, a change in ripple of the input current due to changes in power source frequency, input current, load current, etc., is suppressed by controlling the frequency dividing ratio of the frequency divider and altering the switching frequency $f_{sw}$.

When the input current is detected by the input current detecting circuit 302, the load current is detected by the load current detecting circuit 92 or the power source frequency is detected by the power source frequency detecting circuit 315, the value or the change is inputted to the microcomputer 316 as a detection value. Based on the data set beforehand, the microcomputer 316 determines a frequency dividing ratio by applying arithmetic operation to these values, and outputs a signal for determining the frequency dividing ratio from the switching frequency determining circuit 317.

Then, the frequency dividing ratio of the frequency divider 314 is altered based on the signal, and thus the frequency of the triangular wave to be applied to the comparator 313 is also altered. As a result, the switching frequency $f_{sw}$ increases (or decreases) in proportion to the input current or the output current.

Figure 39:
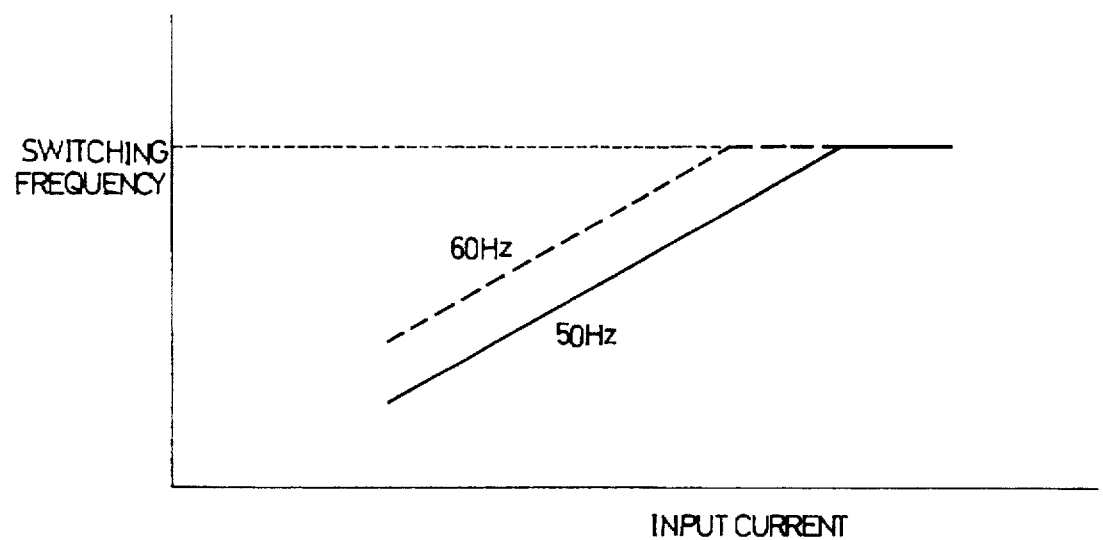
FIG. 39 is a graph showing the relation between the input current to the active filter and a switching frequency when a power source frequency changes in the air conditioner of FIG. 37.

When the power source frequency detecting circuit 315 detects that the power source frequency is high (low), the microcomputer 316 controls so as to vary the switching frequency $f_{sw}$ in proportion to the power source frequency based on the data set beforehand as shown in FIG. 39. For example, when the power source frequency is raised from 50 Hz to 60 Hz, the microcomputer 316 outputs a signal for multiplying the frequency dividing ratio by 1.2.

When two or more detection values are outputted at one time from the input current detecting circuit 302, the load current detecting circuit 92 and the power source frequency detecting circuit 315, the microcomputer 316 determines a frequency dividing ratio of the frequency divider 314 by calculating based on the data stored beforehand. Therefore, the power transistor 43 can be driven at an optimal switching frequency.

On the other hand, in the power source section 304, the DC output from the active filter 5 is applied to the primary coil 321a of the high frequency power transformer 321 and the switching transistor 322 to be converted into a high frequency current. Then, the high frequency current is rectified by the secondary coils 321c through 321f of the high frequency transformer 321 to be supplied to respective bases of the transistors 21 through 26 of the inverter circuit 4.

In the high frequency transformer 321, the U-phase power source, the V-phase power source and the W-phase power source obtained from the secondary coils 321c through 321e are insulated from one another to be independent power sources. The output from each power source is supplied to the respective bases of the U-phase transistor 21, the V-phase transistor 23 and the W-phase transistor 25.

On the other hand, the respective emitters of the X-phase transistor 22, the Y-phase transistor 24 and the Z-phase transistor 26 in the inverter circuit 4 are connected to ground. Therefore, a common power source is used for driving the transistors 22, 24 and 26. The power source composed of the secondary coil 321f and the rectifying circuit 323 is an XYZ-phase power source which is in common among the X-phase, the Y-phase and the Z-phase. The output from the XYZ-phase power source is supplied to the bases of the transistors 22, 24 and 25 in common.

Additionally, since the respective points connected to ground of the active filter 5 and the inverter circuit 4 have the same potential, the point connected to ground of the power source of the active filter 5 is in common with the point connected to ground of the X-phase, Y-phase and Z-phase power source of the inverter circuit 4. In the air conditioner of the present embodiment, the voltage rise tap is formed in the secondary coil 321f, and the output from the voltage rise tap is rectified to be supplied to the switching control section 303.

In the described arrangement, the output from the coil 321f is fetched by the voltage rise tap. However, in replace of the voltage rise tap, the output may be fetched by the voltage drop circuit (not shown).

Generally, it is required that the power source for a comparator 313, etc., in the switching control section 303 outputs a voltage of not less than 15 V. In the described arrangement, the power source can be used in common with the X-phase, Y-phase and Z-phase power source of the inverter circuit 4. Therefore, a simplified circuit, and a reduction in cost can be achieved.

Figure 40:
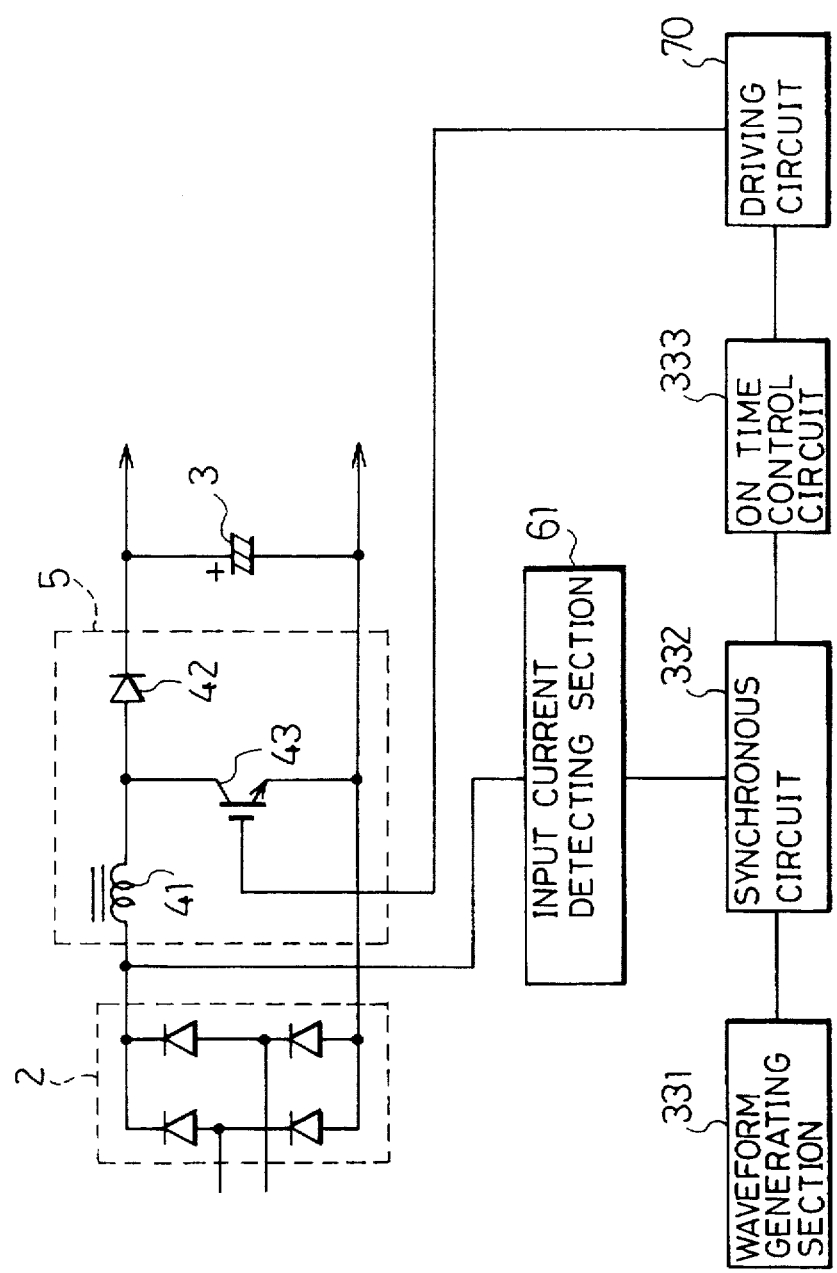
FIG. 40 is a schematic circuit diagram depicting a modified structure of an air conditioner in accordance with the fifth embodiment of the present invention.

The active filter 5 has the problem that a distortion in the input voltage may occur by the effect of the input current. In order to eliminate this problem, the arrangement shown in FIG. 40 is adopted wherein the waveform generating circuit 331, the synchronizing circuit 332 and the ON-time duration control circuit 333 are provided in place of the input voltage detecting section 61, the output voltage detecting section 62, the reference voltage source 63, the error amplifier 64 and the multiplier 66, the amplifier 67 and the oscillator 68.

The waveform generating circuit 331 is, for example, composed of a microcomputer. The waveform generating circuit 331 stores a value of a sine wave (sin θ) beforehand with respect to the phase angle θ of the input current, and generates the waveform like the sine wave. The synchronizing circuit 332 is provided for synchronizing the waveform like the sine wave with the phase of the input voltage detected by the input voltage detecting section 61. The ON-time duration control circuit 333 controls the power transistor 43 so that the ON-time duration $T_{on}$ with respect to the switching period T of the power transistor 43 satisfies $T_{on}=kT(1-\sin \theta)$ (k is a constant) by the outputs from the synchronizing circuit 332 and the synchronizing circuit 332.

By the described arrangement, based on the waveform like the sine wave generated at a phase angle of θ, the ON time duration of the switching of the power transistor 43 is controlled by the digital system. In the described manner, the input current can be shaped in a form almost like the sine wave even in a strain occurs in the input current, thereby preventing the strain of the input voltage by the effect of the input current.

Sixth Embodiment

The following description will discuss the sixth embodiment of the present invention with reference to FIG. 41 through FIG. 48.

Figure 41:
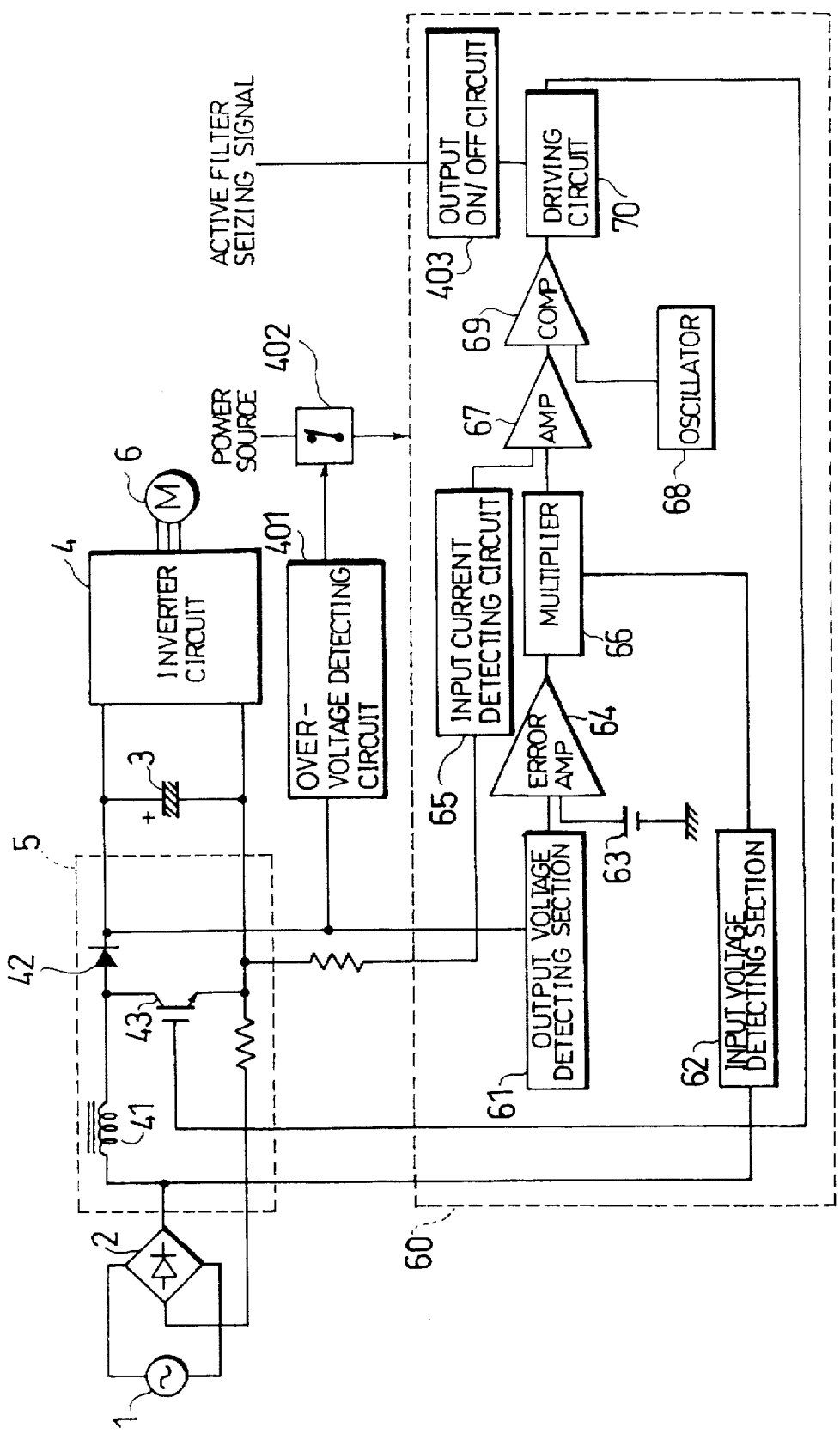
FIG. 41 is a schematic circuit diagram depicting the structure of an air conditioner in accordance with the sixth embodiment of the present invention.

As shown in FIG. 41, the air conditioner in accordance with the present embodiment includes an overvoltage detecting circuit 401 and a switch 402 other than the switching control section 60. The switching control section 60 further includes an output ON/OFF circuit 403. The output ON/OFF circuit 403 is provided for switching ON or OFF an output from the driving circuit 70 based on an active filter seizing signal from an inverter control section (not shown).

The overvoltage detecting circuit 401 is a circuit having an almost same function as the overvoltage protection circuit composed of resistors 71 through 73, 76 and 77 and the comparator 74 (see FIG. 7) in the air conditioner of the second embodiment. The overvoltage detecting circuit 401 outputs a detection signal when the output voltage from the active filter 5 is above a predetermined level. The switch 402 is a switch for interrupting and connecting the power source supply line from and to the switching control section. The switch 402 is set in the OFF position in response to the detection signal supplied thereto.

According to the described arrangement, even if an abnormality in output voltage has occurred in the output voltage from the active filter 5 due to a fault of the switching control section 60, the supply of the power to the switching control section 60 is stopped by turning OFF the switch 402. As a result, the occurrence of the PWM signal from the comparator 69 can be surely stopped, and the voltage rise by the active filter 5 is stopped.

Figure 42:
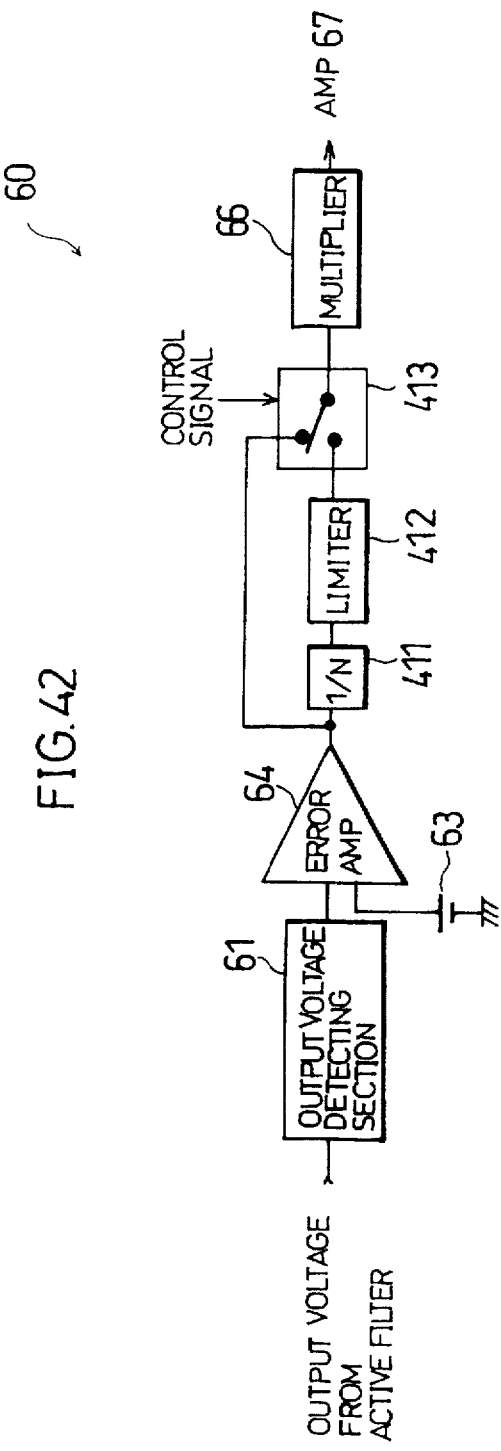
FIG. 42 is a block diagram depicting the structure of a major part of another switching control section in the air conditioner of FIG. 41.

As shown in FIG. 42, in the switching control section 60, the voltage dividing circuit 411 (1/N in the figure), the limiter 412 and a switch 413 are provided.

The voltage dividing circuit 411, the limiter 412 and the switch 413 are connected in series between the error amplifier 64 and the multiplier 66. The voltage dividing circuit 411 is a circuit for dividing the output from the error amplifier 64 by N. The limiter 412 is a circuit for limiting the output from the voltage dividing circuit 411 so as not to be less than a predetermined value.

The switch 413 connects the limiter 412 and the multiplier 66 at a starting period of the active filter 5. On the other hand, the switch 413 connects the error amplifier 64 and the multiplier 66 while the active filter 5 is being activated except the starting period. The operation of the switch 413 is controlled by a control signal indicating whether the active filter 5 is started or not.

Here, the starting period is defined as a time period from immediately after the switching control signal starts generating from the switching control section 43 until the output voltage from the active filter 5 reaches a vicinity of the target voltage.

In the described arrangement, the output from the error amplifier 64 is directly inputted to the multiplier 66 except during the starting period of the active filter. In this case, the PWM signal is generated as in the switching control section 60 of the second embodiment.

The output from the error amplifier 64 is inputted to the multiplier 66, through the voltage dividing circuit 411 and the limiter 412, at the starting period of the active filter 5. As described, as the voltage dividing circuit 411 divides the output from the error amplifier 64 to 1/N, the target output voltage from the active filter 5 appears to be low.

Figure 43:
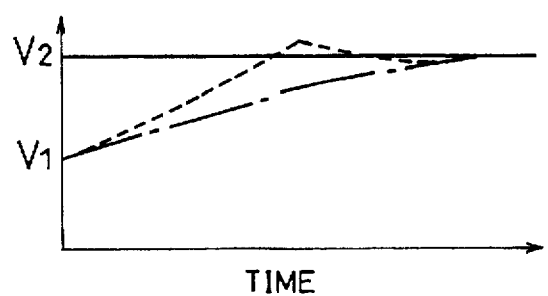
FIG. 43 is a graph showing how the output voltage from the active filter reaches a target voltage at the time of activation.

In the air conditioner shown in FIG. 41, the output voltage reaches a target value after it is once raised beyond the target value from the initial voltage as shown by the short dashed line in FIG. 43. On the other hand, in the air conditioner provided with the voltage dividing circuit 411, the output voltage is gradually raised from the initial voltage to the target value as shown by an alternate short dashed line in FIG. 43. As a result, the time required for the output voltage to reach the target voltage becomes longer than that in the air conditioner shown in FIG. 41. However, it is less likely that the output voltage is over-raised beyond the target voltage.

In the described arrangement, if the divided output from the voltage dividing circuit 411 is still too large, the output voltage is reduced to not more than the predetermined value by the limiter 412. As a result, the rise in output voltage per unit time can be reduced to not more than the predetermined value. Therefore, the possibility of having an excess output voltage can be still reduced.

In the steady state where the output voltage reaches the target voltage, in response to the output voltage varying according to the variation in power source or load, the variation is suppressed instantaneously by the feedback control of the switching control section 60. Therefore, in the steady state of the output voltage, in order to prevent a delay of the response rate caused by operating the voltage dividing circuit 411 and the limiter 412, the switch 413 is switched to the error amplifier 64.

Figure 44:
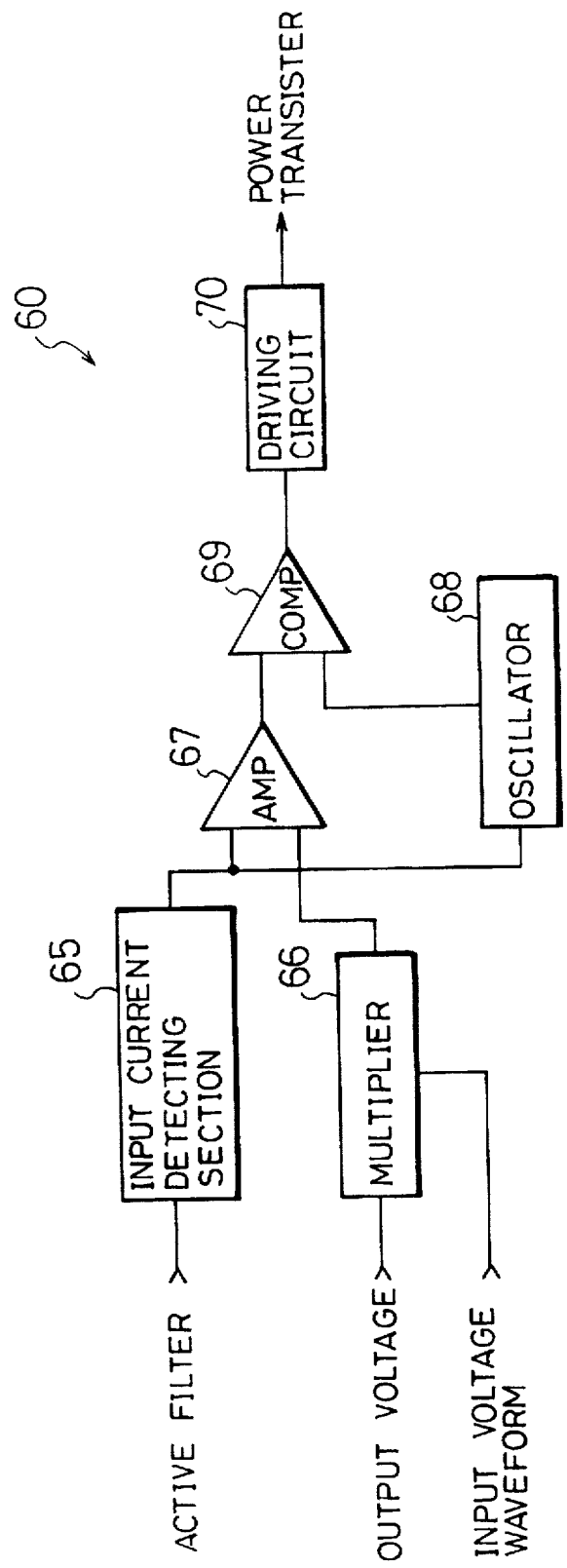
FIG. 44 is a block diagram depicting the structure of a major part of another switching control section in the air conditioner of FIG. 41.

The air conditioner of the present embodiment adopts another configuration of the switching control section 60 shown in FIG. 44. In this arrangement, the oscillation frequency of the oscillator 68 varies in response to the output from the input current detecting section 65.

According to the described arrangement, the oscillation frequency varies according to the weight of the load. Namely, when the load current is large, the oscillation frequency is low, and when the load current is small, the oscillation frequency is high.

Here, the output from the multiplier 66 includes the DC voltage, i.e., the terminal voltage of the smoothing condenser 3 and the input voltage waveform from the input voltage detecting section 62. Therefore, irrespectively of the value of the load current of the oscillator 68, when the oscillator 68 oscillates at a constant oscillation frequency, in the case where the load current is small, i.e., a drop in DC voltage due to consumption in load per unit time is small, the voltage drop becomes smaller than the voltage rise by the active filter 5.

Therefore, the direct current is kept increasing. However, since the output from the multiplier 66 has a priority over the element of the DC voltage, the effect of the element of the input voltage waveform is reduced. As a result, it becomes difficult or even becomes impossible to shape the current waveform to be closer to the input voltage waveform.

Figure 45:
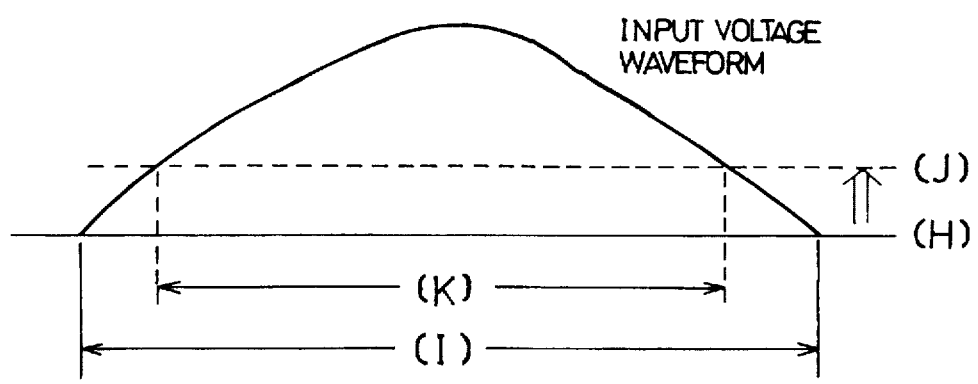
FIG. 45 is a view showing a waveform representing the relation between the input voltage and a PWM signal during the operation of the switching control section of FIG. 44.

As shown in FIG. 45, in the state where the load current is not small, the target value of the PWM signal by the element of the DC voltage is H, and even if the element of an input voltage waveform is added, the target value is shown entirely on the wave. On the other hand, when the load is small, as shown by the dashed line, the target value of the PWM signal by the element of the DC voltage becomes J. Therefore, when adding the element of the input voltage waveform, the target value is made narrower to a part K of the waveform.

On the other hand, if the oscillation frequency of the oscillator 68 becomes high when the load current is small, the period of the switching control signal to be outputted from the driving circuit 70 may become shorter, or the duty ratio of the switching control signal may become smaller. Therefore, a rise in DC voltage due to a signal pulse of the switching control signal can be suppressed. As a result, the variation range of the target value from H to J shown in FIG. 45 becomes smaller, and the width of the K becomes wider, and the PWM signal is obtained almost entirely on the input voltage waveform. Therefore, even when the load current is small, the harmonic current can be suppressed, and the power factor can be improved.

When the load current is large, the PWM signal can be obtained throughout the input voltage waveform without varying the oscillation frequency. On the other hand, if the oscillation frequency becomes high when the load current is large, the loss in the power transistor 43 increases, and the amount of loss becomes greater as the load current increases. Since this causes a rise of the specification of the power transistor 43, i.e., an increase in cost, it is preferable to increase the oscillation frequency only when the load current is small.

Figure 46:
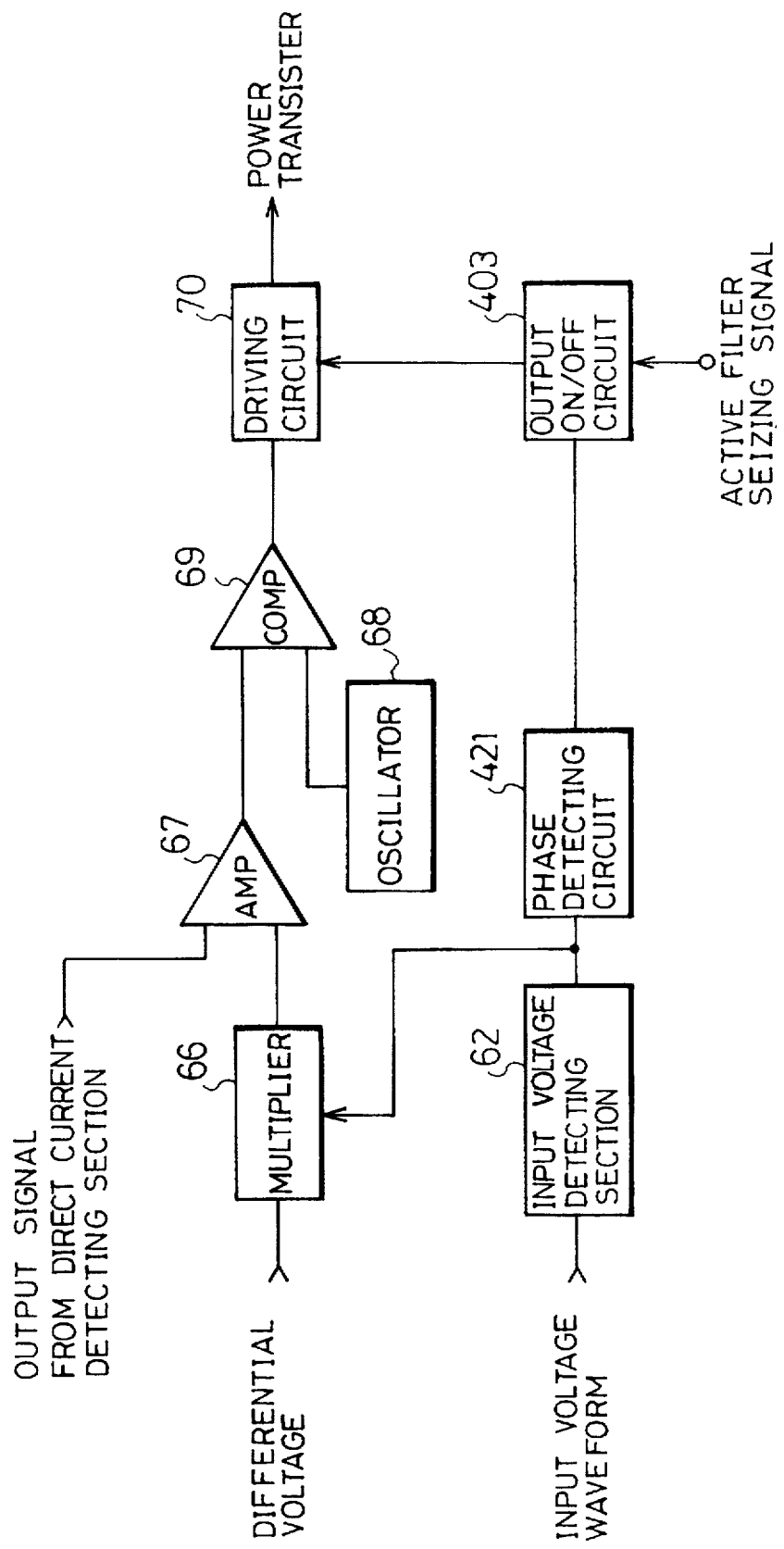
FIG. 46 is a block diagram depicting the structure of a major part of still another switching control section in the air conditioner of FIG. 41.

The air conditioner of the present invention adopts a switching control section 60 having a still another arrangement shown in FIG. 46. In this arrangement, the phase detecting circuit 421 is provided between the input voltage detecting section 62 and the output ON/OFF circuit 403. The phase detecting circuit 421 is a circuit for detecting the phase at a zero cross point in the waveform of the input voltage detected by the input voltage detecting section 62.

Figure 47:
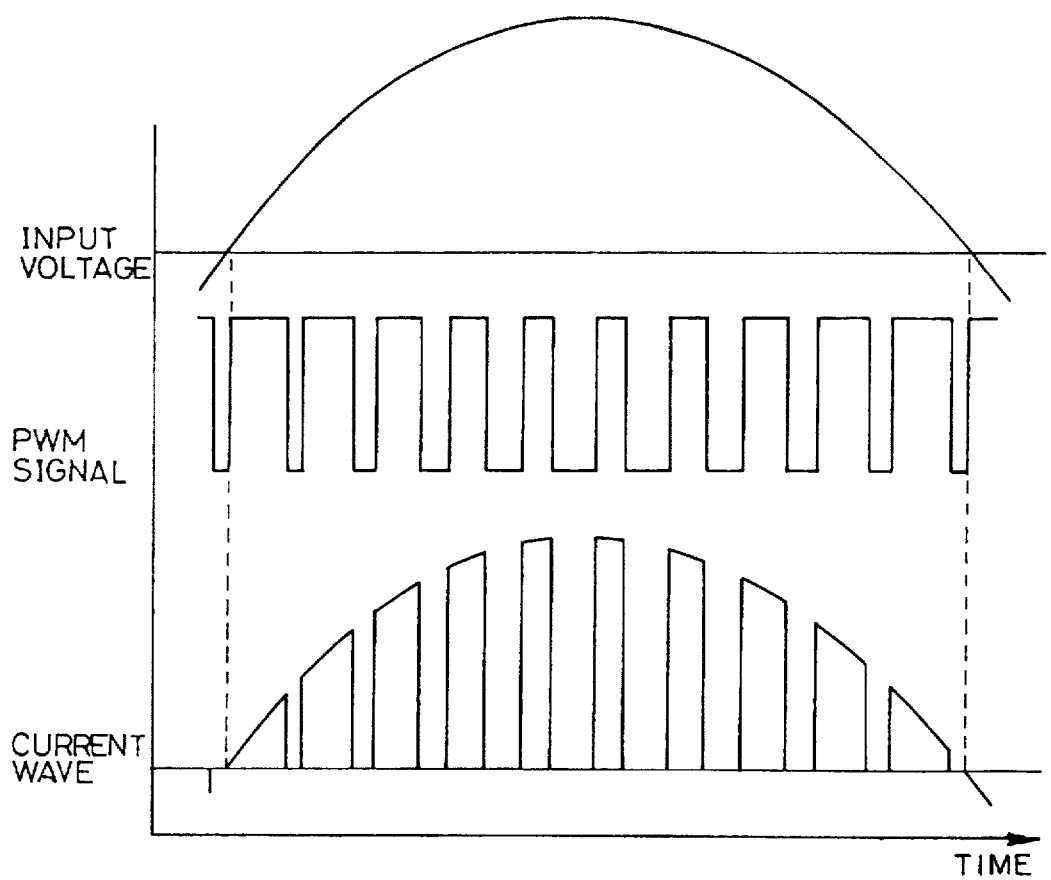
FIG. 47 is a view showing a waveform representing the relation between the input voltage and the PWM signal during the operation of the switching control section of FIG. 46.

The switching control section 60 controls a switching of the power transistor 43 so as to approximate the current waveform to the input voltage waveform, and the waveform of the input voltage. Here, each waveform of the input voltage, the PWM signal and the current flowing across the power transistor 43 are as shown in FIG. 47. In the figure, the the current flowing across the power transistor 43 increases at a peak point of the input voltage.

When starting the active filter 5, the difference between the output voltage and the target voltage is maximized, and accordingly the duty ratio of the PWM signal is also maximized. In this state, the current flowing through the power transistor 32 is also maximized.

The maximum current value is a factor of determining the maximum rate of the power transistor 43. More specifically, when the maximum current value (maximum rate) becomes high, the cost of the power transistor 43 increases. Therefore, by suppressing the maximum current value, the cost of the power transistor 43 can be reduced.

In the described arrangement, the active filter 5 is activated at a zero cross point of the input voltage. More concretely, this process is performed in the following manner. The phase detecting circuit 421 outputs a detection pulse upon detecting a zero cross point of the input voltage. The output ON/OFF circuit 403 sends a control signal for turning ON the output with respect to the driving circuit 70 upon generating a first detection pulse.

Therefore, the active filter 5 is started at a timing of the zero cross point of the input voltage. Therefore, the maximum current value flowing through the power transistor 43 can be minimized, and the maximum current value flowing through the power transistor 43 can be made smaller, and the maximum rate of the power transistor 43 can be set low. As a result, the cost of the power transistor 43 can be reduced, and the reliability can be improved.

Figure 48:
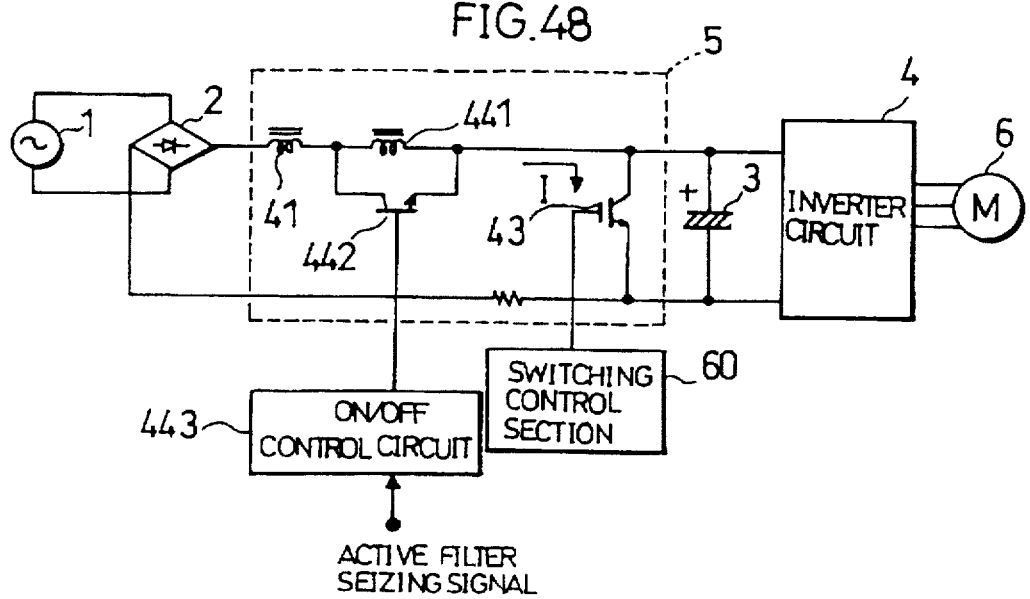
FIG. 48 is a schematic circuit diagram depicting the structure of the air conditioner of FIG. 41 when it includes another type of active filter.
Figure 49:
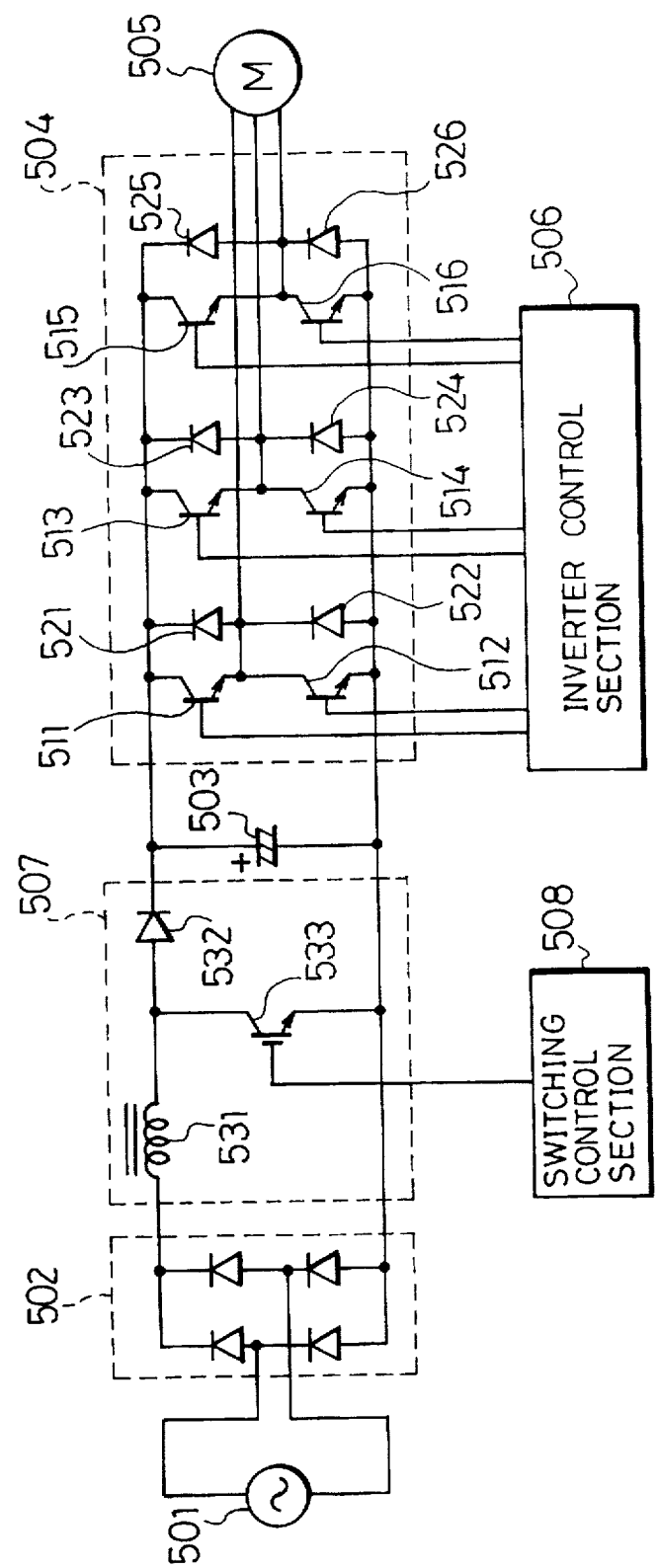
FIG. 49 is a schematic circuit diagram depicting the structure of a conventional air conditioner.

According to the air conditioner shown in FIG. 48, in order to reduce the current flowing through the power transistor 43, as in the arrangement shown in FIG. 46, the inductance of the choke coil 41 varies when starting the active filter 5.

The active filter 5 controls the flow of the input current by switching the power transistor 43. Therefore, with a fixed duty ratio of the PWM signal, the current value flowing through the power transistor 43 becomes large when the inductance of the choke coil 41 is low, while becomes smaller when the inductance is high. Therefore, in the described arrangement, by setting the inductance high when activating the active filter 5, the current value flowing through the power transistor 43 is reduced.

More concretely, in the active filter 5, the choke coil 41 and the choke coil 411 are connected in series, and the choke coil 441 and the transistor 442 are connected in parallel. The transistor 442 is turned ON/OFF based on the output from the ON/OFF control circuit 443. The ON/OFF control circuit 443 sends an OFF control signal to the transistor 442 only for a predetermined time duration after having the active filter seizing signal inputted thereto, while sends the ON control signal to the transistor 442 during the operation of the air conditioner other than the described time duration.

According to the described arrangement, when activating the active filter 5, the transistor 442 is turned OFF only for a predetermined time period by the output from the active filter 5. Then, as the choke coil 441 is connected to the choke coil 41 in series, the inductance of the active filter 5 increases. As a result, the current value flowing through the power transistor 43 becomes smaller.

After a predetermined time has elapsed, the transistor 442 is turned ON under the control of the ON/OFF control circuit 442. Thus, the choke coil 441 is separated from the choke coil 41. As a result, the inductance of the active filter 5 becomes only the inductance of the choke coil 41.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air conditioning device, comprising:

rectification means for rectifying an AC voltage outputted from an AC power source;

smoothing means for smoothing the rectified AC voltage prior to conversion into a DC voltage;

DC voltage-AC voltage conversion means for converting, by chopping, the DC voltage from said smoothing means into an AC voltage, whose voltage and frequency vary, to be applied to a power compressor;

control means for controlling an output of said DC voltage-AC voltage conversion means according to a load state of said power compressor;

an active filters, formed between said rectification means and said smoothing means, for shaping an input current to be an approximate sine wave almost in phase with an input voltage;

active filter control means for controlling said active filter in response to an instruction from said control means, said active filter control means being actuated by a power source separately provided from a power source for said control means; and abnormality detection means for detecting an abnormality or a shut-off of at least one of said active filter and said active filter control means and detecting a shut-off of power to be supplied to said active filter control means as an abnormality, wherein detection of an abnormality is linked to control of an operation of the DC voltage-AC voltage conversion means.

2. The air condition device as set forth in claim 1, wherein:

said control means shuts off said DC voltage-AC voltage conversion means upon receiving a detecting signal from said abnormality detection means indicating detection of an abnormality.

3. The air conditioning device as set forth in claim 1, wherein:

said control means shuts off said active filter upon the abnormality detection means detecting an abnormality or stoppage of said power compressor.

4. The air conditioning device as set forth in claim 1 wherein:

said control means controls an output from said DC voltage-AC voltage conversion means so as to raise an effective output voltage from said DC voltage-AC voltage conversion means upon receiving a detecting signal from said abnormality detection means indicating detection of an abnormality.

5. An air conditioning device, comprising:

rectification means for rectifying an AC voltage outputted from an AC power source;

smoothing means for smoothing the rectified AC voltage prior to conversion into a DC voltage;

DC voltage-AC voltage conversion means for converting, by chopping, the DC voltage from said smoothing means into an AC voltage, whose voltage and frequency vary;

an active filter, formed between said rectification means and said smoothing means, for shaping an input current to be an approximate sine wave almost in phase with an input voltage;

overvoltage detecting means for detecting if the output voltage from said active filter is an overvoltage of not less than a predetermined threshold overvoltage value; and overvoltage preventing means for shutting off said active filter upon detecting that an output voltage from said active filter is an overvoltage, while ignoring a result of detection of overvoltage of said overvoltage detection means for a predetermined time immediately after a turn-on time and a turn-off time of said DC voltage-AC voltage conversion means or for a predetermined time immediately after a turn-on time of said active filter.

6. An air conditioning device, comprising:

rectification means for rectifying an AC voltage outputted from an AC power source;

smoothing means for smoothing the rectified AC voltage prior to conversion into a DC voltage;

DC voltage-Ac voltage conversion means for converting, by chopping, the DC voltage from said smoothing means into an AC voltage, whose voltage and frequency vary, to be applied to a power compressor;

an active filters, formed between said rectification means and said smoothing means, for shaping an input current to be an approximate since wave almost in phase with an input voltage; and overvoltage preventing means for shutting off said active filter upon detecting that an output voltage from said active filter is an overvoltage in excess of a predetermined threshold, and for raising the predetermined threshold for a predetermined time when starting up said active filter or said power compressor.

7. The air conditioning device as set forth in claim 6, further comprising:

threshold determination means for altering the predetermined threshold according to an output voltage so as to maintain a constant difference between the output voltage from said active filter and the predetermined threshold.

8. An air conditioning device, comprising:

rectification means for rectifying an AC voltage outputted from an AC power source;

smoothing means for smoothing the rectified AC voltage prior to conversion into a DC voltage;

DC voltage-AC voltage conversion means for converting, by chopping, the DC voltage from said smoothing means into an AC voltage, whose voltage and frequency vary, to be applied to a power compressor;

an active filter, formed between said rectification means and said smoothing means, for shaping an input current to be an approximate sine wave almost in phase with an input voltage;

overvoltage preventing means for stopping said active filter upon detecting that the output voltage from said active filter is an overvoltage of not less than a predetermined threshold value;

active filter control means for controlling the active filter, and including output voltage detection means for detecting an output voltage from said active filter, and voltage difference detection means for outputting a difference between the output detected by said output voltage detection means and a reference voltage, wherein said active filter control means includes waveform rounding means for rounding off the output from said voltage difference detection means, said active filter control means controlling said active filter so as to maintain an output voltage therefrom when said power compressor starts activating, not to exceed the predetermined threshold value.

9. The air conditioning device as set forth in claim 8, wherein:

said waveform rounding means is a low pass filter formed between said output voltage detection means and said voltage difference detection means.

10. The air conditioning device as set forth in claim 8, wherein:

said voltage difference detection means is an error amplifier, and said waveform rounding means is time constant alteration means for making a time constant of said error amplifier larger for a predetermined time when starting up said active filter or said power compressor.

11. An air conditioning device comprising:

rectification means for rectifying the rectified AC voltage prior to conversion into a DC voltage;

DC voltage-AC voltage conversion means for converting, by chopping, the DC voltage from said smoothing means into an AC voltage, whose voltage and frequency vary;

control means for controlling an output frequency from said DC voltage-AC voltage conversion means according to a load state of said power compressor and for lowering a changing rate of an operating frequency of said power compressor for a predetermined time immediately after starting an alteration and immediately before completing the alteration of the operating frequency; and an active filters, formed between said rectification means and said smoothing means, for shaping an input current to be an approximate sine wave almost in phase with an input voltage.

12. An air conditioning device, comprising:

rectification means for rectifying an AC voltage outputted from an AC power source;

smoothing means for smoothing the rectified AC voltage prior to conversion into a DC voltage;

DC voltage-AC voltage conversion means for converting, by chopping, the DC voltage from said smoothing means into an AC voltage, whose voltage and frequency vary, to be applied to a power compressor;

an active filter, formed between said rectification means and said smoothing means, for shaping an input current to be an approximate sine wave almost in phase with an input voltage;

load detection means for always detecting a load state of said power compressor during operation;

output voltage setting means for increasing an output voltage of said active filter based upon a difference between a load state detected by said load state detection means when said power compressor is driven under an increased load and when said power compressor is driven under a load prestored when stably activating said power compressor so as to maintain the number of rotations of the power compressor constant; and active filter control means for controlling said active filter based on the increased output voltage.

13. The air conditioning device as set forth in claim 12, wherein:

said load state detection means detects a slip of said power compressor as a load state.

14. The air conditioning device as set forth in claim 12, wherein:

said load state detection means detects a load current flowing through said power compressor as a load state.

15. An air conditioning device, comprising:

rectification means for rectifying an AC voltage outputted from an AC power source;

smoothing means for smoothing the rectified AC voltage prior to conversion into a DC voltage;

DC voltage-AC voltage conversion means for converting, by chopping, the DC voltage from said smoothing means into an AC voltage, whose voltage and frequency vary, to a power compressor;

an active filters, formed between said rectification means and said smoothing means, for shaping an input current to be an approximate sine wave almost in phase with an input voltage, a ground potential thereof matching that of said DC voltage-AC voltage conversion means;

active filter control means for controlling said active filter; and power supply means for supplying a driving power to said DC voltage-AC voltage conversion means through a power source output terminal, said power supply means also supplying a driving power to said active filter control means through another power source output terminal.

16. An air conditioning device, comprising:

rectification means for rectifying an AC voltage outputted from an AC power source;

smoothing means for smoothing the rectified AC voltage prior to conversion into a DC voltage;

DC voltage-AC voltage conversion means for converting, by chopping, the DC voltage from said smoothing means into an AC voltage, whose voltage and frequency vary, to be applied to a power compressor;

an active filter, formed between said rectification means and said smoothing means, said active filter including a choke coil whose inductance decreases as current flowing into the coil increases, said active filter shaping an input current to be an approximate sine wave almost in phase with an input voltage by adjusting a flow of current into said smoothing means through said choke coil by switching a switching element; and switching control means for varying a switching frequency of said switching element, according to at least one of the current flowing through said choke coil and an output frequency of said AC power source, such that the switching frequency is increased as the current flowing into the coil increases.

17. An air conditioning device, comprising:

rectification means for rectifying an AC voltage outputted from an AC power source;

smoothing means for smoothing the rectified AC voltage prior to conversion into a DC voltage;

DC voltage-AC voltage conversion means for converting, by chopping, the DC voltage from said smoothing means into an AC voltages, whose voltage and frequency vary, to be applied to a power compressor;

an active filters, formed between said rectification means and said smoothing means, for shaping an input current to be an approximate sine wave almost in phase with an input voltage;

active filter control means for controlling said active filter;

overvoltage detection means for detecting that an output voltage from said active filter is in excess of a predetermined threshold; and power supply stop means for stopping power to be supplied to said active filter control means when the output voltage from said active filter is in excess of the predetermined threshold.

18. An air conditioning device, comprising:

rectification means for rectifying an AC voltage outputted from an AC power source;

smoothing means for smoothing the rectified AC voltage prior to conversion into a DC voltage;

DC voltage-AC voltage conversion means for converting, by chopping, the DC voltage from said smoothing means into an AC voltages, whose voltage and frequency vary, to be applied to a power compressor;

an active filter, formed between said rectification means and said smoothing means, for shaping an input current to be an approximate sine wave almost in phase with an input voltage;

output voltage detection means for detecting an output voltage from said active filter;

error detection means for detecting a difference between the output voltage and a preset reference voltage;

output control means for controlling the output voltage to be maintained constant based on the difference; and limiting means for limiting the difference between the output voltage and the reference voltage to be not more than a predetermined value when starting up said active filter.

19. An air conditioning device, comprising:

rectification means for rectifying an AC voltage outputted from an AC power source;

smoothing means for smoothing the rectified AC voltage prior to conversion into a DC voltage;

DC voltage-AC voltage conversion means for converting, by chopping, the DC voltage from said smoothing means into an AC voltage, whose voltage and frequency vary, to be applied to a power compressor;

an active filters, formed between said rectification means and said smoothing means, for shaping an input current to be an approximate sine wave almost in phase with an input voltage by adjusting a flow of current into said smoothing means by switching a switching element;

zero cross detection means for detecting a zero cross point of the input voltage of said active filter; and activation means for starting up said active filter at a zero cross point of the input voltage.

20. An air conditioning device, comprising:

rectification means for rectifying an AC voltage outputted from an AC power source;

smoothing means for smoothing an AC voltage rectified by said rectification means to be converted into a DC voltage;

a DC voltage-AC voltage conversion means for converting by chopping the DC voltage from said smoothing means into an AC voltage whose voltage and frequency vary to be applied to a power compressor;

an active filter formed between said rectification means and said smoothing means, said active filter including a choke coil and shaping an input current to be an approximate sine wave almost in phase with an input voltage by adjusting a flow of current into said smoothing means through said choke coil by switching a switching element; and inductance alternation means for increasing an inductance of said choke coil for a predetermined time after starting up said active filter.

21. An air conditioning device, comprising:

rectification means for rectifying an AC voltage outputted from an AC power source;

smoothing means for smoothing the rectified AC voltage prior to conversion into a DC voltage;

DC voltage-AC voltage conversion means for converting, by chopping, the DC voltage from said smoothing means into an AC voltage, whose voltage and frequency vary, to be applied to a power compressor;

an active filters, formed between said rectification means and said smoothing means and including, a choke coil for shaping an input current to be an approximate sine wave almost in phase with an input voltage by adjusting a flow of current into said smoothing means through said choke coil by switching a switching element; and inductance incrementing means for increasing an inductance of said choke coil for a predetermined time after starting up said active filter.

22. An air conditioning device, comprising:

rectification means for rectifying an AC voltage outputted from an AC power source;

smoothing means for smoothing the rectified AC voltage prior to conversion into a DC voltage;

DC voltage-AC voltage conversion means for converting, by chopping, the DC voltage from said smoothing means into an AC voltage, whose voltage and frequency vary, to be applied to a power compressor;

an active filter, formed between said rectification means and said smoothing means, for shaping an input current to be an approximate sine wave almost in phase with an input voltage and for boosting an input voltage based on a boost ratio;

AC voltage detection means for detecting an AC voltage of said AC power source;

voltage rise setting means for setting the boost ratio according to the AC voltage of said AC power source; and active filter control means for controlling the output voltage from the active filter based on the set boost ratio.

23. An air conditioning device, comprising:

rectification means for rectifying an AC voltage outputted from an AC power source;

smoothing means for smoothing the rectified AC voltage prior to conversion into a DC voltage;

DC voltage-AC voltage conversion means for converting, by chopping, the DC voltage from said smoothing means into an AC voltage, whose voltage and frequency vary, to be applied to a power compressor;

an active filter, formed between said rectification means and said smoothing means, for shaping an input current to be an approximate sine wave almost in phase with an input voltage by adjusting a flow of current into said smoothing means by switching a switching element;

input voltage detection means for detecting an input voltage to said active filter;

waveform generation means for generating an approximate sine wave according to a phase angle of the input current of aid active filter;

phase synchronization means for making the approximate sine wave in phase with the input voltage of said active filter; and switching control means for controlling a switching of said switching element based on the approximate sine wave in phase with the input voltage.

* * * * *